United States Patent
Ozawa et al.

(10) Patent No.: US 9,121,748 B2
(45) Date of Patent: Sep. 1, 2015

(54) SUPPORT STRUCTURE FOR LOAD MEASUREMENT SENSOR

(75) Inventors: Hidetoshi Ozawa, Tochigi (JP); Wataru Honda, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 399 days.

(21) Appl. No.: 13/558,456

(22) Filed: Jul. 26, 2012

(65) Prior Publication Data

US 2013/0025377 A1 Jan. 31, 2013

(30) Foreign Application Priority Data

| Jul. 28, 2011 | (JP) | 2011-165466 |
| Jul. 28, 2011 | (JP) | 2011-165467 |
| Jul. 28, 2011 | (JP) | 2011-165468 |
| Jul. 28, 2011 | (JP) | 2011-165469 |
| Jun. 8, 2012 | (JP) | 2012-131052 |

(51) Int. Cl.
| *G01L 1/04* | (2006.01) |
| *G01G 19/414* | (2006.01) |
| *B60N 2/00* | (2006.01) |
| *B60N 2/07* | (2006.01) |
| *B60R 21/015* | (2006.01) |

(52) U.S. Cl.
CPC ............ *G01G 19/4142* (2013.01); *B60N 2/002* (2013.01); *B60N 2/0732* (2013.01); *B60R 21/01516* (2014.10)

(58) Field of Classification Search
USPC .................................................. 73/862.621
See application file for complete search history.

(56) References Cited

U.S. PATENT DOCUMENTS

| 7,073,391 B2 * | 7/2006 | Dukart ........................... 73/779 |
| 7,513,571 B2 * | 4/2009 | Hofmann et al. ........ 297/344.15 |
| 2001/0011482 A1 | 8/2001 | Billen |
| 2004/0050182 A1 * | 3/2004 | Dukart ..................... 73/862.625 |
| 2005/0103128 A1 | 5/2005 | Dukart |

(Continued)

FOREIGN PATENT DOCUMENTS

| CN | 1692040 A | 11/2005 |
| DE | 10 2004 011 845 A1 | 9/2005 |

(Continued)

OTHER PUBLICATIONS

Search Report established for EP 12178481.3 (Nov. 15, 2012).

(Continued)

*Primary Examiner* — Lisa Caputo
*Assistant Examiner* — Jamel Williams
(74) *Attorney, Agent, or Firm* — Drinker Biddle & Reath LLP

(57) ABSTRACT

Provided is a support structure for a load measurement sensor having sufficient durability without adding a large load to a portion transmitting a load to the load measurement sensor. In the support structure, including a sensor body detecting a load generated from a seat having a seat frame and an extension shaft portion extending from the sensor body, to attachment brackets in a state where the extension shaft portion follows the horizontal direction, the support structure includes a load input portion which comes into contact with the sensor body and inputs a load to the sensor body. The sensor body includes a load receiving surface which comes into contact with the load input portion and receives the load, and the load input portion is formed to be movable in the axial direction of the extension shaft portion with respect to the load receiving surface.

22 Claims, 28 Drawing Sheets

(56) References Cited

U.S. PATENT DOCUMENTS

| | | |
|---|---|---|
| 2006/0010984 A1 | 1/2006 | Yamazaki |
| 2006/0053898 A1 | 3/2006 | Selig et al. |
| 2006/0180359 A1* | 8/2006 | Wolfe et al. .................. 177/144 |
| 2007/0273367 A1 | 11/2007 | Munz et al. |
| 2008/0079296 A1 | 4/2008 | Endo et al. |
| 2010/0038940 A1 | 2/2010 | Hwang et al. |
| 2011/0303469 A1* | 12/2011 | Saito et al. .................. 177/136 |

FOREIGN PATENT DOCUMENTS

| | | |
|---|---|---|
| DE | 10 2006 047 392 A1 | 4/2008 |
| EP | 1 640 218 A1 | 3/2006 |
| JP | 2006-076334 A | 3/2006 |
| JP | 4205028 B2 | 1/2009 |
| JP | 2010-042809 A | 2/2010 |
| WO | WO 2005/088267 A1 | 9/2005 |
| WO | WO 2006/011598 A1 | 2/2006 |
| WO | 2007/006364 A1 | 1/2007 |

OTHER PUBLICATIONS

Office Action issued for CN 201210262629.4 (Aug. 20, 2014).
Office Action issued for JP 2011-165467 (Jun. 30, 2015).
Office Action issued for JP 2011-165468 (Jun. 30, 2015).
Office Action issued for JP 2011-165469 (Jun. 30, 2015).

* cited by examiner

FRONT-TO-BACK DIRECTION

WIDTH DIRECTION

INSIDE ⟷ OUTSIDE
WIDTH DIRECTION

INSIDE ⟵⟶ OUTSIDE

WIDTH DIRECTION

SUPPORT STRUCTURE FOR LOAD MEASUREMENT SENSOR

CROSS REFERENCE TO RELATED APPLICATIONS

This application claims the benefit of the following Japanese Patent Applications, all of which are incorporated by reference in their entirety:

| Japanese Patent Application No. | Date Filed |
| --- | --- |
| 2011-165466 | Jul. 28, 2011 |
| 2011-165467 | Jul. 28, 2011 |
| 2011-165468 | Jul. 28, 2011 |
| 2011-165469 | Jul. 28, 2011 |
| 2012-131052 | Jun. 8, 2012 |

BACKGROUND

Described herein is a support structure for a load measurement sensor, and particularly, a support structure for a load measurement sensor which is supported while an extension portion extending from a sensor body is positioned at a side portion of the sensor body.

With a view to improving the safety of a passenger or the comfort thereof when the passenger sits on a seat, there is proposed a technique of controlling an operation of a device around a vehicle seat in response to the weight of the sitting passenger.

In such a technique, in order to detect the weight of the sitting passenger, a load measurement sensor is generally disposed below the vehicle seat on which the passenger sits.

The installation position of the load measurement sensor is generally located below the vehicle seat. Then, for example, there is a known configuration in which a load measurement sensor is installed between a seat frame constituting a vehicle seat and a slide rail installed to slide the vehicle seat in the front-to-back direction (see Japanese Patent Document No. 4205028B1 ("the '028 Reference")).

The '028 Reference discloses, as illustrated in FIG. 27, a configuration in which a load measurement sensor 130 (which it describes as a "load sensor") is installed above an upper rail 112 (which it describes as a "slider") sliding on a lower rail 111 (which it describes as a "rail body") attached to a vehicle body floor and a seat frame 101 is disposed above the load measurement sensor 130. Furthermore, FIG. 27 is a partial perspective view illustrating a vehicle seat which adopts the support structure for the load measurement sensor according to the related art.

Then, as illustrated in FIG. 28, in order to fix the load measurement sensor 130 to the seat frame 101, a shaft portion 131 (which the '028 Reference describes as a "male screw") is provided, and the shaft portion 131 is disposed so that its axial direction becomes the vertical direction. In recent years, in order to improve the convenience of the passenger who sits on the vehicle or in the design of the vehicle, a technique is demanded which lowers the height of the vehicle seat. However, in a case where the load measurement sensor 130 is installed with such a technique, the seat frame 101 increases in height by the height of the load measurement sensor 130, which causes a problem in which the height of the vehicle seat increases. FIG. 28 is a cross-sectional view illustrating the support structure for the load measurement sensor according to the related art.

On the other hand, there is proposed a technique in which the shaft portion is disposed so that the axial direction of the shaft portion for attaching the load measurement sensor thereto is not set as the vertical direction, but is set as the horizontal direction (see Japanese Patent Document No. P2010-42809A ("the '809 Reference")).

In the '809 Reference, the load measurement sensor (which it describes as a "load detection sensor") is installed so that the axial direction becomes the horizontal direction and the load measurement sensor is disposed to be settled in the height range of the seat frame. For this reason, the height of the vehicle seat may be lowered compared to the technique of the '028 Reference.

In the technique disclosed in the '809 Reference, the load measurement sensor is fixed across the first bracket and the second bracket, so that the axial direction of the load measurement sensor is disposed to be the horizontal direction. However, in the load measurement sensor of the '809 Reference, when a load generated from the seat frame is transmitted to the load measurement sensor, the load measurement sensor may not move in the axial direction with respect to the first bracket and the second bracket since both ends of the load measurement sensor are respectively fixed to the first bracket and the second bracket. As a result, a large load is applied to the attachment portion (the portion of the male screw) of the load measurement sensor, which causes a problem in which the durability is degraded.

Accordingly, a support structure for a load measurement sensor has been needed which has sufficient durability without adding a large load to a portion (member) transmitting a load to a load measurement sensor.

Further, in the technique disclosed in the '809 Reference, both ends of the load measurement sensor in the axial direction are respectively supported to the first bracket and the second bracket through a first damper and a second damper, and a load generated from the first bracket and the second bracket is transmitted to the load measurement sensor. Then, the first damper and the second damper are respectively formed separately from the first bracket and the second bracket, and are individually installed when the load measurement sensor is installed. Accordingly, the first damper and the second damper are not respectively integrated with the first bracket and the second bracket, which has a possibility that an error in position may occur during the attachment operation. As a result, there is a problem in which a measurement error may occur during the load detection.

Further, in the technique of the '809 Reference, the first damper and the second damper are respectively provided between the load measurement sensor and first and second brackets, and the first damper and the second damper are formed by an elastic member, such as a rubber member. In this way, since the first damper and the second damper which are formed by the elastic member absorbs the load generated from the seat frame, the load generated from the seat frame is not completely transmitted to the load measurement sensor, which causes a problem in which it is difficult to accurately detect the load.

In addition, in the load measurement sensor of the '809 Reference, when the load generated from the seat frame is transmitted to the load measurement sensor, the first bracket (or the second bracket) is slightly inclined from the load transmission direction with respect to the shaft portion (the portion of the male screw) of the load measurement sensor, and a part of the first bracket (or the second bracket) is bent, the load is not accurately transmitted to the load measurement sensor, which causes a problem in which a load detection error may occur.

Accordingly, a technique of improving load detection precision by reducing a load detection error has been needed.

In addition, in the technique of the '809 Reference, when the load generated from the seat frame is transmitted to the load measurement sensor, the load measurement sensor may not move in the axial direction with respect to the first bracket and the second bracket since both ends of the load measurement sensor are respectively fixed to the first bracket and the second bracket. As a result, a large load is applied to the attachment portion (the portion of the male screw) of the load measurement sensor, which causes a problem in which the durability is degraded.

Accordingly, a support structure for a load measurement sensor has been needed which has sufficient durability without adding a large load to a portion (member) transmitting a load to a load measurement sensor.

In addition, in a case where both ends of the load measurement sensor are respectively fastened to the first bracket and the second bracket, there are two fastening positions, which causes a problem in which a time necessary for the operation of the load measurement sensor is prolonged.

Accordingly, a technique capable of shortening an operation time by improving the workability during the load measurement sensor attachment operation has been needed.

In addition, in a case where both ends of the load measurement sensor need to be respectively fastened to the first bracket and the second bracket, there is a problem in which the support structure for the load measurement sensor increases in size. Accordingly, in the support structure for the load measurement sensor, a technique of compactly attaching a load measurement sensor in a minimum space has been demanded.

Furthermore, in the load measurement sensor, the sensor body is generally provided with a conversion unit having a substrate which detects a deformation amount (a displacement amount) when receiving a load and converts the deformation amount into an electric signal. Accordingly, since the portion (a part of the seat frame) inputting (transmitting) the load generated from the seat frame to the load measurement sensor and the conversion unit are vicinally provided in many cases, the seat frame and the conversion unit interfere with each other. As a result, there is a problem in which a measurement error may occur. Accordingly, a technique of improving load detection precision by inhibiting interference between a seat frame and a conversion unit to reduce a load detection error has been needed.

Further, a configuration may be supposed in which the load measurement sensor moves to deform the deformation portion provided in the sensor when transmitting the load of the seat from the load input portion to the load measurement sensor. In such a configuration, the load measurement sensor detects the load based on the deformation amount of the deformation portion. However, when the load input from the load input portion is not appropriately transmitted to the deformation portion, the deformation portion is not easily deformed. Accordingly, even when the load is input from the load input portion, the load measurement sensor may not appropriately detect the load.

It is an object of various embodiments of the invention to provide a support structure for a load measurement sensor having sufficient durability without adding a large load to a portion (member) transmitting a load to the load measurement sensor.

Further, it is another object to provide a support structure for a load measurement sensor capable of reducing a load detection error.

Further, it is another object to provide a support structure for a load measurement sensor having sufficient durability.

In addition, it is another object to provide a support structure for a load measurement sensor capable of shortening an operation time when supporting the load measurement sensor to a support bracket.

In addition, it is another object to provide a support structure for a load measurement sensor capable of supporting the load measurement sensor in a small space without increasing a peripheral structure thereof when supporting the load measurement sensor to a support bracket.

In addition, it is another object to provide a support structure for a load measurement sensor capable of accurately detecting an input load by reliably transmitting the load input from a load input portion provided in a seat to the load measurement sensor.

SUMMARY

The above-described problems may be solved by a support structure for a load measurement sensor which supports a load measurement sensor, including a sensor body detecting a load generated from a seat having a seat frame and an extension shaft portion extending from the sensor body, to a support bracket while the extension shaft portion is positioned at a side portion of the sensor body, wherein the sensor body includes a load receiving surface which is formed to receive the load, wherein the support structure includes a contact portion which comes into contact with the load receiving surface and transmits the load to the sensor body, and wherein the contact portion is formed to be movable in the axial direction of the extension shaft portion with respect to the load receiving surface.

In this way, in the support structure for the load measurement sensor, the contact portion which comes into contact with the load measurement sensor to transmit the load thereto is formed to be movable with respect to the load receiving surface of the load measurement sensor. With such a configuration, when the load generated from the seat is added to the load measurement sensor, a large load is inhibited from being locally added to the contact portion. As a result, a large load is inhibited from being added to the contact portion, so that the durability of the contact portion and the load measurement sensor may be improved.

Further, as for the direction in which the contact portion moves with respect to the load receiving surface, the contact portion is configured to move along the axial direction of the extension shaft portion provided in the load measurement sensor. Accordingly, the load generated from the seat may be accurately input to the load measurement sensor without dropping the contact portion from the load receiving surface or reducing the transmitted load due to the disturbance of the other member when the load generated from the seat is input to the load receiving surface. As a result, the load detection precision may be improved.

At this time, as in an embodiment, the contact portion may be formed to be movable toward the extension shaft portion supported by the support bracket.

In this way, since the contact portion moves toward the extension shaft portion supported by the support bracket when the contact portion transmits the load to the load measurement sensor, the contact portion moves closer to the portion supporting the load measurement sensor when transmitting the load to the load measurement sensor. Since the portion of the load measurement sensor supported by the support bracket is more rigidly installed compared to the other portion, when the contact portion moves closer to the portion supporting the load measurement sensor, the contact portion may stably come into contact with the load measurement sensor. Accordingly, the load measurement sensor may stably receive the load transmitted from the contact portion. As a result, since the load is stably transmitted from the contact portion to the load measurement sensor, the load detection precision may be improved.

At this time, as in an embodiment, the contact portion may be disposed adjacent to the other member in the axial direction of the extension shaft portion while being separated from the other member.

In this way, since the contact portion is disposed adjacent to the other member in the axial direction of the extension shaft portion to be away therefrom, the contact portion may move along the axial direction with a simple configuration. Accordingly, the operation of supporting the load measurement sensor may be easily performed without a complex configuration.

Further, as in an embodiment, the sensor body may further include a positioning portion which is disposed near the support bracket in relation to the load receiving surface and positions the load measurement sensor with respect to the support bracket, and the contact portion may be disposed on the inside in the seat width direction in relation to the positioning portion.

In this way, since the sensor body of the load measurement sensor is provided with the positioning portion (for example, the step portion), the load measurement sensor is more stably supported by the support bracket. In this way, since the contact portion comes into contact with the load measurement sensor, which is stably supported by the support bracket, on the inside in the seat width direction in relation to the positioning portion, the contact portion stably comes into contact with the sensor body of the load measurement sensor. As a result, since the contact portion may accurately transmit the load without distributing the load when transmitting the load to the load measurement sensor, the load detection precision may be improved.

At this time, as in an embodiment, the contact portion may be attached to an attachment member which is disposed on the inside in the seat width direction in relation to the support bracket, the contact portion may include a load input surface that comes into contact with the load receiving surface, and the load input surface may be formed by a load input member having a sliding performance higher than that of the attachment member.

In this way, since the contact portion is formed by the load input member having a high sliding performance, the contact portion may more easily move (slide) with respect to the load receiving surface (the load measurement sensor). Accordingly, the contact portion may be inhibited from being caught by the load receiving surface when the contact portion slides on the load receiving surface. As a result, since a large load is inhibited from being locally added to the contact portion, the durability may be improved.

At this time, as an embodiment, the load input member may include a cylindrical portion which is disposed along the axial direction of the extension shaft portion and comes into contact with the sensor body and a flange portion which is formed in one end of the cylindrical portion in the axial direction and extends outward in the radial direction, and the flange portion may be attached to the attachment member.

In this way, since the load input member includes the flange portion which extends from one end of the cylindrical portion disposed along the axial direction of the extension shaft portion, the rigidity of the load input member is improved. Accordingly, the durability of the load input member may be improved.

Further, since the flange portion is provided, the attachment position of the load input member may be easily determined so that the flange portion is caught by a part of the attachment member when attaching the load input member to the attachment member, and hence the attachment operation may be easily performed.

In addition, as in an embodiment, the load input member may include a cylindrical portion which is disposed along the axial direction of the extension shaft portion and comes into contact with the sensor body, a first flange portion which is formed in one end of the cylindrical portion in the axial direction and extends outward in the radial direction, and a second flange portion which is formed in the other end of the cylindrical portion in the axial direction and extends outward in the radial direction, and the first flange portion and the second flange portion may be formed at positions interposing the attachment member.

In this way, since the load input member is provided with two flange portions (the first flange portion and the second flange portion), the rigidity of the load input member is drastically improved. In addition, since two flange portions may be provided at positions interposing the seat frame, the attachment position (the attachment precision) may be accurately controlled when attaching the load input member to the seat frame. As a result, the load detection precision during the load measurement is improved.

At this time, as in an embodiment, the extension shaft portion which is fixed to the support bracket may be disposed in one end of the sensor body, and the other end of the sensor body may be a free end.

When supporting the load measurement sensor to the support bracket, the load measurement sensor may be fixed to the support bracket by fixing the extension shaft portion extending from one end of the sensor body. Then, the other end of the sensor body may be formed as a free end, that is, a structure which is not supported by the support bracket (a cantilevered state). Accordingly, since the load measurement sensor is supported by the support bracket only by fixing one end thereof, one position may be fixed during the support operation. As a result, for example, compared to a case where both ends of the load measurement sensor are fixed, the time necessary for the support operation may be shortened.

Further, as in an embodiment, the attachment member may be formed of a metal material, and the load input member may be formed of a resin material.

In this way, since the load input member is formed of a resin material, the load input member may be easily formed. In addition, when the load input member is formed of a resin material, the load input member decreases in weight compared to, for example, a case where the load input member is formed of a metal material, so that the seat may be decreased in weight. Further, since the load input member is formed of a resin material, the sliding performance is improved.

Further, as in an embodiment, the sensor body may include a load detection portion which detects the load in a manner such that the load detection portion is displaced while coming into contact with the contact portion, the load measurement sensor may include a conversion unit which is attached to the sensor body, detects a displacement amount of the load detection portion, and converts the displacement amount into an electric signal, and the contact portion may be disposed near the conversion unit in relation to the displacing free end of the load detection portion.

With regard to the load detection portion provided in the sensor body, one end is formed as a free end, so that the load detection portion is pressed downward by the load when receiving the load generated from the seat. Then, since the contact portion is provided on the installation side (that is, the fixed end side) of the conversion unit detecting the displacement amount in relation to the free end, a biased load may be inhibited from being added to the contact portion. As a result, the durability may be improved without adding a large load to the contact portion.

Further, as in an embodiment, the support structure may further include a load transmission portion which is adjacent to the contact portion to transmit the load to the sensor body, the load transmission portion and the contact portion may be all attached to the attachment member disposed on the inside in the seat width direction in relation to the support bracket, the load transmission portion may include a sensor body side end that is positioned near the sensor body in the load transmission direction and an opposite portion that is positioned at the opposite side of the sensor body side end in the load transmission direction, the length of the sensor body side end in the axial direction of the extension shaft portion is longer than that of the opposite portion, and the attachment member and the portion positioned at the opposite side of the sensor body side end in the load transmission direction of the load transmission portion may be integrated with each other.

In this way, the end of the load transmission portion transmitting the load to the load measurement sensor near the sensor body of the load measurement sensor in the load transmission direction is formed to wider than the other end. In other words, the length of one end in the axial direction of the extension shaft portion is longer than that of the other end. That is, the end of the load transmission portion near the sensor body of the load measurement sensor is provided with a wide portion having a large width in the axial direction. In this way, since the end near the load measurement sensor in the load transmission direction is formed to have a wide width, the load may be stably transmitted when transmitting the load generated from the seat to the load measurement sensor. Further, since the load transmission portion may stably transmit the load to the load measurement sensor, the load detection precision may be also improved.

In addition, since the attachment member provided with the load transmission portion and the contact portion is integrated with the load transmission portion, the precision in the shape and the dimension of the load transmission portion may be improved. As a result, the measurement precision of the load measurement sensor may be also improved. Furthermore, with the above-described configuration, since the rigidity of the end of the load transmission portion near the load measurement sensor is improved, the durability may be also improved.

At this time, as in an embodiment, the load transmission portion may be formed by a load transmission member attached to an end of the attachment member at a position of pressing the sensor body, and a plate thickness of the load transmission member near the sensor body in the seat width direction may be larger than a plate thickness of the load transmission member near the attachment member in the seat width direction.

In this way, the load transmission portion may be formed by the load transmission member formed separately from the attachment member. At this time, since the plate thickness (the plate thickness in the seat width direction) of the end of the load transmission member near the sensor body of the load measurement sensor is formed to be thicker than the plate thickness (the plate thickness in the seat width direction) of the end near the attachment member, the load generated from the seat may be stably transmitted to the load measurement sensor. Accordingly, the load detection precision may be also improved. In addition, since the rigidity of the end of the load transmission member near the load measurement sensor is improved, the durability may be also improved.

Further, as in an embodiment, the contact portion may be attached to the attachment member disposed on the inside in the seat width direction in relation to the support bracket, the load measurement sensor may include a conversion unit which is attached to the sensor body, detects a load applied to the sensor body, and converts the load into an electric signal, the support structure may include a movement regulation portion which is disposed between the conversion unit and the contact portion and regulates a movement amount of the contact portion toward the conversion unit, and the movement regulation portion may be formed at the outside of an inner surface of the conversion unit in the radial direction of the extension shaft portion and is disposed on the inside in the seat width direction in relation to the attachment member.

In this way, since the movement regulation portion which regulates the movement amount of the contact portion is provided, it is possible to inhibit an accident in which the contact portion comes into contact with the conversion unit and hence the detection precision of the load sensor is degraded. Accordingly, with the above-described configuration, since the contact portion may be inhibited from interfering with the conversion unit which needs particularly high precision during the load detection, the damage of the load measurement sensor, and particularly, the conversion unit may be inhibited, so that the load may be detected with high detection precision. In addition, since the movement regulation portion is formed at the outside in the radial direction in relation to the bottom surface of the conversion unit and at the inside in the seat width direction in relation to the attachment member provided with the contact member, that is, at the side of the conversion unit in relation to the support bracket, the contact portion and the conversion unit are disposed to be separated from each other by the movement regulation portion. Accordingly, a measurement error may be minimized by inhibiting the interference between the load input member and the conversion unit, so that the load may be detected with high detection precision.

Further, as in an embodiment, the movement regulation portion may be formed by a movement regulation member which is formed separately from the sensor body.

In this way, when the movement regulation portion is formed by a member separate from the sensor body, a degree of freedom in design such as the size or the shape of the movement regulation portion is improved. Further, since the shapes of the sensor body and the load measurement sensor are not complex, the load measurement sensor may be easily manufactured.

Further, as in an embodiment, the movement regulation portion may be disposed away from the conversion unit in the axial direction of the extension shaft portion.

In this way, since the movement regulation portion is disposed away from the conversion unit provided in the sensor body, even when the contact portion moves closer to the conversion unit and comes into contact with the movement regulation portion, the interference between the contact portion and the conversion unit may be inhibited by the gap provided between the movement regulation portion and the conversion unit. That is, even when the contact portion excessively moves toward the conversion unit, the contact portion may not reach the conversion unit by providing the gap. In addition, when the movement regulation portion is disposed away from the conversion unit, even when the movement regulation portion is inclined or deformed toward the gap, the contact portion and the movement regulation portion may be inhibited from interfering with the conversion unit. As a result, it is possible to inhibit the damage of the conversion unit or the measurement error during the load detection. Further, since the movement regulation portion is inhibited from coming into contact with the conversion unit, the durability of the load measurement sensor is also improved.

Further, as in an embodiment, the movement regulation portion may be disposed on the inside in the radial direction of the extension shaft portion in relation to the outer end surface of the conversion unit.

Accordingly, the support structure for the load measurement sensor may be decreased in size in the radial direction of the extension shaft portion to be further compact in size.

Further, as in an embodiment, one of the support bracket and the attachment member may be attached onto a rail member extending along the front-to-back direction of the seat by a fixation member, and at least a part of the movement regulation portion may be disposed at the lower side in relation to the upper end of the fixation member.

In this way, since at least a part of the movement regulation portion is disposed below the fixation member which is attached to the rail member, the installation height of the movement regulation portion is lowered. That is, since at least a part of the fixation member and the movement member overlap each other, an increase in size in the height direction may be inhibited. Accordingly, the support structure for the load measurement sensor may be decreased in size in the height direction to be compact in size.

Further, as in an embodiment, the contact portion may include a cylindrical portion which is disposed along the axial direction of the extension shaft portion and comes into contact with the sensor body and a flange portion which is provided in one end of the cylindrical portion in the axial direction and extends outward in the radial direction, the flange portion may be disposed adjacent to the movement regulation portion in the axial direction, and the movement regulation portion may extend outward in the radial direction in relation to the outer diameter of the flange portion.

In this way, when the size of the surface of the movement regulation portion coming into contact with the contact portion is formed to be larger than that of the surface of the contact portion coming into contact with the movement regulation portion, the movement of the contact portion may be stably inhibited by the movement regulation portion. As a result, a load detection error hardly occurs, so that the detection precision may be improved.

Further, as in an embodiment, the support structure may further include a movement restriction portion which is disposed between the support bracket and the contact portion and restricts a movement amount of the contact portion toward the support bracket.

In this way, since the movement restriction portion which restricts the movement amount of the contact portion is provided, the excessive movement of the contact portion is inhibited. That is, it is possible to accomplish a function of inhibiting the contact portion from largely moving toward the support bracket to interfere with the support bracket and of inhibiting the contact portion from coming off from the portion of the load measurement sensor detecting the load. Further, it is possible to inhibit the portion forming the contact portion from being deformed by the movement restriction portion. Accordingly, since the contact portion may transmit the load to the load measurement sensor in an appropriate range during the load detection, the load may be detected with high detection precision.

Further, as in an embodiment, the sensor body may include a load detection portion which comes into contact with a load input portion and detects the load, and the movement restriction portion may be formed to not overlap the end surface of the load detection portion in the seat width direction on the same imaginary plane of which the axial direction is set as the normal direction.

Since the load detection portion detects the load by being displaced in the vertical direction, that is, the load transmission direction when receiving the load from the contact portion, when the displacement is disturbed by the other member, the measurement error of the load measurement sensor occurs. For this reason, according to the above-described configuration, since the damping of the movement restriction portion is inhibited particularly when the load detection portion is displaced in the vertical direction, the displacement of the load detection portion is not disturbed, so that the load detection precision may be improved.

Further, as in an embodiment, the load detection portion may be disposed away from the support bracket, and the movement restriction portion may be disposed at the outside of a gap between the load detection portion and the support bracket in the radial direction of the extension shaft portion to cover the gap.

In this way, when the movement restriction portion is formed to cover the gap between the load detection portion and the support bracket, it is possible to inhibit foreign matter from intruding into the gap from the periphery of the load detection portion. When foreign matter intrudes into the periphery of the load detection portion, the load detection portion moves in a manner different from that of the normal state when the load is added thereto, which may cause a load detection error. Here, according to the above-described configuration, since the intrusion of foreign matter is inhibited, a measurement error does not occur during the load detection, so that the measurement precision may be improved.

Further, as in an embodiment, the movement restriction portion may be formed in an annular shape.

In this way, since the movement restriction portion is formed in an annular shape, the load measurement sensor may be inserted through the hole of the movement restriction portion when supporting the load measurement sensor to the support bracket, so that the load measurement sensor may be easily attached. Further, since the movement restriction portion is not locally formed but is formed to surround the periphery of the load measurement sensor, the rigidity of the movement restriction portion is improved. In addition, since the portion of the support bracket around the load measurement sensor may be reinforced by the movement restriction portion, the load measurement sensor may be stably and rigidly installed. Accordingly, the durability of the portion supporting the load measurement sensor is improved.

Further, as in an embodiment, the support structure may further include a load input portion which comes into contact with a portion different from the load receiving surface of the load measurement sensor and inputs the load to the load measurement sensor; and a sensor body receiving portion which is pressed by the sensor body through the contact portion when the load measurement sensor is moved by the load input from the load input portion, wherein the load measurement sensor includes a load detection portion which detects the load in a manner such that the sensor body receiving portion is pressed through the contact portion and thereby the load detecting portion is displaced, wherein the load measurement sensor is moved by the load input from the load input portion, and the load detection portion is pressed against the sensor body receiving portion through the contact portion with the movement operation of the load measurement sensor, and wherein in a state where the load measurement sensor is supported by the support bracket, the load input portion and the sensor body receiving portion are away from each other.

In the above-described configuration, since the load input portion and the sensor body receiving portion are away from each other, when the load is input from the load input portion to the load measurement sensor, the load measurement sensor moves, and the deformation portion is pressed against the sensor body receiving portion through the contact portion by the movement operation. By such a procedure, the load input from the load input portion is reliably transmitted to the sensor body, and more specifically, the deformation portion through the contact portion. In addition, even when the input load is minute, the load is appropriately transmitted from the load input portion to the deformation portion by the principle of a lever. As a result, since the load input from the load input portion may be appropriately transmitted to the deformation portion, the load may be accurately detected.

According to at least one embodiment discussed above, since the contact portion is formed to be movable in the axial direction of the extension shaft portion, the durability may be improved without locally adding a large load to the contact portion. Further, the load detection precision may be improved.

According to at least one embodiment discussed above, since the contact portion stably comes into contact with the load measurement sensor, the load detection precision may be improved.

According to at least one embodiment discussed above, since the contact portion may be movable along the axial direction with a simple configuration, the operation of supporting the load measurement sensor may be easily performed.

According to at least one embodiment discussed above, since the contact portion stably comes into contact with the load measurement sensor, the load detection precision may be improved.

According to at least one embodiment discussed above, since the load input member is easily movable with respect to the load measurement sensor, a large load is inhibited from being added to the contact portion, so that the durability may be improved.

According to at least one embodiment discussed above, since the rigidity of the load input member is improved, the durability may be improved. In addition, the operation of attaching the load input member may be easily performed.

According to at least one embodiment discussed above, since the rigidity of the load input member is improved, the durability may be drastically improved. Further, since the precision in the attachment of the load input member is improved, the load detection precision may be also improved.

According to at least one embodiment discussed above, since only one end of the load measurement sensor may be fixed to the support bracket, the time necessary for the operation of supporting the load measurement sensor may be shortened.

According to at least one embodiment discussed above, the load input member may be easily formed. Further, the sliding performance of the load input member may be improved.

According to at least one embodiment discussed above, since a biased load is inhibited from being added to the load input member, the durability is improved without adding a large load to the load input member.

According to at least one embodiment discussed above, since the load generated from the seat may be stably transmitted to the load measurement sensor and the precision in the shape or the dimension of the load transmission portion may be improved, the load measurement precision is improved. In addition, since the rigidity of the end of the load transmission portion near the load measurement sensor is improved, the durability is improved.

According to at least one embodiment discussed above, since the load generated from the seat may be stably transmitted to the load measurement sensor, the load detection precision is improved. In addition, since the rigidity of the end of the load transmission member near the load measurement sensor is improved, the durability is improved.

According to at least one embodiment discussed above, the load measurement sensor, and particularly, the conversion unit is inhibited from being damaged by inhibiting the conversion unit from interfering with the contact portion, so that the load may be detected with high detection precision.

According to at least one embodiment discussed above, a degree of freedom in design such as the size or the shape of the movement regulation portion is improved. Further, since the shape of the load measurement sensor including the sensor body is not complex, the load measurement sensor may be easily manufactured.

According to at least one embodiment discussed above, since the contact portion may be inhibited from interfering with the conversion unit by the gap provided between the movement regulation portion and the conversion unit, the damage of the conversion unit or the measurement error during the load detection may be inhibited. In addition, the durability of the load measurement sensor is also improved.

According to at least one embodiment discussed above, the support structure for the load measurement sensor may be decreased in size in the radial direction of the extension shaft portion to be further compact in size.

According to at least one embodiment discussed above, since the installation height of the movement regulation portion is lowered, the support structure for the load measurement sensor may be decreased in size in the height direction to be compact in size.

According to at least one embodiment discussed above, since the movement of the contact portion may be stably inhibited by the movement regulation portion, the load detection error hardly occurs, and the detection precision is improved.

According to at least one embodiment discussed above, it is possible to prevent an accident in which the contact portion excessively moves and interferes with the support bracket or comes off from the portion of the load measurement sensor detecting the load. Further, as a result of causing the contact portion to transmit the load to the load measurement sensor in an appropriate range by inhibiting the deformation of the contact portion, the load may be detected with high detection precision.

According to at least one embodiment discussed above, the displacement of the load detection portion is not interrupted by inhibiting the damping of the movement restriction portion when the load detection portion is displaced in the vertical direction, so that the load detection precision is improved.

According to at least one embodiment discussed above, the load detection error caused by foreign matter is inhibited by inhibiting foreign matter from intruding into the gap from the periphery of the load detection portion, so that the measurement precision may be improved.

According to at least one embodiment discussed above, the attachment of the load measurement sensor may be easily performed by inserting the load measurement sensor through the hole of the movement restriction portion. Further, the movement restriction portion is provided to surround the periphery of the load measurement sensor, so that the rigidity of the movement restriction portion is improved. In addition, since the portion of the support bracket in the periphery of the load measurement sensor is reinforced by the movement restriction portion, the durability of the portion supporting the load measurement sensor is improved.

According to at least one embodiment discussed above, the load input from the load input portion is reliably transmitted to the deformation portion of the sensor body through the contact portion. In addition, even when the input load is minute, the load is appropriately transmitted from the load input portion to the deformation portion by the principle of a lever. As a result, the load may be accurately detected.

BRIEF DESCRIPTION OF THE DRAWINGS

Various embodiments of the invention are illustrated in the drawings, in which.

DETAILED DESCRIPTION

Figure 1:
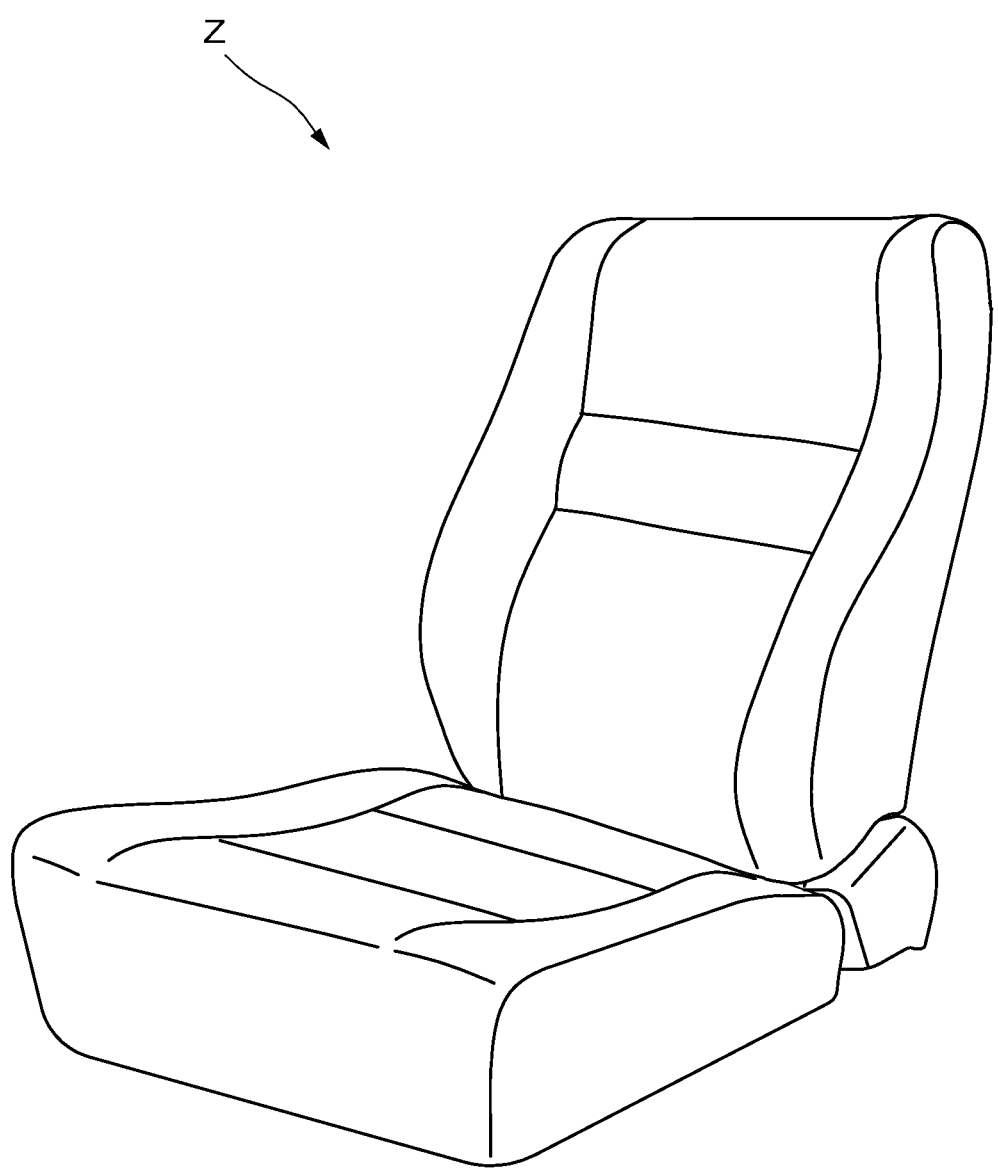
FIG. 1 is a perspective view of a vehicle seat.
Figure 2:
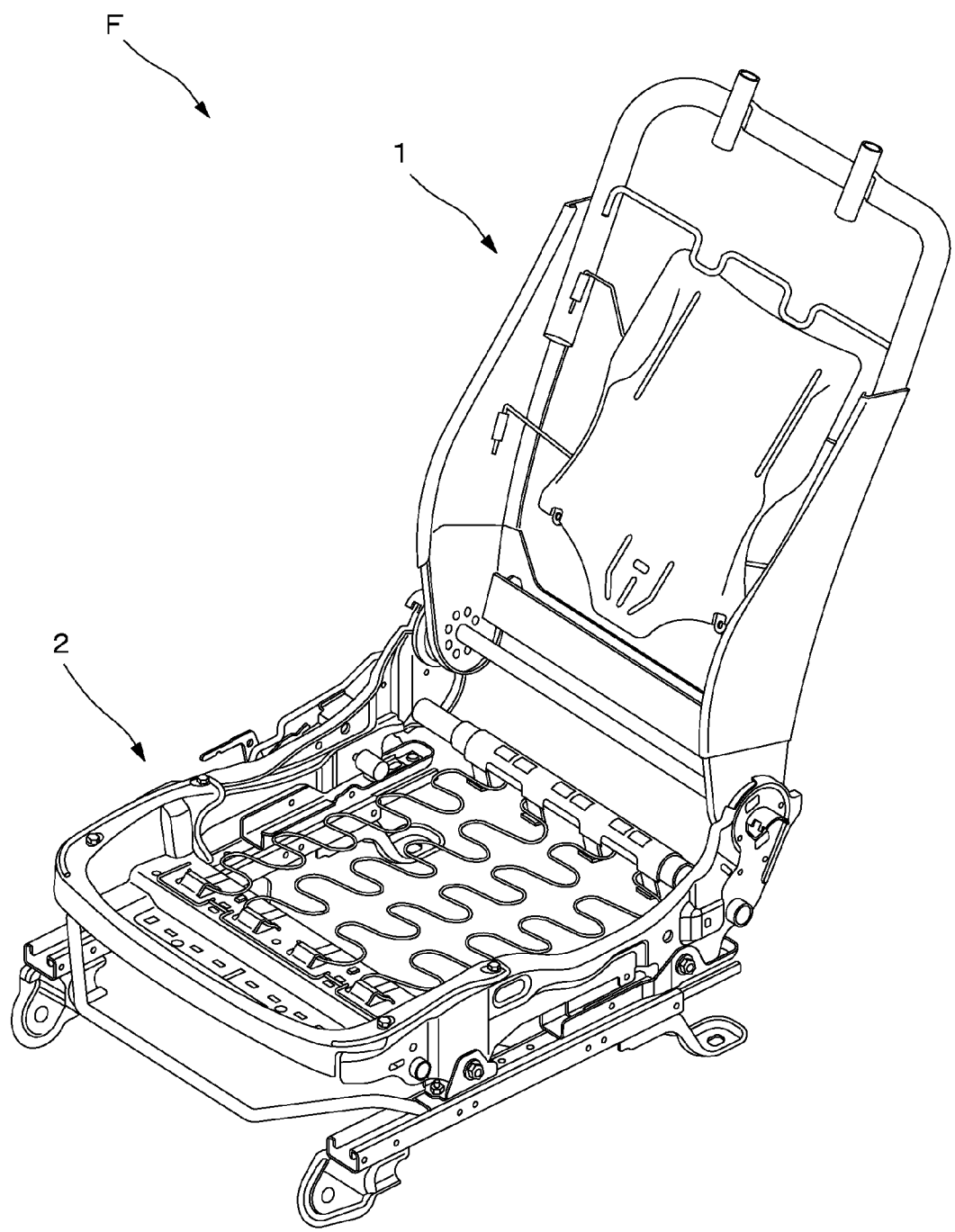
FIG. 2 is a perspective view of a seat frame.

Hereinafter, a support structure for a load measurement sensor according to an embodiment (the embodiment) of the invention will be described by referring to FIGS. 1 to 18. Here, the load measurement sensor of the embodiment is used to measure a load which is generated when a passenger sits on a vehicle seat Z, and in the following description, a support structure for supporting the load measurement sensor to a predetermined member in a predetermined posture will be described.

Furthermore, the sign FR in the drawing indicates the front side of the vehicle, the sign RR indicates the rear side of the vehicle, and the sign UP indicates the upper side of the vehicle. Further, in the following description, the width direction of the vehicle seat Z is a direction which corresponds to the horizontal direction in a state where the vehicle faces the front side.

Further, in FIG. 4, for simplicity of the drawing, a sensor attachment component 40 to be described later is not illustrated.

In the embodiment, a load measurement sensor (hereinafter, a sensor 30) is used to measure the load generated when the passenger sits on the vehicle seat Z as described above. The measurement result is output as an electric signal from the sensor 30 (specifically, a substrate in a substrate unit provided in a sensor body 32), and the output signal is received by a receiving unit (not illustrated). Subsequently, based on the received output signal, it is determined whether a passenger is sitting on the vehicle seat Z or whether the sitting passenger is an adult or a child. Then, the determination result is used as data to control, for example, the expansion or the like of an airbag unit in the event of the collision of the vehicle.

Structure of Vehicle Seat

Figure 3:
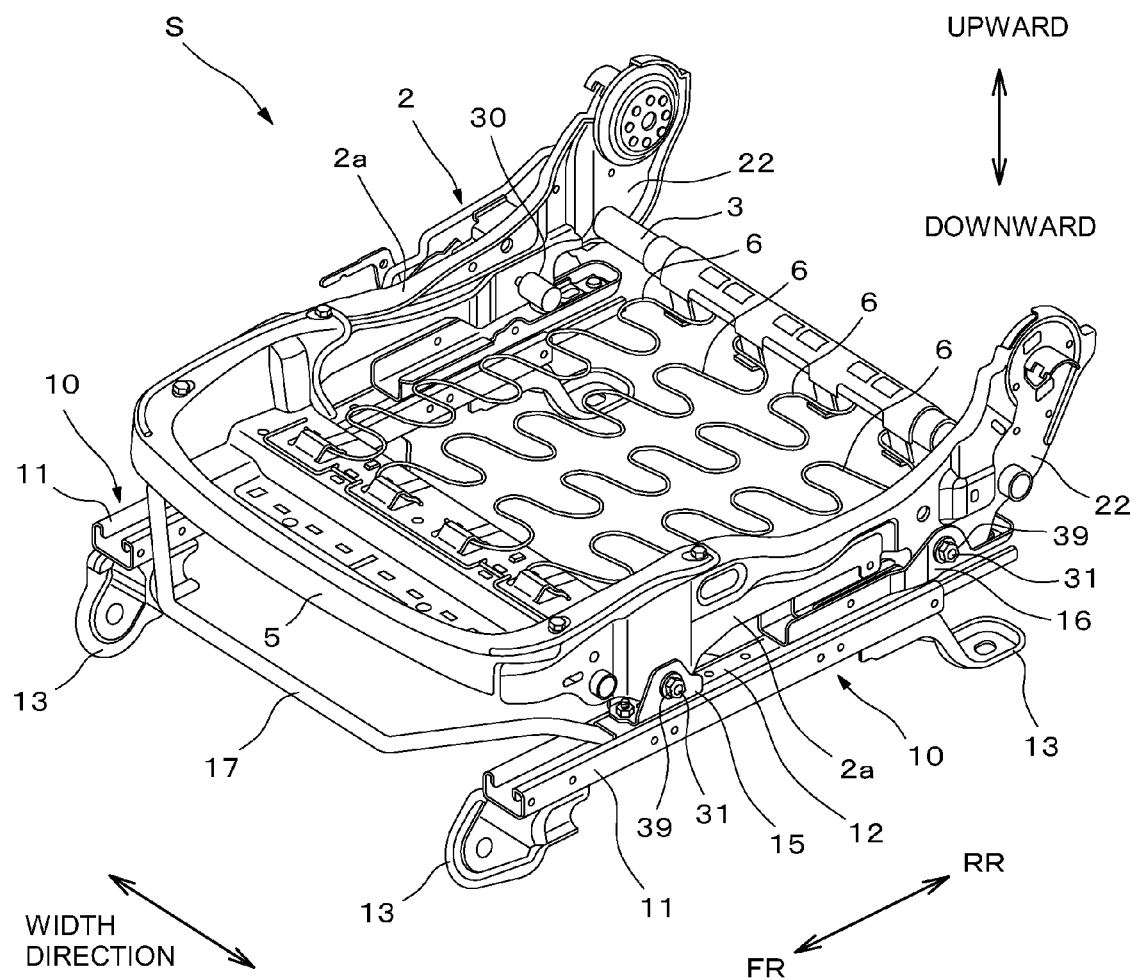
FIG. 3 is a perspective view of a seat unit.

Due to the above-described object, the sensor 30 is supported to a predetermined position of the seat unit S (see FIG. 3). Hereinafter, with the description of the support structure for the sensor 30, the structure of the seat unit S will be first described briefly.

The seat unit S is fixed to a vehicle body floor of a vehicle body (a portion excluding the seat unit S in the vehicle), and includes the vehicle seat Z and a rail mechanism 10. The vehicle seat Z illustrated in FIG. 1 is an example of the seat, and includes a seat frame F (see FIG. 2) as a frame and a cushion body. The seat frame F is formed of a metal material, and includes a seating frame 2 with side frames 2a provided at both ends in the horizontal direction and a seat back frame 1 provided at the rear side thereof.

Each of the side frames 2a constituting the seating frame 2 is a sheet metal member which extends in the front-to-back direction, and the rear end thereof is connected to the seat back frame 1. Further, the side frame 2a which is positioned at one end side (left side) in the horizontal direction and the side frame 2a which is positioned at the other end side (right side) in the horizontal direction are away from each other in the horizontal direction to be parallel to each other. The rear ends of the side frames 2a are connected to each other through a connection pipe 3, and the front ends thereof are connected to each other through a submarine restraining pipe 4 (see FIG. 4).

The submarine restraining pipe 4 is a pipe member which extends from one end to the other end in the width direction of the vehicle seat Z. A transverse center portion 4a and a transverse end 4b of the submarine restraining pipe 4 are arranged in parallel along the width direction, and deviate from each other in the front-to-back direction. In the embodiment, the transverse center portion 4a is positioned at the rear side in relation to the transverse end 4b (for example, see FIG. 15). Here, the positional relation is not limited thereto, and the transverse end 4b may be positioned at the rear side in relation to the transverse center portion 4a. Furthermore, a connection portion 4c may be provided between both the transverse center portion 4a and the transverse end 4b to connect both to each other, and the extension direction of the connection portion 4c is inclined with respect to the width direction.

Further, a plurality of (four in the case illustrated in FIG. 3) S-springs 6 are disposed between the side frames 2a. Each of the S-springs 6 is a support spring which supports a cushion body from the lower side thereof, and extends in the front-to-back direction in a meandering manner. Furthermore, as the respective S-springs 6, the front ends are hung by a hanging portion 5 installed between the side frames 2a and the rear ends are hung by the connection pipe 3 (more specifically, a substantially circular-arc latching member fitted to the connection pipe), where the S-springs are disposed between the side frames 2a. Then, the cushion body is mounted on the hanging portion 5 and the S-spring 6. Furthermore, the structure of the side frame 2a will be described later in detail.

A pair of rail mechanisms 10 is provided, and one (left) rail mechanism 10 and the other (right) rail mechanism 10 are away from each other in parallel in the horizontal direction. Each of the rail mechanisms 10 includes a lower rail 11 which is fixed to the vehicle body floor and an upper rail 12 which engages with the lower rail 11 and slides on the lower rail 11.

Any one of the lower rail 11 and the upper rail 12 as the rail member is provided to make a pair, and the pair extend along the front-to-back direction. The pair of upper rails 12 is arranged in parallel with a gap therebetween in the horizontal direction as illustrated in FIG. 4, and the upper rails 12 are connected to each other by a slide lever 17.

Figure 4:
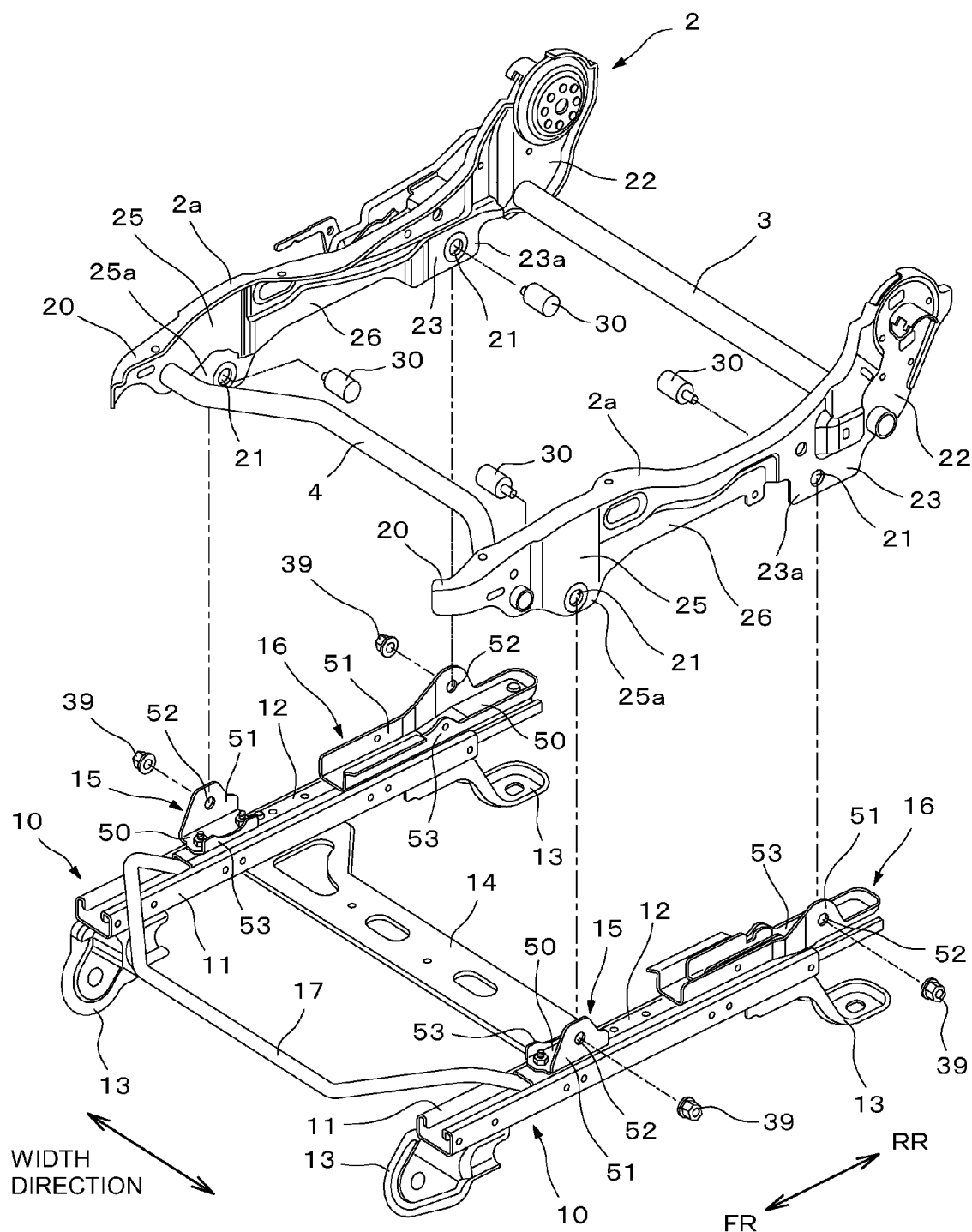
FIG. 4 is an exploded diagram of the seat unit.

On the other hand, the pair of lower rails 11 is arranged in parallel with a gap therebetween in the horizontal direction as illustrated in FIG. 4, and the lower rails 11 are connected to each other by a member frame 14. Further, a fixation bracket 13 is attached to each lower surface of the lower rail 11. The fixation bracket 13 is fastened to the vehicle body floor, so that the lower rail 11 is fixed to the vehicle body floor.

Then, the vehicle seat Z is placed on the respective lower rails 11. More specifically, the upper rail 12 is disposed on the lower rail 11 to be slidable thereon, and attachment brackets 15 and 16 are fixed onto the upper rail 12 through a bolt 18 and a nut which serve as fixation members. The side frame 2a of the vehicle seat Z is connected to the attachment brackets 15 and 16, so that the vehicle seat Z is fixed to the respective upper rails 12. As a result, the vehicle seat Z is placed on the respective lower rails 11. Further, the sensor 30 to be described later is supported by each of the corresponding attachment brackets 15 and 16. That is, in the embodiment, the attachment brackets 15 and 16 correspond to the support brackets.

Furthermore, in a state where the vehicle seat Z is placed on the respective lower rails 11, the side frame 2a which is present at one end side (left side) of the horizontal direction is positioned above the lower rail 11 which is present at one end side (left side) of the horizontal direction, and the side frame 2a which is present at the other side (right side) of the horizontal direction is positioned above the lower rail 11 which is present at the other side (right side) of the horizontal direction. Further, in a state where the vehicle seat Z is placed on the respective lower rails 11, the plurality of S-springs 6 is positioned between the lower rails 11 to be arranged in parallel in the horizontal direction.

Structure of Sensor

Next, the sensor 30 according to the embodiment will be described by referring to FIG. 5.

Figure 5:
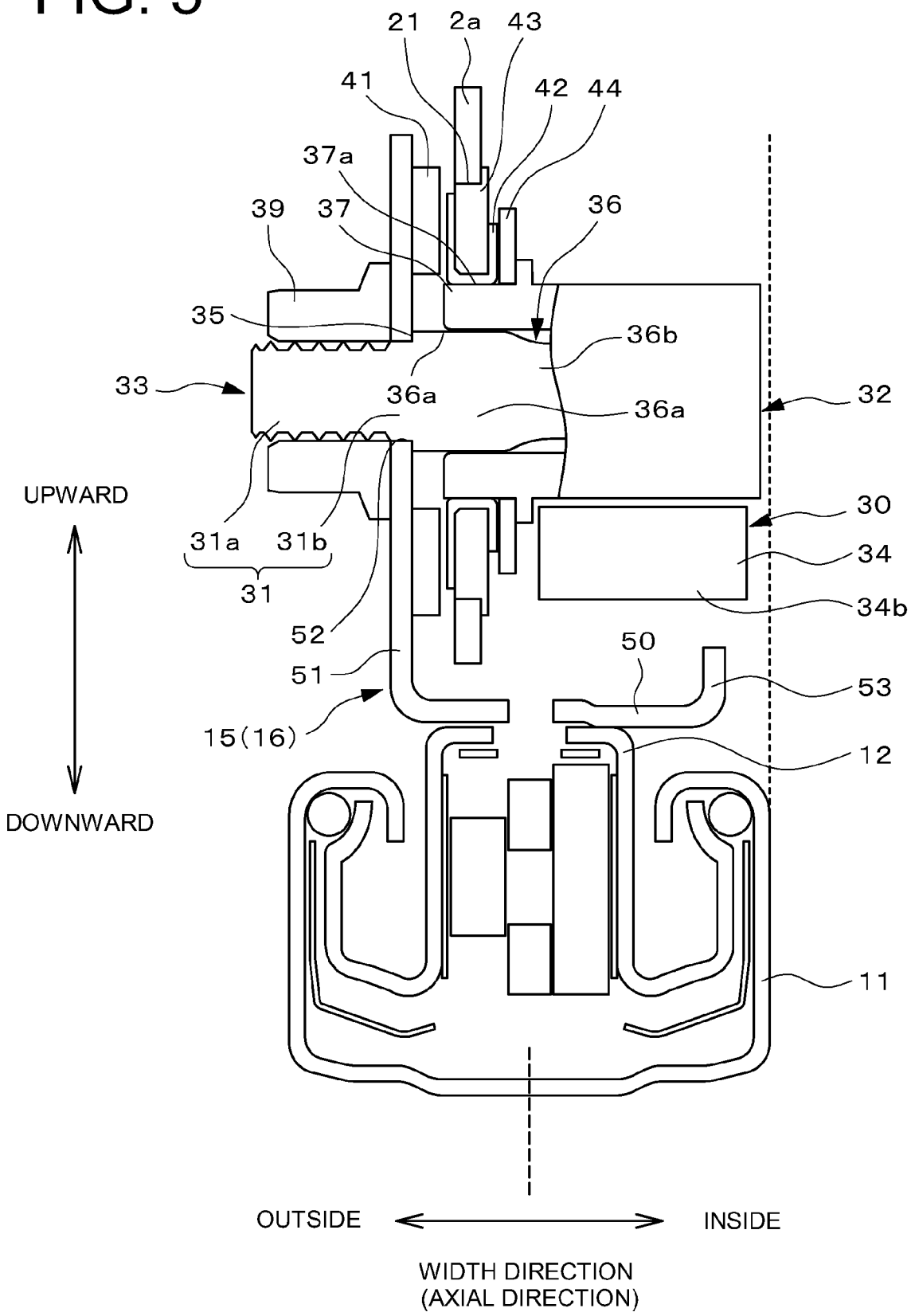
FIG. 5 is a cross-sectional view of the periphery of a load measurement sensor.

The sensor 30 includes, as illustrated in FIG. 5, an extension shaft portion 31, a sensor body 32, and a substrate unit 34 which serves as a conversion unit. In the embodiment, in the metallic shaft body 33 having a male screw formed at one end thereof, the extension shaft portion 31 is formed by the end on the side provided with the male screw. On the other hand, the sensor body 32 is formed by a large diameter portion (specifically, a step to be described later) which is formed in the shaft body, that is, an outer cylindrical body through which the shaft body passes. Furthermore, the shaft body 33 having the extension shaft portion 31 is attached to the outer cylindrical body forming the sensor body 32, and is integrated with the outer cylindrical body.

The extension shaft portion 31 is a bolt-shaped portion which is provided to support the sensor 30 at a predetermined position of the seat unit S, and extends from the side portion of the sensor body 32. Further, the extension shaft portion 31 includes a male screw portion 31a which is formed in one end of the shaft body in the axial direction and an adjacent portion 31b which is adjacent to the male screw portion 31a in the axial direction. The portion which corresponds to the thread ridge of the male screw portion 31a is equal in diameter to the adjacent portion 31b. Furthermore, in the embodiment, it is assumed that the extension shaft portion 31 is provided with the male screw portion 31a, but the extension shaft portion 31 may be provided with a female screw.

The sensor body 32 is a main portion of the sensor 30, and is a portion which detects and measures a load generated when the passenger sits on the vehicle seat Z. The sensor body 32 includes a positioning portion 35 which positions the sensor 30 and a load detection portion 37 which is deformed to detect the load. The positioning portion 35 is a step portion which is adjacent to the adjacent portion 31b at the opposite side to the male screw portion 31a in the shaft body having the extension shaft portion 31. The step portion which forms the positioning portion 35 has an outer diameter slightly larger than that of the male screw portion 31a or the adjacent portion 31b.

The load detection portion 37 is formed by an annular portion which is formed in the end on the side of the opening of the outer cylindrical body. The load detection portion 37 corresponds to a deformation portion, and when a load is applied to the load detection portion 37 along the radial direction (in other words, the radial direction of the extension shaft portion 31) of the annular portion, the load detection portion 37 is deformed (displaced) to be curved in the radial direction. The sensor body 32 detects the deformation amount of the load detection portion 37 by a strain sensor (not illustrated), and measures (calculates) the magnitude of the load from the deformation amount.

Further, the sensor body 32 is equipped with the substrate unit 34 which outputs the measurement result of the load as an electric signal. The substrate unit 34 is provided with a connector portion 34a which is electrically connected to a receiver (not illustrated) that receives the electric signal, and includes a substrate accommodation casing and the like (for example, see FIG. 15) besides the portion (the substrate) which outputs the electric signal. The connector portion 34a horizontally protrudes from the center position on the side surface of the substrate accommodation casing.

In addition, the sensor body 32 includes a portion (hereinafter, an accommodation shaft portion 36) which is accommodated in the outer cylindrical body as a component in the shaft body 33 having the extension shaft portion 31. The accommodation shaft portion 36 includes, as illustrated in FIG. 5, an even diameter portion 36a which is adjacent to the positioning portion 35 in the axial direction of the shaft body and an uneven diameter portion 36b which decreases in diameter compared to the even diameter portion 36a. Furthermore, the outer diameter of the even diameter portion 36a is the largest in the accommodation shaft portion 36, and is slightly smaller than the inner diameter of the annular portion provided with the load detection portion 37.

The sensor 30 with the above-described configuration is supported, as illustrated in FIG. 5, so that the extension shaft portion 31 is positioned at the side portion of the sensor body 32, more specifically, the extension shaft portion 31 follows the horizontal direction. Furthermore, in a state where the sensors 30 is supported at a predetermined position, the annular portion provided with the load detection portion 37 in the sensor 30 is inserted into a hole portion 21 which is formed in the side frame 2a.

Then, when the passenger sits on the vehicle seat Z, the load which is generated at that time is transmitted to the load detection portion 37 of the sensor body 32 through the side frame 2a. Specifically, the side frame 2a is positioned at the outside of the annular portion in the radial direction (the radial direction of the extension shaft portion 31) of the annular portion, and presses the load detection portion 37 inward in the radial direction to transmit the load to the load detection portion 37. Here, the portion which is pressed by the side frame 2a is the upper most portion of the annular portion in the circumferential direction. That is, the load detection portion 37 of the embodiment is the uppermost portion of the annular portion in the circumferential direction. That is, a region which corresponds to the uppermost portion of the outer peripheral surface of the annular portion in the circumferential direction becomes a load receiving surface 37a, and the sensor body 32 detects a load which is generated in the direction (specifically, the downward vertical direction) perpendicular to the load receiving surface 37a.

Furthermore, the even diameter portion 36a of the accommodation shaft portion 36 which has an inner diameter slightly smaller than that of the annular portion is disposed at the inside of the annular portion in the radial direction (see FIG. 5). Accordingly, when the load detection portion 37 is curved in the radial direction (the downward vertical direction) of the annular portion by the load which is generated when the passenger sits on the vehicle seat Z, the load detection portion 37 is curved in the range until it comes into contact with the even diameter portion 36a, and the curved amount is regulated so that the load detection portion is not excessively curved. That is, in the embodiment, the even diameter portion 36a corresponds to a regulation portion which regulates a deformation amount of the load detection portion 37 when the load detection portion is deformed, and regulates the deformation amount in a manner such that the even diameter portion comes into contact with the load detection portion 37.

The even diameter portion 36a which serves as the regulation portion is disposed at a position present at the load center point in the axial direction of the extension shaft portion 31 when the vehicle seat Z applies a load to the load detection portion 37 through the side frame 2a. Here, the load center point is a point where the largest load concentrates in the sensor body 32 when the sensor body 32 (specifically, the load detection portion 37) receives a load from the vehicle seat Z. In the embodiment, the load center point is present inside the load receiving surface 37a to be described later, and is generally positioned at the center position of the load receiving surface 37a in the axial direction of the extension shaft portion 31.

Since the even diameter portion 36a which serves as the regulation portion is provided at the above-described position, the even diameter portion 36a receives a portion corresponding to the load center point of the load detection portion 37. As a result, the load detection portion 37 is inhibited from being excessively deformed by a biased load or the like, so that the sensor 30 may stably measure the load.

Further, in the embodiment, as illustrated in FIG. 5, the length of the even diameter portion 36a in the axial direction of the extension shaft portion 31 is larger than the length (thickness) of the side frame 2a in the same direction. That is, the even diameter portion 36a is present in the range where the load detection portion 37 is pressed by the side frame 2a in the axial direction. Accordingly, the even diameter portion 36a receives the load detection portion 37 throughout the range where the load detection portion is pressed by the side frame 2a, thereby performing the further stable load measurement.

In addition, in the even diameter portion 36a, a region which regulates the deformation of the annular portion is positioned at the center portion of the even diameter portion 36a in the axial direction of the extension shaft portion 31, and regions which are positioned at both sides thereof serve as a foreign matter intrusion inhibiting portion which inhibits foreign matter from intruding between the annular portion and the accommodation shaft portion 36. In this way, since the regulation portion which regulates the excessive deformation of the annular portion and the foreign matter intrusion inhibiting portion which inhibits foreign matter from intruding between the annular portion and the accommodation shaft portion 36 are formed in a single member, the number of components may be decreased compared to a case where the regulation portion and foreign matter intrusion inhibiting portion are respectively formed as separate members.

Structure for Supporting Sensor

The above-described sensor 30 serves as, as illustrated in FIG. 5, a connection member which connects the side frame 2a and the attachment brackets 15 and 16 to each other, and when the sensor 30 is supported at a predetermined position in a predetermined posture, the side frame 2a is connected to the attachment brackets 15 and 16, and the vehicle seat Z is fixed to the respective upper rails 12. In other words, the sensor 30 is supported on the side frame 2a and the attachment brackets 15 and 16.

Hereinafter, the support structure for the sensor 30 will be described. Here, since the vehicle seat Z of the embodiment has a substantially bisymmetrical shape, in the following description, only the configuration of one end side (left side) of the width direction of the vehicle seat Z will be described.

Furthermore, in the following description, among the pair of rail members (for example, the lower rails 11), one of them will be referred to as a first rail member, and the other thereof will be referred to as a second rail member. Here, the first rail member and the second rail member have a relative concept, and when one rail member is set as the first rail member, the other rail member (that is, the other rail member which is disposed in parallel to the first rail member along the width direction of the vehicle seat Z) becomes the second rail member. For example, when the left (right) rail member is set as the first rail member, the right (left) rail member becomes the second rail member.

Further, for convenience of description, the side of the second rail member in the width direction of the vehicle seat Z when seen from the first rail member is referred to as the inside, and the side of the second rail member when seen from the first rail member is referred to as the outside.

With the description of the support structure for the sensor 30, the structure of the side frame 2a and the attachment brackets 15 and 16 will be described by referring to FIGS. 6 to 8.

First, the structure of the side frame 2a will be described. The side frame 2a is formed by processing an elongated sheet metal, and a front end 20 is curved inward to define the front end of the vehicle seat Z. Further, a circular hole portion 21 which supports the sensor 30 is provided at the position slightly in rear of the front end of the side frame 2a and is provided at a position slightly on the front side in relation to the rear end. The annular portion provided with the load detection portion 37 in the sensor 30 is inserted through the hole portion 21. Furthermore, in the embodiment, in order to widen the length (the length of the axial direction of the extension shaft portion 31) of the portion of the side frame 2a through which the annular portion is inserted, a bush 43 (see FIG. 9) to be described later is fitted into the hole portion 21.

Figure 6:
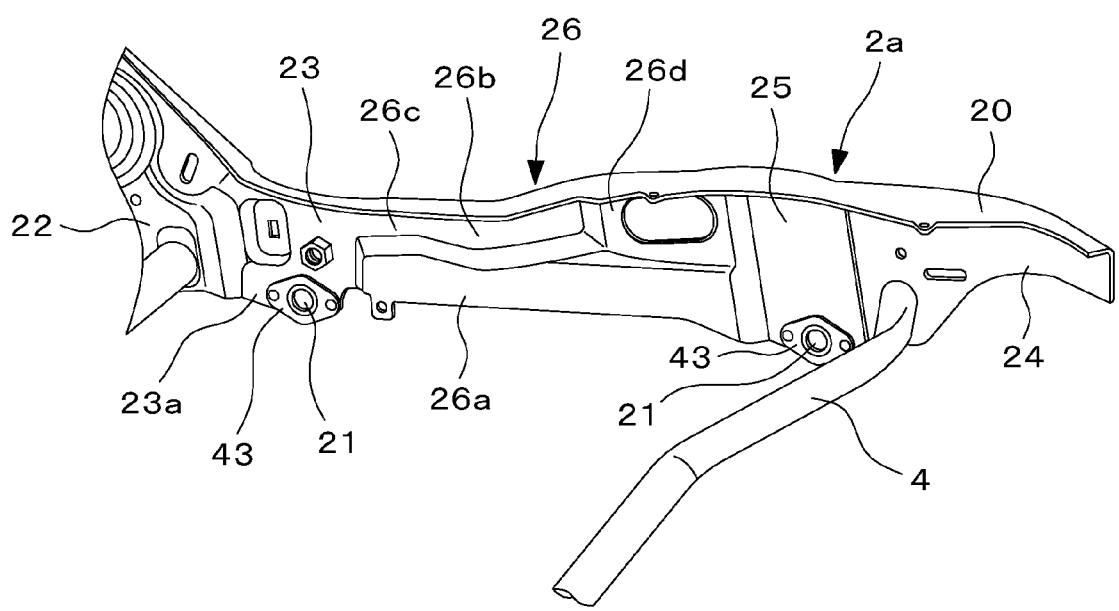
FIG. 6 is a perspective view illustrating an inner surface of a side frame.
Figure 7:
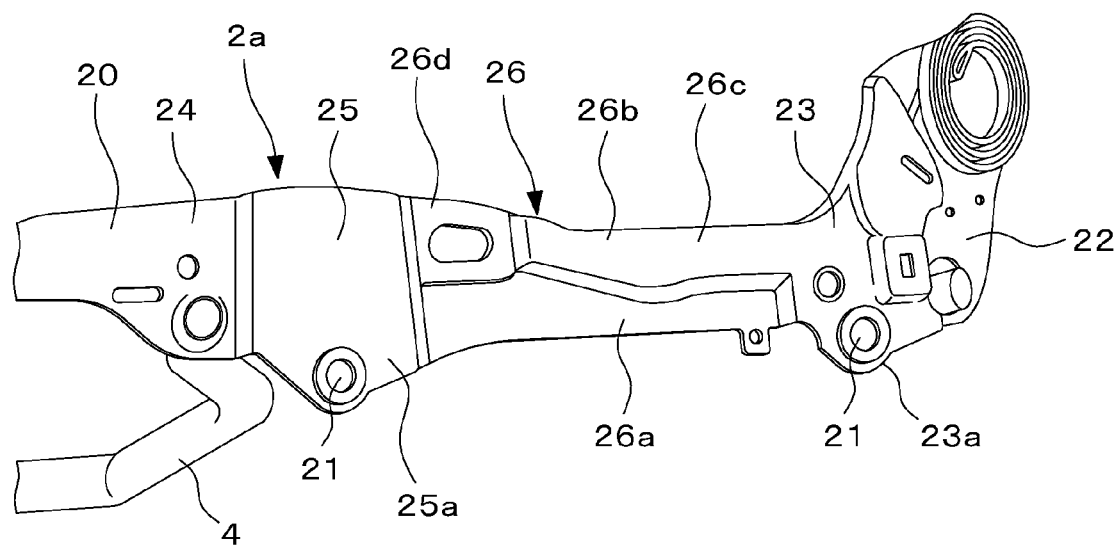
FIG. 7 is a perspective view illustrating an outer surface of the side frame.

Further, as illustrated in FIGS. 6 and 7, a predetermined region of the side frame 2a is depressed inward and the other region protrudes outward. More specifically, in the side frame 2a, a connection region 22 (that is, a rear end) which serves as a connection portion connected to the seat back frame 1 is positioned at the innermost side (in other words, the nearest position to the second rail member in the width direction of the vehicle seat Z) in the side frame 2a. A region (hereinafter, a rear attachment region 23) which is positioned at the front side in relation to the connection region 22 and corresponds to the protrusion portion provided with the rear hole portion 21 slightly protrudes outward in relation to the connection region 22, and particularly protrudes further outward in relation to the portion positioned near the boundary of the connection region 22 as illustrated in FIG. 7.

On the other hand, a region (hereinafter, a front attachment region 25) which is positioned in rear of the region (the front end region 24) corresponding to the front end of the side frame 2a and corresponds to the protrusion portion provided with the front hole portion 21 is positioned at the outside in relation to the front end region 24. Further, the front attachment region 25 is positioned at the outside in relation to the connection region 22 which is positioned at the innermost side in the side frame 2a.

With regard to a region (an intermediate region 26) which is positioned between the front attachment region 25 and the rear attachment region 23 in the front-to-back direction in the side frame 2a, a lower portion 26a is depressed inward. On the other hand, a rear adjacent portion 26c which is adjacent to the rear attachment region 23 in an upper portion 26b of the intermediate region 26 protrudes outward to an extent which is almost equal to that of the rear attachment region 23, and a front adjacent portion 26d which is adjacent to the front attachment region 25 is slightly depressed inward in relation to the front attachment region 25.

As described above, in the embodiment, when the outer surface of the connection region 22 in the side frame 2a is set as a reference surface, the rear attachment region 23 and the front attachment region 25 provided with the hole portion 21, that is, the region in which the sensor 30 is supported protrude outward in relation to the reference surface.

In other words, in the side frame 2a which is positioned on the side of the first rail member, the hole portion 21 is formed in a region which is away from the second rail member in relation to the connection region 22 in the width direction of the vehicle seat Z. In addition, in the side frame 2a which is positioned on the side of the first rail member, it may be understood that the hole portion 21 is formed in a region which is further away from the second rail member in the width direction of the vehicle seat Z among two regions which are adjacent to each other in the side frame 2a.

Furthermore, in the embodiment, it is assumed that a part (for example, the rear adjacent portion 26c of the intermediate region 26) of a region other than the rear attachment region 23 and the front attachment region 25 provided with the hole portion 21 also protrudes outward in relation to the reference surface. Here, the invention is not limited thereto, and only the region provided with the hole portion 21, that is, the region where the sensor 30 is supported may protrude outward in relation to the reference surface.

In addition, as illustrated in FIG. 7, the lower portion of the rear attachment region 23 is provided with a protrusion portion 23a which protrudes in a substantially inverse triangular shape. Similarly, the lower portion of the front attachment region 25 is also provided with a protrusion portion 25a which protrudes in a substantially inverse triangular shape. That is, as for the rear attachment region 23 and the front attachment region 25 in the side frame 2a, the length in the vertical direction increases by the amount corresponding to the protrusion portions 23a and 25a compared to the other region. Then, the protrusion portions 23a and 25a are provided with the hole portion 21.

Next, the attachment brackets 15 and 16 will be described. The attachment brackets 15 and 16 are formed separately from the upper rail 12, extend along the front-to-back direction of the vehicle seat Z, and are fixed to the upper surface of the upper rail 12 by the bolt 18 as an example of the fastening member.

In the embodiment, the plurality of attachment brackets 15 and 16 is attached to the upper rail 12 in the length direction (in other words, the front-to-back direction of the vehicle seat Z). Then, the sensor 30 is supported by the respective attachment brackets 15 and 16. That is, in the embodiment, a plurality of sensors 30 may be provided in different positions in the front-to-back direction of the vehicle seat Z. Particularly, in the embodiment illustrated in the specification, the respective sensors 30 are provided on the front and rear sides of the vehicle seat Z in the respective ends of the width direction of the vehicle seat Z (that is, four sensors 30 are attached to the vehicle seat Z in total).

Then, the attachment brackets 15 and 16 and the support structure for supporting the load measurement sensor to the attachment brackets 15 and 16 are respectively provided at individual sensors 30. Specifically, the attachment bracket 15 is provided for the front sensor 30, and the attachment bracket 16 is provided for the rear sensor 30.

The attachment bracket 15 for the front sensor 30 and the attachment bracket 30 for the rear sensor 30 have different lengths in the length direction of the upper rail 12, but have substantially the same basic structure. Accordingly, hereinafter, only the structure of the attachment bracket 15 of the front sensor 30 will be described.

Figure 8:
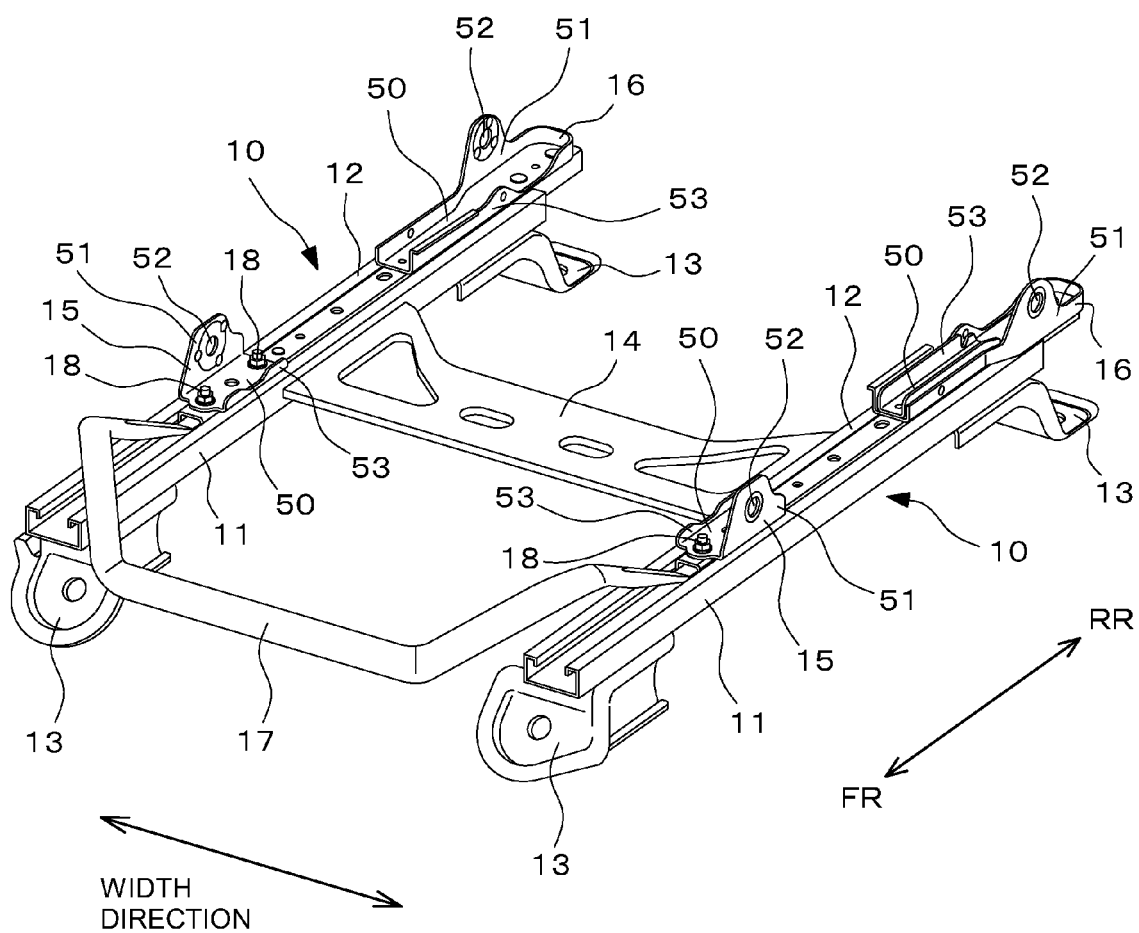
FIG. 8 is a perspective view illustrating a rail mechanism.

The attachment bracket 15 is formed, as illustrated in FIG. 8, a substantially U-shape when seen from the front side of the front-to-back direction of the vehicle seat Z, and the transverse center thereof is fixed to the upper surface of the upper rail 12 to overlap the transverse center of the upper rail 12. Furthermore, as described above, the attachment bracket 15 is fixed to the upper surface of the upper rail 12 through the bolt 18 serving as the fastening member. Here, a bottom wall portion 50 of the attachment bracket 15 is provided with a bolt hole (not illustrated) through which the bolt 18 is inserted. The bolt hole is formed as an elongated hole (a long hole) along the length direction (the front-to-back direction of the vehicle seat Z) of the upper rail 12.

For this reason, at the time of fixing the attachment bracket 15 onto the upper rail 12, the bolt 18 is inserted into the bolt hole to be temporarily assembled in the nut, and then the attachment bracket 15 may be moved along the length direction of the upper rail 12. Thus, in the embodiment, the fixation position of the attachment bracket 15 in the upper rail 12 serving as the rail member may be adjusted along the length direction of the upper rail 12. Accordingly, the fixation position of the attachment bracket 15 may be easily adjusted with high precision.

Furthermore, the bolt hole is not limited to the elongated hole along the length direction of the upper rail 12. For example, the bolt hole may have a size in which the fixation position of the attachment bracket 15 is adjustable. In such a size, a true circular hole may be used.

The attachment bracket 15 includes an upright wall portion 51 which is formed upright in a substantially perpendicular direction from the outer end of the bottom wall portion 50 in the width direction of the vehicle seat Z. In other words, the bottom wall portion 50 is a portion which intersects the upright wall portion 51 in the attachment bracket 15 and comes into contact with the upright wall portion 51 in one end (the outer end) in the width direction of the vehicle seat Z.

The upright wall portion 51 is formed in a substantially triangular shape, and is formed from the front end of the bottom wall portion 50 toward the rear end thereof. Further, in the substantially triangular upright wall portion 51, the portion corresponding to the apex is provided with an insertion hole 52 into which the extension shaft portion 31 is inserted when supporting the sensor 30 as illustrated in FIG. 8. The insertion hole 52 is formed as a penetration hole which is formed along the thickness direction of the attachment bracket 15, thereby checking the support state of the sensor 30 (particularly, the positioning state of the sensor 30 in the width direction of the vehicle seat Z).

In addition, the attachment bracket 15 includes an upward protrusion wall 53 which protrudes upward from the inner end of the bottom wall portion 50 in the width direction of the vehicle seat Z. As described above, the upward protrusion wall 53 is provided at a position facing the upright wall portion 51 to contact the bottom wall portion 50 in the inner end (that is, the other end opposite to one end where the upright wall portion 51 is positioned) in the width direction of the bottom wall portion 50 and to intersect the bottom wall portion 50.

Since the attachment bracket 15 is provided with the upward protrusion wall 53, the rigidity of the attachment bracket 15 is improved. As a result, the support rigidity of the sensor 30 (the rigidity of the portion supporting the sensor 30) is improved, so that the precision of the load measurement using the sensor 30 may be improved. Furthermore, the upward protrusion wall 53 according to the embodiment is substantially perpendicular to the bottom wall portion 50, but the invention is not limited thereto. For example, the upward protrusion wall 53 may protrude to intersect the bottom wall portion 50 at an inclination forming an obtuse angle with respect thereto.

The upward protrusion wall 53 is formed (extends) from the front end of the bottom wall portion 50 toward the rear end thereof in the front-to-back direction of the vehicle seat Z, and the upper portion of the portion which is present at the same position as that of the insertion hole 52 in the front-to-back direction is notched and removed. In this way, the upward protrusion wall 53 includes a removed portion 54 which is formed at the same position as that of the insertion hole 52 in the front-to-back direction.

Figure 9:
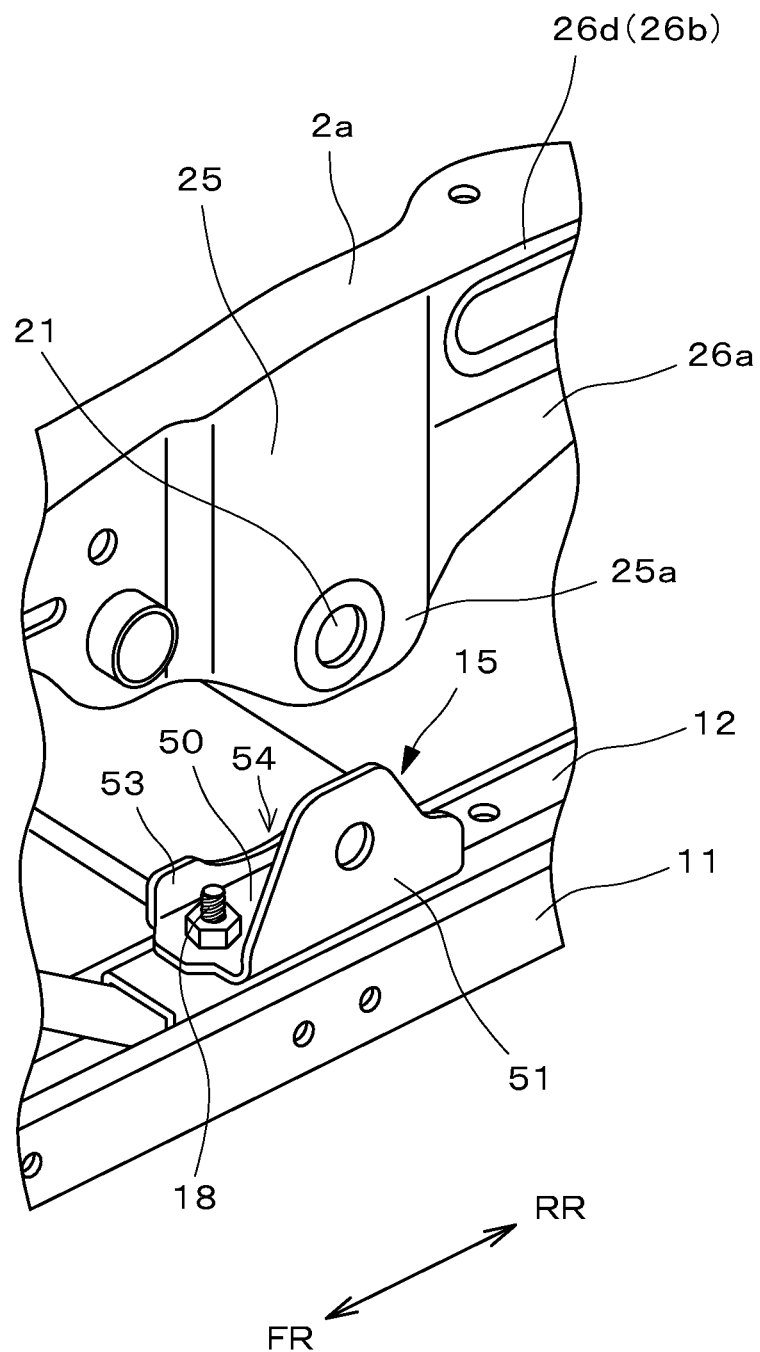
FIG. 9 is a diagram illustrating a state where an attachment bracket and a side frame are connected to each other.

The side frame 2a and the attachment brackets 15 and 16 are connected to each other by the supporting of the sensor 30. Specifically, as illustrated in FIG. 9, the vehicle seat Z is placed on the pair of rail mechanisms 10 (that is, the first rail member and the second rail member) so that the side frame 2a is positioned on the inside of the upright wall portions 51 of the attachment brackets 15 and 16. At this time, the insertion holes 52 which are formed in the attachment brackets 15 and 16 may overlap the hole portions 21 formed in the side frame 2a. More specifically, the insertion hole 52 of the front attachment bracket 15 may overlap the hole portion 21 of the front attachment region 25 of the side frame 2a, and the insertion hole 52 of the rear attachment bracket 16 may overlap the hole portion 21 of the rear attachment region 23 of the side frame 2a.

In a state where two holes (the insertion hole 52 and the hole portion 21) overlap each other, the sensor 30 is inserted into each of two holes from the extension shaft portion 31. Then, the sensor 30 is inserted until the positioning portion 35 of the sensor 30 comes into contact with the inner surfaces of the upright wall portions 51 of the attachment brackets 15 and 16. Accordingly, the sensor 30 is positioned in the width direction of the vehicle seat Z.

Then, at a time point at which the sensor 30 is positioned, the annular portion provided with the load detection portion 37 in the sensor 30 is fitted to a hole portion 21 of the side frame 2a, the male screw portion 31a of the extension shaft portion 31 protrudes outward in relation to the outer surfaces of the upright wall portions 51 of the attachment brackets 15 and 16, and the adjacent portions 31b is fitted to the insertion hole 52 of each of the corresponding attachment brackets 15 and 16.

Subsequently, a nut 39 which serves as a fastening member is threaded into the male screw portion 31a which protrudes from the outer surface of the upright wall portion 51, so that the sensor 30 is supported at a predetermined position. In such a state, the sensor 30 takes an orientation in which the axial direction of the extension shaft portion 31 follows the horizontal direction. That is, in the embodiment, the sensor 30 is supported in a cantilevered state (a state where one end is a fixed end fixed to each of the corresponding attachment brackets 15 and 16 and the other end is formed as an unfixed free end) with an orientation in which the extension shaft portion 31 follows the horizontal direction. Furthermore, in the embodiment, a configuration is illustrated in which the sensor 30 is supported in a cantilevered state, but may be supported in a both-end supported state in which both ends in the axial direction are supported.

Furthermore, in the embodiment, the insertion hole 52 is provided at a position deviated from a maximum load position to which the largest load is applied in the axial direction of the extension shaft portion 31. Here, the maximum load position is a position which corresponds to the load center point. Accordingly, the sensor 30 is stably supported by each of the corresponding attachment brackets 15 and 16.

Then, when the passenger sits on the vehicle seat Z in a state where the sensor 30 is disposed at the above-described position, the load is applied to the load detection portion 37 of the sensor 30 through the side frame 2a. Specifically, the load generated when the passenger sits on the vehicle seat Z is a load which is directed downward in the vertical direction. When the load is generated, the side frame 2a presses the annular portion (the portion provided with the load detection portion 37) inserted into the hole portion 21 against the inner peripheral surface of the hole portion 21. Accordingly, when the load detection portion 37 is deformed to be curved inward in the radial direction of the extension shaft portion 31, the load is detected, and the magnitude is measured.

As described above, when the sensor 30 is supported at the above-described position in a posture in which the extension shaft portion 31 follows the horizontal direction, the load may be measured by the sensor 30. In other words, the position of supporting the sensor 30 is a position where the load may be measured by the sensor 30, and specifically, the position of the sensor 30 illustrated in FIG. 5. Furthermore, the support position of the embodiment is positioned above the first rail member (that is, the lower rail 11 which is near when seen from the sensor 30).

Figure 10:
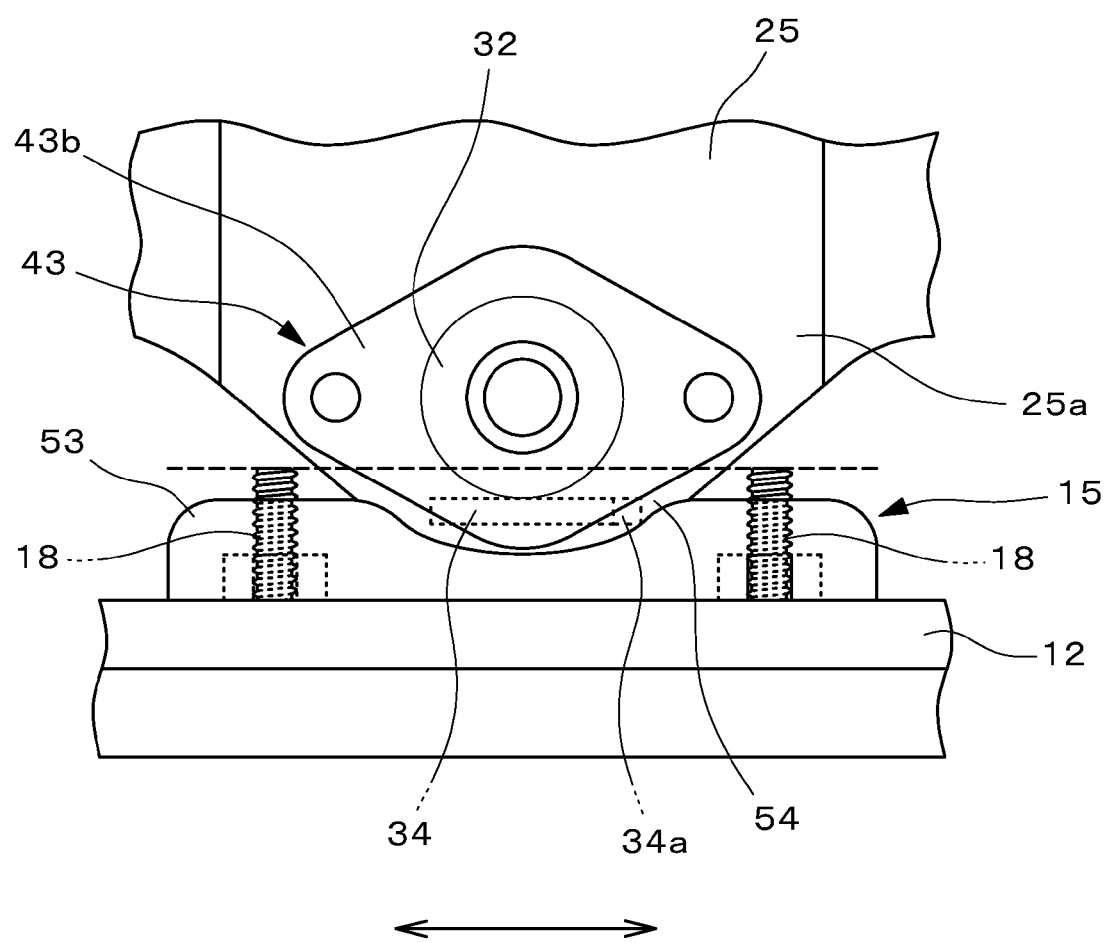
FIG. 10 is a diagram when the load measurement sensor which is supported at a predetermined position is seen from the side thereof.

The support structure for the sensor 30 will be further described. In each of the corresponding attachment brackets 15 and 16, the inner end in the width direction may be provided with the upward protrusion wall 53, and in the upward protrusion wall 53, the removed portion 54 is formed at the same position as that of the insertion hole 52 in the front-to-back direction of the vehicle seat Z. Then, in the embodiment, as illustrated in FIG. 10, the position of supporting the sensor 30 is identical to the position of forming the removed portion 54. With this configuration, in the embodiment, the sensor 30 may be easily supported.

More specifically, the sensor 30 is inserted into the insertion hole 52 and the hole portion 21 which may overlap each other from the inside of each of the corresponding attachment brackets 15 and 16, and more specifically, the installation side of the upward protrusion wall 53. On the other hand, the removed portion 54 is provided at the same position as that of the sensor 30 in the front-to-back direction. Here, the removed portion 54 is a portion which is formed by removing a part of the upward protrusion wall 53 to expose the sensor 30 with respect to the inner space in relation to the upward protrusion wall 53.

Then, since the removed portion 54 is provided, the sensor 30 accesses the hole portion 21 through the removed portion 54 during the support operation. That is, since the upward protrusion wall 53 is not present in the course when the sensor 30 moves from the inside of the upward protrusion wall 53 toward the support position, the sensor 30 may be smoothly moved to the support position. Furthermore, in the embodiment, the removed portion 54 is formed by notching the upper portion of the portion of the upward protrusion wall 53 which is the same as that of the insertion hole 52 in the front-to-back direction of the vehicle seat Z. Here, the invention is not limited thereto. For example, a penetration hole (not illustrated) having a size sufficient for the passage of the sensor 30 when moving the sensor 30 toward the support position may be formed in the upward protrusion wall 53.

Further, the setting position of a bolt 18 which fixes each of the corresponding attachment brackets 15 and 16 to the upper surface of the upper rail 12 is deviated from the removed portion 54 in the front-to-back direction. The fastening member (the bolt 18) which fixes each of the corresponding attachment brackets 15 and 16 is set to a position (specifically, before and after the sensor 30) deviated from the sensor 30 in the front-to-back direction. Accordingly, the interference between the sensor 30 (precisely, the sensor body 32) and the bolt 18 is suppressed, so that the position of supporting the sensor 30 may be shifted to the lower side.

In addition, when the sensor 30 is supported at the support position, the lower surface of the sensor 30 is positioned below the upper surface (depicted by the dotted line of FIG. 10) of the bolt 18 set to the upper surface of the first rail member as illustrated in FIG. 10. Accordingly, the space for supporting the sensor 30 may be made to be further compact in size.

Further, in the embodiment, when the insertion holes 52 formed in the attachment brackets 15 and 16 respectively overlap the hole portions 21 formed in the side frame 2a, as illustrated in FIG. 9, the substantially triangular upright wall portions 51 provided with the insertion holes 52 may overlap the substantially inverse triangular protrusion portions 23a and 25a provided with the hole portions 21. As a result, the space around the bolts 18 set before and after the sensor 30 is easily ensured, and the workability is improved. In addition, the upright wall portion 51 is formed in a substantially triangular shape, the protrusion portions 23a and 25a are formed in a substantially inverse triangular shape, and the peripheries of the respective bonding portions (specifically, the portion forming the insertion hole 52 or the hole portion 21) are notched. As a result, a further decrease in weight may be realized, and the sensor support state may be easily seen.

Furthermore, as described above, the upward protrusion walls 53 of the attachment brackets 15 and 16 are provided with the removed portion 54 serving as a notch formed in the same position as that of the sensor 30 in the front-to-back direction of the vehicle seat Z. As a result, the upright wall portions 51 of the attachment brackets 15 and 16 may easily overlap the protrusion portions 23a and 25a of the side frame 2a. That is, when the removed portion 54 is formed by notching the upward protrusion wall 53, the operation of supporting the sensor 30 is easily performed, and the assembly of the seat unit S (the assembly of the vehicle seat Z with respect to the rail mechanism 10) is also easily performed.

On the other hand, as described above, when supporting the sensor 30, the sensor 30 is inserted into two holes (the insertion hole 52 and the hole portion 21) overlapping each other from the extension shaft portion 31, and at a time point in which the positioning portion 35 of the sensor 30 comes into contact with the upright wall portions 51 of the attachment brackets 15 and 16, the sensor 30 is positioned in the width direction of the vehicle seat Z.

On the other hand, at a time point in which the sensor 30 is positioned in the vehicle seat width direction, the adjacent portion 31b of the extension shaft portion 31 is fitted into each insertion hole 52 of the attachment brackets 15 and 16, but the sensor 30 is rotatable with respect to the attachment brackets 15 and 16 about the extension shaft portion 31. Then, when the sensor 30 rotates with respect to the attachment brackets 15 and 16, the load detection portion 37 and the load receiving surface 37a move in the rotation direction, so that the load transmitted from the side frame 2a may not be appropriately received.

Therefore, in the embodiment, the insertion hole 52 formed in each of the corresponding attachment brackets 15 and 16 is not formed in a true circular shape, but is formed in a shape in which one end in the radial direction is cut out, so that a part of the inner peripheral surface of the insertion hole 52 becomes a flat surface. Further, the extension shaft portion 31 also has a shape in which one end in the radial direction is cut out, and a part of the peripheral surfaces of the male screw portion 31a and the adjacent portion 31b are formed as a flat surface. With such a configuration, even when the sensor 30 unintentionally rotates with respect to the attachment brackets 15 and 16, the edge of the cut portion of the extension shaft portion 31 comes into contact with the portion which is cut into a flat surface in the inner peripheral surface of the insertion hole 52, so that the relative rotation of the sensor 30 is stopped, and the relative rotation of the sensor 30 may be inhibited within a predetermined rotation angle.

Sensor Attachment Component

In a state where the sensor 30 is supported at the support position, the periphery of the annular portion provided with the sensor body 32, and particularly, the load detection portion 37, is provided with the sensor attachment component 40 as illustrated in FIG. 5. The sensor attachment component 40 is a component which is used to dispose the sensor 30 at the support position to perform the satisfactory load measurement. Hereinafter, each sensor attachment component 40 will be described by referring to FIGS. 11 to 13.

Figure 11:
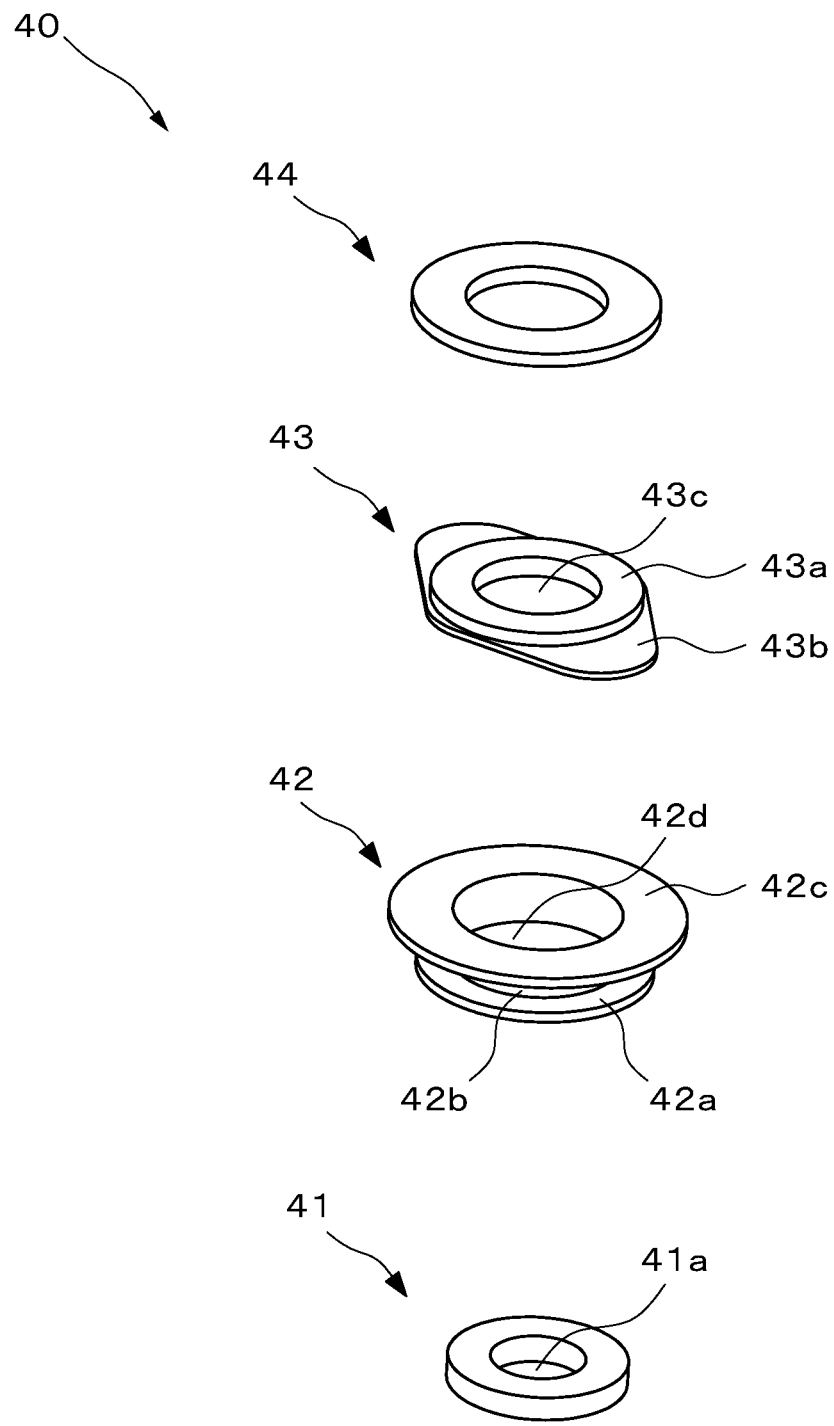
FIG. 11 is a component diagram illustrating respective sensor attachment components.

With regard to the sensor attachment components 40, as illustrated in FIG. 11, a spacer 41 serving as a movement restriction portion or a movement restriction member, a sliding member 42 serving as a contact portion or a load input member, a bush 43 serving as a load transmission portion or a load transmission member, and a washer 44 serving as a movement regulation portion are sequentially arranged from the outside in the width direction of the vehicle seat Z. In the embodiment, among the sensor attachment components 40, the bush 43 is attached to the side frame 2a, and the sliding member 42 is also attached to the side frame 2a through the bush 43. That is, in the embodiment, the side frame 2a serves as an attachment member.

The bush 43 serving as the load transmission portion or the load transmission member is provided to transmit the load from the seat frame F provided in the vehicle seat Z to the sensor 30. The bush 43 is a member which is made of a hot-rolled steel sheet (SPHC), and as illustrated in FIG. 11, a cylindrical portion 43a serving as a small diameter portion and a substantially rhombic flange portion 43b serving as a large diameter portion are adjacent to each other in the thickness direction. Furthermore, in FIG. 12, in order to describe the cylindrical portion 43a and the flange portion 43b, the bush 43 is depicted by the divided dashed line. That is, the bush 43 is formed so that the flange portion 43b extends outward in the radial direction from one end of the cylindrical portion 43a in the axial direction. At the center position of the bush 43, a penetration hole 43c is formed to penetrate both the cylindrical portion 43a and the flange portion 43b. The diameter of the penetration hole 43c is slightly larger than the outer diameter of the annular portion provided with the load detection portion 37 of the sensor 30. As for the cylindrical portion 43a, the thickness is substantially equal to the thickness of the side frame 2a (specifically, the rear attachment region 23 or the front attachment region 25) and the outer diameter is substantially equal to the diameter of the hole portion 21.

Further, the thickness of the flange portion 43b is formed to be smaller than the width (more specifically, the enlarged width at the outside of the seat width direction in relation to the connection region 22) in which the front attachment region 25 (or the rear attachment region 23) provided in the side frame 2a protrudes in the seat width direction. In addition, the outer diameter of the flange portion 43b is formed in a size which is settled in the range of the front attachment region 25 (or the rear attachment region 23) in the front-to-back direction when the vehicle seat Z is seen from the side portion thereof.

With the above-described configuration, when the bush 43 is attached to the side frame 2a, the flange portion 43b of the bush 43 is disposed at the inside of the enlarged portion (the concave portion at the inside in the seat width direction) of the front attachment region 25 (or the rear attachment region 23). For this reason, there is no need to increase the entire width of the seat to attach the bush 43, and the bush 43 may be attached in a compact space.

In the bush 43 in which the cylindrical portion 43a and the flange portion 43b are adjacent to each other, the flange portion 43b is disposed to be positioned at the inside in the seat width direction in relation to the cylindrical portion 43a. With such a configuration, since the side frame 2a is disposed at the outside in the seat width direction by the thickness of the flange portion 43b, it is easy to ensure a space for attaching a member (for example, a safety belt or the like) other than the member disposed at the inside of the side frame 2a in the seat width direction.

Figure 12:
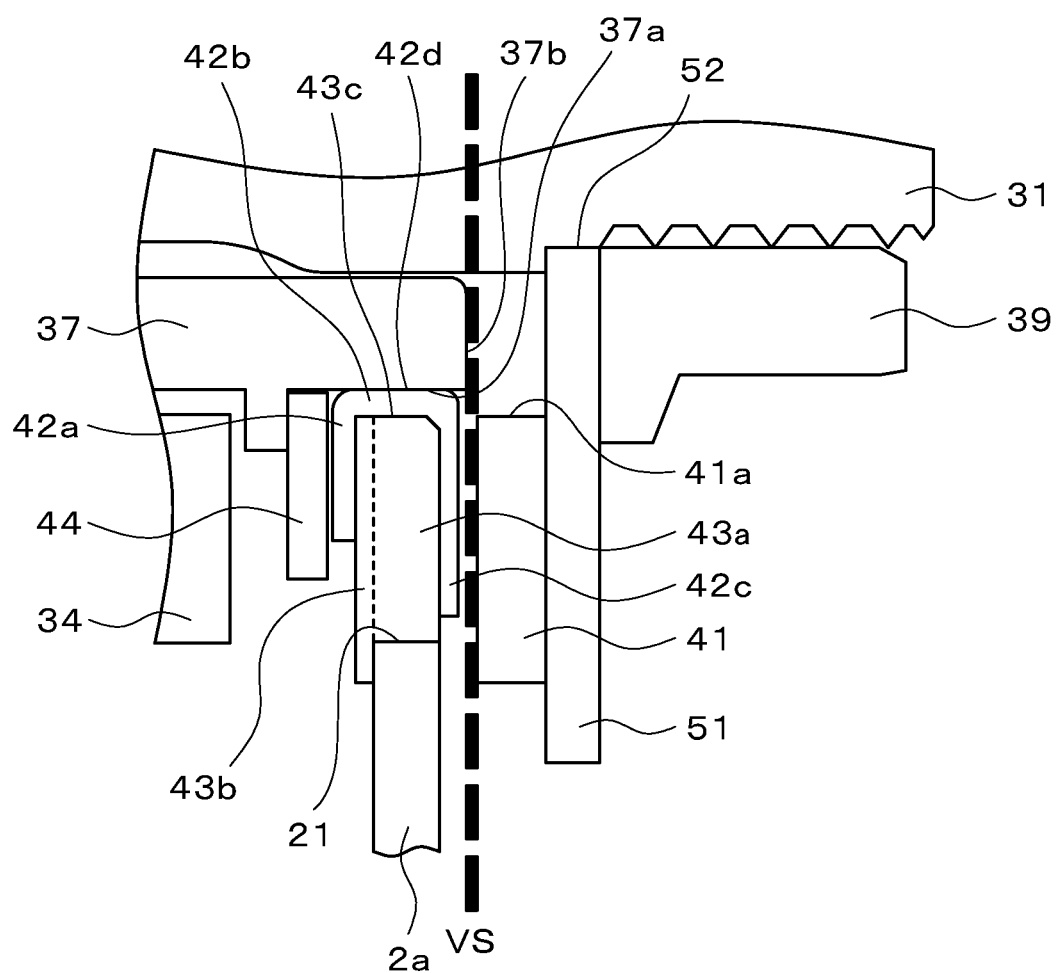
FIG. 12 is an enlarged diagram illustrating the periphery of the load measurement sensor.

Furthermore, in FIG. 12, a configuration in which the flange portion 43b is disposed at the inside in the seat width direction in relation to the cylindrical portion 43a is described by referring to the drawing, but the positional relation between the cylindrical portion 43a and the flange portion 43b may be reversed. That is, the flange portion 43b may be disposed to be positioned at the outside in the seat width direction in relation to the cylindrical portion 43a. With such a configuration, since the side frame 2a is disposed at the inside in the seat width direction by the thickness of the flange portion 43b, it is easy to ensure a space for attaching the other member disposed at the outside of the side frame 2a in the seat width direction. As a result, since the interference between the other member and the seat frame may be inhibited, the load detection precision may be improved.

With regard to the bush 43 having the above-described shape, the flange portion 43b is bonded to the side frame 2a by projection welding in a state where the cylindrical portion 43a is fitted to the hole portion 21 of the side frame 2a. Since the flange portion 43b is fixed to the side frame 2a by welding, the bush 43 may be attached to the side frame 2a without providing a particular member. Accordingly, for example, compared to a case where the bush 43 is fixed by the bolt or the like, the structure around the bush 43 does not increase in size.

Then, the sensor 30 is inserted into the penetration hole 43c of the bush 43 bonded to the side frame 2a, and the bush 43 is positioned at the outside in the radial direction of the annular portion provided with the load detection portion 37 of the sensor 30, that is, the end at the position where the sensor body 32 of the sensor 30 is pressed in the side frame 2a.

With the above-described configuration, the side frame 2a may be pressed in the area larger than the thickness of the flange portion 43b of the bush 43 when pressing the annular portion to transmit the load generated when the passenger sits on the vehicle seat Z. That is, the bush 43 is a load transmission member which widens the pressing area when the side frame 2a presses the annular portion.

That is, in the load transmission portion which is formed by the bush 43, the end (that is, the portion forming the penetration hole 43c) near the sensor body 32 in the load transmission direction (in the embodiment, the vertical direction) has a longer length in the axial direction of the extension shaft portion 31 than that of the end (that is, the outer peripheral end of the cylindrical portion 43a of the bush 43) positioned at the opposite side in the load transmission direction. That is, the end of the load transmission portion near the load measurement sensor (the sensor body) is provided with a wide portion of which the width in the axial direction is large.

More specifically, the load transmission portion is formed by the bush 43 which is attached to the end (the hole portion 21) at a position of pressing the sensor body 32 in the side frame 2a. Then, as for the plate thickness of the bush 43, the plate thickness of the portion positioned at the side of the sensor body 32 is larger than the plate thickness of the portion positioned at the side of the side frame 2a. More specifically, the plate thickness in the width direction of the vehicle seat Z of the bush 43 near the sensor body 32 is larger than the plate thickness in the width direction of the side frame 2a (the seat frame F).

With the above-described configuration, the bush 43 which forms the load transmission portion accomplishes a function of widening the pressing area when transmitting the load to the sensor body 32. As a result, the load may be stably transmitted to the sensor 30. Accordingly, the load detection precision may be further improved.

Figure 13:
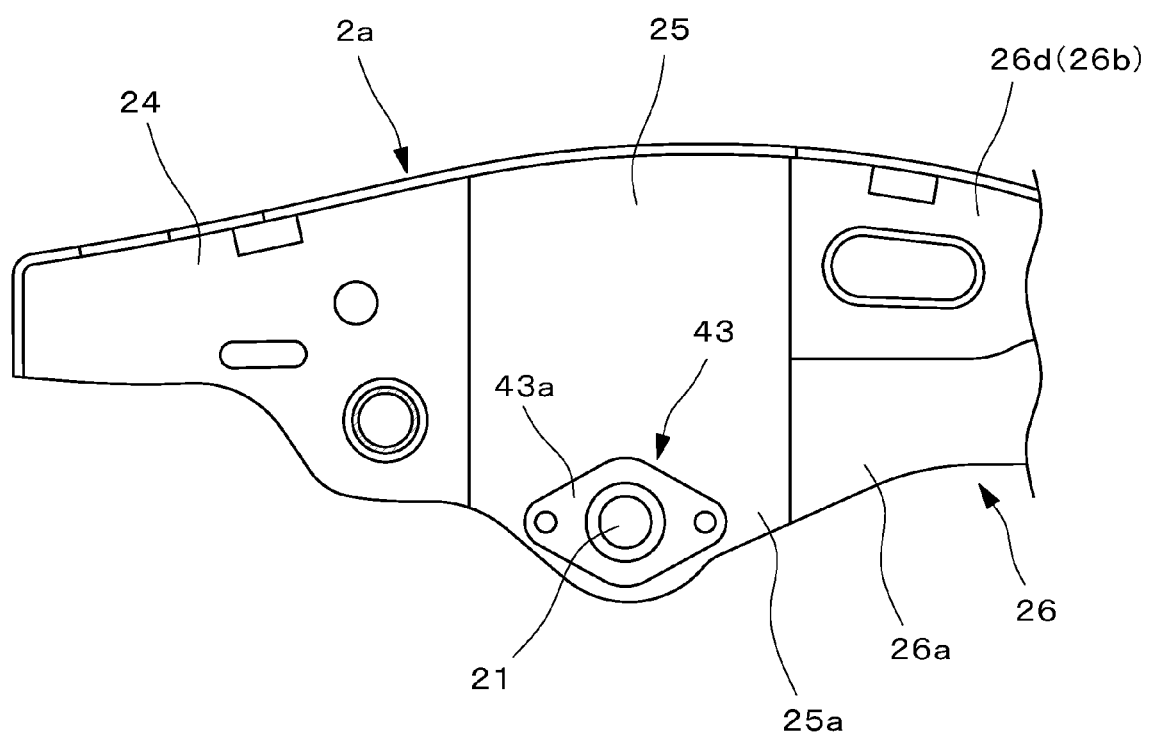
FIG. 13 is an enlarged diagram illustrating the periphery of a hole portion of the side frame.

Furthermore, in the embodiment, as illustrated in FIG. 13, the bush 43 is bonded to the side frame 2a so that the length direction of the flange portion 43b serving as the extension portion extending from the cylindrical portion 43a follows the length direction (in other words, the front-to-back direction of the vehicle seat Z) of the side frame 2a. Accordingly, compared to a case where the bush 43 is bonded so that the length direction of the flange portion 43b is perpendicular to the length direction of the side frame 2a, the space (specifically, the heights of the protrusion portions 23a and 25a) necessary for bonding the bush 43 may be made to be small. Accordingly, when supporting the sensor 30, the sensor 30 may be supported at the minimum height without increasing the size in the height direction.

Further, as illustrated in FIG. 12, the length (the thickness) of the bush 43 in the axial direction of the extension shaft portion 31 becomes larger than the length in the axial direction of the even diameter portion 36a serving as the regulation portion. Then, the bush 43 is provided so that both ends of the bush 43 in the axial direction are positioned inside both ends of the even diameter portion 36a (the regulation portion) in the axial direction. With the above-described configuration, even when the pressing range using the side frame 2a is widened by the bush 43, the even diameter portion 36a receives the load detection portion 37 in the entire wide pressing range. Accordingly, the further stable load measurement may be performed while the effect of the bush 43 is obtained.

Further, at least a part of the flange portion 43b is positioned below the upper surface (which is depicted by the dashed line in FIG. 10) of the bolt 18 which fixes the attachment brackets 15 and 16 to the upper surface of the upper rail 12. Accordingly, an increase in size of the bush 43 in the height direction is inhibited, so that the space for supporting the sensor 30 may be made to be further compact in size.

In addition, in the bonding surface of the bush 43 with the cylindrical portion 43a and the side frame 2a, the outer portion (the lower end surface of the bush 43 in FIG. 12) in the radial direction is disposed at the inside in the radial direction of the extension shaft portion 31 in relation to the substrate unit 34. Furthermore, in the bonding surface of the bush 43 with the cylindrical portion 43a and the side frame 2a, the outer end (the lower end surface of the bush 43 in FIG. 12) in the radial direction is disposed at the outside in the radial direction in relation to the outer end (the lower end surface of the spacer 41 in FIG. 12) in the radial direction of the spacer 41 to be described later.

The sliding member 42 serving as the contact portion or the load input member may be provided to input the load generated from the seat frame F provided in the vehicle seat Z to the sensor 30 by coming into contact with the sensor 30. In other words, the sliding member 42 is a contact member which comes into contact with the sensor 30. In addition, in order that the sliding member 42 easily sides on the sensor 30 along the axial direction of the extension shaft portion 31 when the load of the side frame 2a is added to the sliding member, the sliding member 42 is formed of a resin member having a satisfactory sliding performance. Further, as for the formation of the contact portion, the contact portion may be formed by coating a resin on the side frame 2a other than the manner of attaching the sliding member 42 to the side frame 2a.

More specifically, the sliding member 42 is an annular member which is formed of an ethylene resin, and is interposed between the annular portion and the bush 43 in the radial direction (in other words, the radial direction of the extension shaft portion 31) of the annular portion provided with the load detection portion 37. More specifically, the sliding member 42 includes a cylindrical fitting cylindrical portion 42b which is fitted to the penetration hole 43c of the bush 43, an one end side flange portion 42a which serves as a first flange portion adjacent to one end of the fitting cylindrical portion 42b, and the other end side flange portion 42c which serves as a second flange portion adjacent to the other end of the fitting cylindrical portion 42b. In a state where the fitting cylindrical portion 42b is inserted through the penetration hole 43c of the bush 43, the one end side flange portion 42a and the other end side flange portion 42c interpose the bush 43 and the side frame 2a (see FIG. 12). That is, the sliding member 42 is formed so that the width in the seat width direction is larger than that of the side frame 2a. Furthermore, in the embodiment, the one end side flange portion 42a is formed with a diameter smaller than that of the other end side flange portion 42c. In this way, since the sliding member 42 includes the one end side flange portion 42a and the other end side flange portion 42c serving as the flange portion, the rigidity (the attachment strength) of the sliding member 42 is improved.

Further, the sliding member 42 includes a penetration hole 42d which penetrates the one end side flange portion 42a, the fitting cylindrical portion 42b, and the other end side flange portion 42c in the thickness direction. The penetration hole 42d is slightly larger than the outer diameter of the annular portion provided with the load detection portion 37 of the sensor 30. Then, during the operation of supporting the sensor 30, the annular portion is fitted into the penetration hole 42d in a state where a slight gap is provided between the penetration hole 42d of the sliding member 42 and the annular portion. Furthermore, in the embodiment, the sliding member 42 is attached so that the one end side flange portion 42a is away from the front end of the extension shaft portion 31 in relation to the other end side flange portion 42c in the axial direction of the extension shaft portion 31.

In this way, since the cross section of the sliding member 42 is formed in a U-shape, the sliding member may be easily attached to the bush 43.

Furthermore, it is desirable that the attachment of the sliding member 42 is performed according to the following procedure.

First, the sliding member 42 (where the other end side flange portion 42c is not formed yet) including the one end side flange portion 42a and the fitting cylindrical portion 42b is attached to the bush 43. At this time, the one end side flange portion 42a is attached to the installation side of the sensor body 32 in the axial direction of the extension shaft portion 31. Furthermore, the one end side flange portion 42a and the bush 43 may be integrated with each other. When the one end side flange portion 42a is integrated with the bush 43, the attachment process may be shortened during the operation of attaching the sliding member 42.

Next, the bush 43 is inserted into the hole portion 21 provided in the side frame 2a, and then the opposite end to the installation side of the one end side flange portion 42a is bent outward in the radial direction, thereby forming the other end side flange portion 42c.

As for the other end side flange portion 42c which is formed by attaching the sliding member 42 to the hole portion 21 and bending a part of the sliding member 42, the stability of the shape or the dimension is slightly degraded. However, since the one end side flange portion 42a near the sensor body 32 is first formed (provided), the precision in the shape or the dimension of the portion disposed near the substrate unit 34 in the sliding member 42 may be improved. As a result, the load detection precision may be improved.

Furthermore, the outer diameter of the cylindrical portion 43a of the bush 43 is slightly larger than the outer diameters of the one end side flange portion 42a and the other end side flange portion 42c of the sliding member 42. In this way, since the outer diameter of the cylindrical portion 43a of the bush 43 is larger than the outer diameters of the one end side flange portion 42a and the other end side flange portion 42c of the sliding member 42, the outer radial ends of the one end side flange portion 42a and the other end side flange portion 42c do not come into contact with the boundary portion between the bush 43 and the hole portion 21 of the side frame 2a, whereby the bush 43 is rigidly attached to the side frame 2a.

When the side frame 2a presses the load detection portion 37 of the sensor body 32, the sliding member 42 with the above-described configuration is interposed between the side frame 2a (precisely, the bush 43) and the load detection portion 37 in the radial direction, and comes into contact with the load detection portion 37. For this reason, it may be understood that the sliding member 42 is a load input member which finally inputs the load transmitted through the side frame 2a and the bush 43 to the load detection portion 37. That is, the sliding member 42 serving as the load input member directly presses the load detection portion 37 by coming into contact with the load detection portion 37 while transmitting the load transmitted from the side frame 2a to the load detection portion 37.

Then, the sliding member 42 is disposed away from the other members (specifically, the spacer 41 and the washer 44 to be described later) which are disposed adjacent to each other in the thickness direction therefrom. That is, since the sliding member 42 is disposed with a gap with respect to the other member in the axial direction of the extension shaft portion 31, when the load of the side frame 2a is added to the sliding member, the sliding member 42 moves in the axial direction. More specifically, when the load detection portion 37 of the sensor 30 is deformed to be curved inward in the radial direction by the load transmitted from the side frame 2a to the sensor 30, the sliding member 42 slides outward (in other words, toward the attachment brackets 15 and 16) along the annular portion provided with the load detection portion 37 with the deformation. That is, the sliding member 42 is a movable portion (a movable member) which slides on the outer peripheral surface of the annular portion with the deformation of the load detection portion 37.

In this way, since the sliding member 42 slides outward (in other words, toward the extension shaft portion 31), the sensor 30 may receive the load in the vicinity (that is, the fixed portion) of the attachment brackets 15 and 16. As a result, since the load of the side frame 2a is stably input to the sensor 30, the detection precision is improved.

In addition, the sliding member 42 is disposed at the inside in the seat width direction in relation to the positioning portion 35, and is disposed at a position close to the installation side of the substrate unit 34 in relation to the outer end of the load detection portion 37 in the seat width direction. That is, the sliding member 42 is disposed at a position close to the installation side of the substrate unit 34 in relation to the unfixed end (the free end 37b) of the load detection portion 37 in the axial direction. With such a configuration, since the sliding member 42 stably comes into contact with the load receiving surface 37a of the sensor 30, the load detection precision may be improved. Further, a biased load may be inhibited from being added to the sliding member 42.

Figure 17:
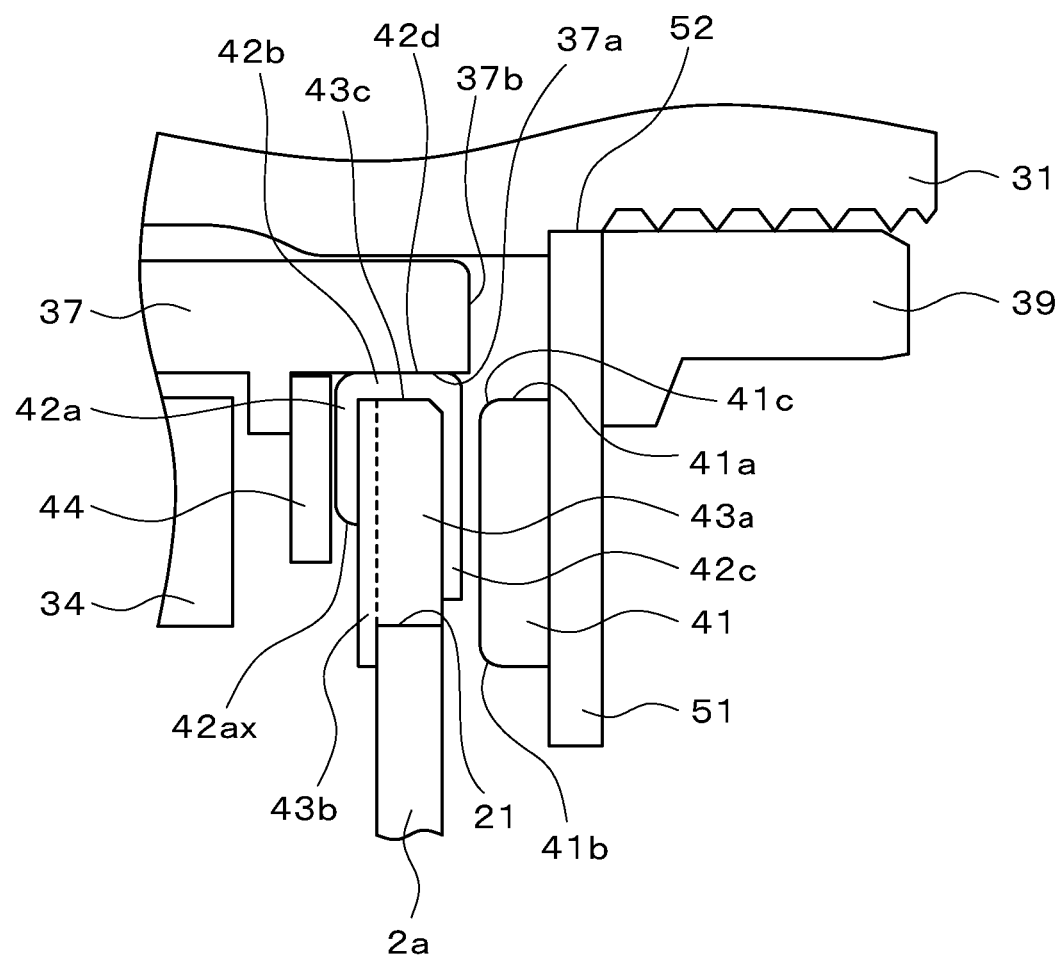
FIG. 17 is an enlarged diagram illustrating an improved example of a support structure for the load measurement sensor.

Further, as illustrated in FIG. 17, an end 42ax which is provided in the outer periphery of the surface facing the washer 44 to be described later in the sliding member 42 may be chamfered. Since the chamfering is performed, even when the sliding member 42 comes into contact with the washer 44 in an inclined state, the damage of the washer 44 and the sliding member 42 may be inhibited. As a result, the durability of the support structure for the sensor 30 is improved. Furthermore, the chamfering indicates that a structure in which the corner portion is cut out or rounded.

Furthermore, the contact surface (specifically, a region in the inner peripheral surface of the penetration hole 42d facing the load receiving surface 37a and corresponding to the load input surface) of the sliding member 42 against the load detection portion 37 has a wide area in the axial direction of the extension shaft portion 31. Here, one end of the contact surface in the axial direction is positioned at one end among one end and the other end in the width direction of the vehicle seat Z together with one end of the even diameter portion 36a (the regulation portion) in the axial direction. In contrast, the other end of the contact surface in the axial direction is positioned at the other end among one end and the other end in the width direction of the vehicle seat Z together with the other end of the even diameter portion 36a in the axial direction.

Then, one end of the contact surface in the axial direction is positioned at the inside in relation to one end of the even diameter portion 36a in the axial direction (in other words, one end is away from one end in the width direction of the vehicle seat Z). Accordingly, even when the even diameter portion 36a serving as the regulation portion receives the load detection portion 37 and the sliding member 42 slides thereon at the time when the side frame 2a presses the load detection portion 37 through the sliding member 42, the even diameter portion may continuously receive the load detection portion 37.

Further, the other end of the contact surface in the axial direction is positioned at the outside in relation to the other end of the even diameter portion 36a in the axial direction (in other words, the other end is away from the other end in the width direction of the vehicle seat Z). That is, in the embodiment, the contact surface is settled in the range where the even diameter portion 36a serving as the regulation portion is present in the width direction of the vehicle seat Z. Accordingly, the load detection portion 37 may accurately detect the load (appropriately receive the load) while being regulated by the even diameter portion 36a.

The washer 44 serving as the movement regulation portion is an annular member which is made of a steel sheet (specifically, SUS630). The washer 44 is fitted to the annular portion provided with the load detection portion 37 of the sensor 30 in a state where the sensor 30 is supported at the support position, and as illustrated in FIG. 12, is positioned at the inside in the seat width direction of the sliding member 42 with a slight gap with respect to the sliding member 42. That is, the washer 44 is disposed at the inside of the sliding member 42 in the axial direction of the extension shaft portion 31 to be adjacent to the sliding member 42. Further, the washer 44 is disposed at the outside in the seat width direction of the substrate unit 34 with a gap with respect to the substrate unit 34 provided in the sensor 30. In this way, since the washer 44 is disposed away from the substrate unit 34, when the sliding member 42 moves toward the washer 44, the washer 44 may be inclined toward the substrate unit 34, so that the washer 44 serves as a damper which protects the substrate unit 34.

Then, at the arrangement position, the washer 44 regulates the sliding member 42 from excessively moving inward (that is, the opposite side to the attachment brackets 15 and 16). That is, the washer 44 serves as the movement regulation member, and regulates the sliding member 42 from moving inward in relation to the arrangement position of the washer 44.

Further, in the embodiment, as illustrated in FIG. 12, the inner end (in other words, the end opposite to the attachment brackets 15 and 16 in the axial direction of the extension shaft portion 31) of the even diameter portion 36a serving as the regulation portion is present near the attachment brackets 15 and 16 in relation to the washer 44 (that is, the inner end is positioned at the outside). Accordingly, the length (the length in the axial direction) of the even diameter portion 36a to be ensured to regulate the deformation amount of the load detection portion 37 may be the length corresponding to the movable range of the sliding member 42, that is, the length to the arrangement position of the washer 44, and the even diameter portion 36a may be inhibited from unnecessarily increasing in size.

Further, the washer 44 is formed in a size in which the inner peripheral end thereof is disposed at the inside in the radial direction in relation to the bottom surface (that is, the surface of the sensor body 32 coming into contact with the load detection portion 37) of the substrate unit 34 provided in the sensor 30 and the outer peripheral end thereof is disposed at the outside in the radial direction in relation to the bottom surface of the substrate unit 34. That is, when the sensor 30 is supported, the washer 44 extends to the outside in the radial direction in relation to the bottom surface of the substrate unit 34. In other words, the washer 44 is formed at the outside (from the inside to the outside in the radial direction) in the radial direction in relation to the bottom surface of the substrate unit 34. Accordingly, at the arrangement position, the washer 44 exhibits a function of inhibiting the sliding member 42 from moving inward in the axial direction of the extension shaft portion 31 to interfere with the substrate unit 34.

Further, the outer diameter of the washer 44 is formed to be larger than the outer diameter of the one end side flange portion 42a of the sliding member 42. That is, the washer 44 extends outward in the radial direction in relation to the outer diameter of the one end side flange portion 42a of the sliding member 42. In this way, since the outer diameter of the washer 44 is formed to be larger than that of the sliding member 42, even when the sliding member 42 slides along the axial direction, the movement toward the washer 44 may be reliably inhibited. Further, a local load is inhibited from being applied to the sliding member 42.

In addition, the washer 44 is disposed to the outside in the radial direction of the extension shaft portion 31 in relation to the ceiling surface (the surface opposite to the surface coming into contact with the load detection portion 37, that is, the surface, the outer end surface disposed at the outside in the radial direction of the extension shaft portion 31) of the substrate unit 34. In this way, since the washer 44 may be provided at the inside in the radial direction in relation to the outer surface of the substrate unit 34 in the radial direction, the washer 44 is disposed at the inside in the radial direction in relation to the substrate unit 34. Accordingly, the structure which is provided to fix the sensor 30 to the seat may be inhibited from increasing in size in the height direction and the front-to-back direction.

As described above, the bottom wall portion 50 is attached onto the upper rail 12 by the bolt 18 and the nut (the fixation member), but at least a part of the washer 44 is disposed below the upper end of the bolt 18 which is provided to fix the attachment brackets 15 and 16 and the upper rail 12.

Since at least a part of the washer 44 is disposed below the upper end of the bolt 18, the structure which fixes the sensor 30 to the seat may be inhibited from increasing in size in the height direction.

Furthermore, in the embodiment, a configuration is illustrated in which the washer 44 is formed separately from the sensor 30 (the sensor body 32). However, for example, the washer may be integrated with the annular portion. When the washer 44 is integrated, the number of components may be decreased, so that the operation of supporting the sensor 30 may be easily performed.

The spacer 41 serving as the movement restriction portion or the movement restriction member is a cylindrical member which is made of hot-rolled steel sheet. Then, as illustrated in FIG. 12, in a state where the sensor 30 is supported at the support position, the spacer is disposed in the gap between the sliding member 42 and each upright wall portion 51 of the attachment brackets 15 and 16, and is adjacent to the sliding member 42 in the width direction of the vehicle seat Z with a slight gap therebetween. Further, the center portion of the spacer 41 is provided with a circular hole 41a, and the diameter is larger than the diameter of the step portion which forms the positioning portion 35 in the sensor 30.

The spacer 41 is formed to be thicker than the plate thickness of the steel sheet forming the side frame 2a. Further, in a case where the spacer 41 is not integrated with the attachment brackets 15 and 16 but separated therefrom, the spacer is formed to be thicker than the plate thickness of the steel sheet forming the attachment brackets 15 and 16. Further, the plate thickness of the spacer 41 is formed to be thinner than that of the bush 43. Furthermore, when the spacer 41 is separated from the attachment brackets 15 and 16, the rigidity may be improved, and the shape and the size of the spacer 41 may be freely changed, which improves a degree of freedom in design.

The spacer 41 with the above-described shape is bonded by projection welding to the inner surface of each upright wall portion 51 of the attachment brackets 15 and 16 to overlap the circular hole 41a and the insertion hole 52 on the same axis. Then, when inserting the extension shaft portion 31 into the insertion hole 52 for supporting the sensor 30, the extension shaft portion 31 is guided into the insertion hole 52 through the circular hole 41a of the spacer 41. Further, at a time point when the positioning portion 35 of the sensor 30 comes into contact with each upright wall portion 51 of the attachment brackets 15 and 16 so that the sensor 30 is positioned in the width direction of the vehicle seat Z, the spacer 41 is positioned, as illustrated in FIG. 12, at the outside of the positioning portion 35 in the radial direction of the extension shaft portion 31.

The spacer 41 which is set as described above serves as a stopper which regulates the sliding member 42 from excessively moving outward in the axial direction of the extension shaft portion 31. More specifically, when the sliding member 42 moves outward in the axial direction of the extension shaft portion 31 from a state where the sliding member is positioned at the outside of the annular portion provided with the load detection portion 37 in the radial direction of the extension shaft portion 31, the spacer 41 regulates the sliding member 42 from coming off to the outside of the annular portion.

The spacer 41 is provided to extend to the outside in the radial direction in relation to the other end side flange portion 42c provided in the sliding member 42. That is, the outer diameter of the spacer 41 is formed to be larger than the outer diameter of the other end side flange portion 42c provided in the sliding member 42. With such a configuration, since the entire surface of the other end side flange portion 42c of the sliding member 42 comes into contact with the spacer 41 when the sliding member 42 comes into contact with the spacer 41, the contact area is widened. Accordingly, the spacer 41 may be stably pressed against the other end side flange portion 42c, so that a biased load is inhibited from being applied to the sliding member 42.

Furthermore, in the embodiment, the thickness of the spacer 41 comparatively increases, and when the sensor 30 is inserted into the insertion hole 52 until the positioning portion 35 comes into contact with each upright wall portion 51 of the attachment brackets 15 and 16, as illustrated in FIG. 12, the end (that is, the end of the spacer 41 near the sliding member 42 in the width direction of the vehicle seat Z) of the spacer 41 which is positioned at the inside in the thickness direction reaches the free end (that is, the end of the load detection portion 37 near the spacer 41 in the axial direction of the extension shaft portion 31) of the annular portion provided with the load detection portion 37 of the sensor 30 in the axial direction of the extension shaft portion 31.

In other words, the inner end of the spacer 41 in the thickness direction and the free end of the annular portion overlap each other on the same imaginary plane (which is indicated by the symbol VS in FIG. 12) in which the axial direction of the extension shaft portion 31 is set as the normal direction. With such a positional relation, it is possible to inhibit a biased load from being applied to the free end (the end of the load detection portion 37 near the spacer 41 in the axial direction of the extension shaft portion 31) of the annular portion.

Further, in a state where the sensor 30 is supported by each of the corresponding attachment brackets 15 and 16, the spacer 41 may be disposed so as not to overlap the outer end surface (the free end 37b) of the load detection portion 37 of the sensor 30 in the seat width direction on the imaginary plane (depicted by the symbol VS of FIG. 12) in the radial direction of the sensor 30 (the direction perpendicular to the axial direction of the extension shaft portion 31). When the spacer 41 is attached with such a configuration, it is possible to inhibit the spacer 41 from interfering with the load detection portion 37, so that the load detection precision is not degraded when the load detection portion 37 is deformed when receiving the load.

In addition, as described above, each upright wall portion 51 of the attachment brackets 15 and 16 is formed to be away from the load detection portion 37 in the axial direction, but the spacer 41 is disposed at a position where the gap is covered. In this way, with a configuration in which the gap between the upright wall portion 51 and the load detection portion 37 is covered by the spacer 41, it is possible to inhibit foreign matter from intruding between the load detection portion 37 and the even diameter portion 36a of the accommodation shaft portion 36.

When foreign matter intrudes between the load detection portion 37 and the even diameter portion 36a of the accommodation shaft portion 36, the sliding member interferes with the foreign matter when the sliding member 42 is pressed down by the load generated from the seat, so that the sensor 30 may not accurately measure the load. Here, with a configuration in which the spacer 41 covers the gap between the upright wall portion 51 and the load detection portion 37, the intrusion of the foreign matter is inhibited, so that the load detection error of the sensor 30 may be inhibited.

The spacer 41 is disposed at a position where it overlaps the front attachment region 25 (or the rear attachment region 23) when the vehicle seat Z is seen from the side portion thereof. That is, the spacer 41 is disposed at a position where the space overlaps the front attachment region 25 (or the rear attachment region 23) in the seat width direction. In other words, the spacer 41 may be provided in the range of the front attachment region 25 (or the rear attachment region 23).

With the above-described configuration, since the distance between the side frame 2a (more specifically, the front attachment region 25 and the rear attachment region 23) and each upright wall portion 51 of the attachment brackets 15 and 16 provided at the outside of the side frame 2a in the seat width direction decreases, the thickness of the spacer 41 does not increase. Accordingly, the structure around the sensor 30 may be further decreased in size.

Further, as described above, the sensor 30 is supported by each of the corresponding attachment brackets 15 and 16 by threading the nut 39 into the extension shaft portion 31. Then, the spacer 41 is formed at a position overlapping the nut 39 in the axial direction with the size illustrated in FIG. 12. In this way, with a configuration in which the nut 39 and the spacer 41 overlap each other in the axial direction, the nut 39 and the spacer 41 are disposed to face each other with each upright wall portion 51 of the corresponding attachment brackets 15 and 16 interposed therebetween, the sensor 30 may be more rigidly supported by each of the corresponding attachment brackets 15 and 16.

Furthermore, in the embodiment, a configuration is illustrated in which the spacer 41 is formed separately from the sensor 30 (the sensor body 32) or the attachment brackets 15 and 16. However, for example, the spacer may be integrated with each upright wall portion 51 of the corresponding attachment brackets 15 and 16. More specifically, a part of the upright wall portion 51 may be formed to be enlarged toward the sensor body 32. When the spacer 41 is integrated, the number of components may be decreased, so that the operation of supporting the sensor 30 may be easily performed. In addition, when the spacer 41 is integrated with the attachment brackets 15 and 16, the spacer is formed in a protruding shape in the attachment brackets 15 and 16, so that the rigidity of the attachment brackets 15 and 16 is improved.

Further, as illustrated in FIG. 17, the ends 41b and 41c of the spacer 41 near the installation side of the sliding member 42 in the radial direction may be respectively chamfered. By the chamfering, even when the sliding member 42 comes into contact with the spacer 41 in an inclined state, the damage of the sliding member 42 or the spacer 41 may be inhibited. As a result, the durability of the support structure for the sensor 30 is improved. Furthermore, the chamfering indicates that a structure in which the corner portion is cut out or rounded.

In addition, a configuration is illustrated in which the spacer 41 is formed in a true circular shape, but may be formed in an oval shape. Since the spacer 41 is formed in an oval shape and is disposed so that the long axial direction follows the front-to-back direction (the short axial direction becomes the height direction), an increase in size of the spacer 41 in the height direction may be inhibited. Accordingly, the support structure for the sensor 30 may be made to be compact in size.

Other Embodiments of Sensor Attachment Component

Figure 18:
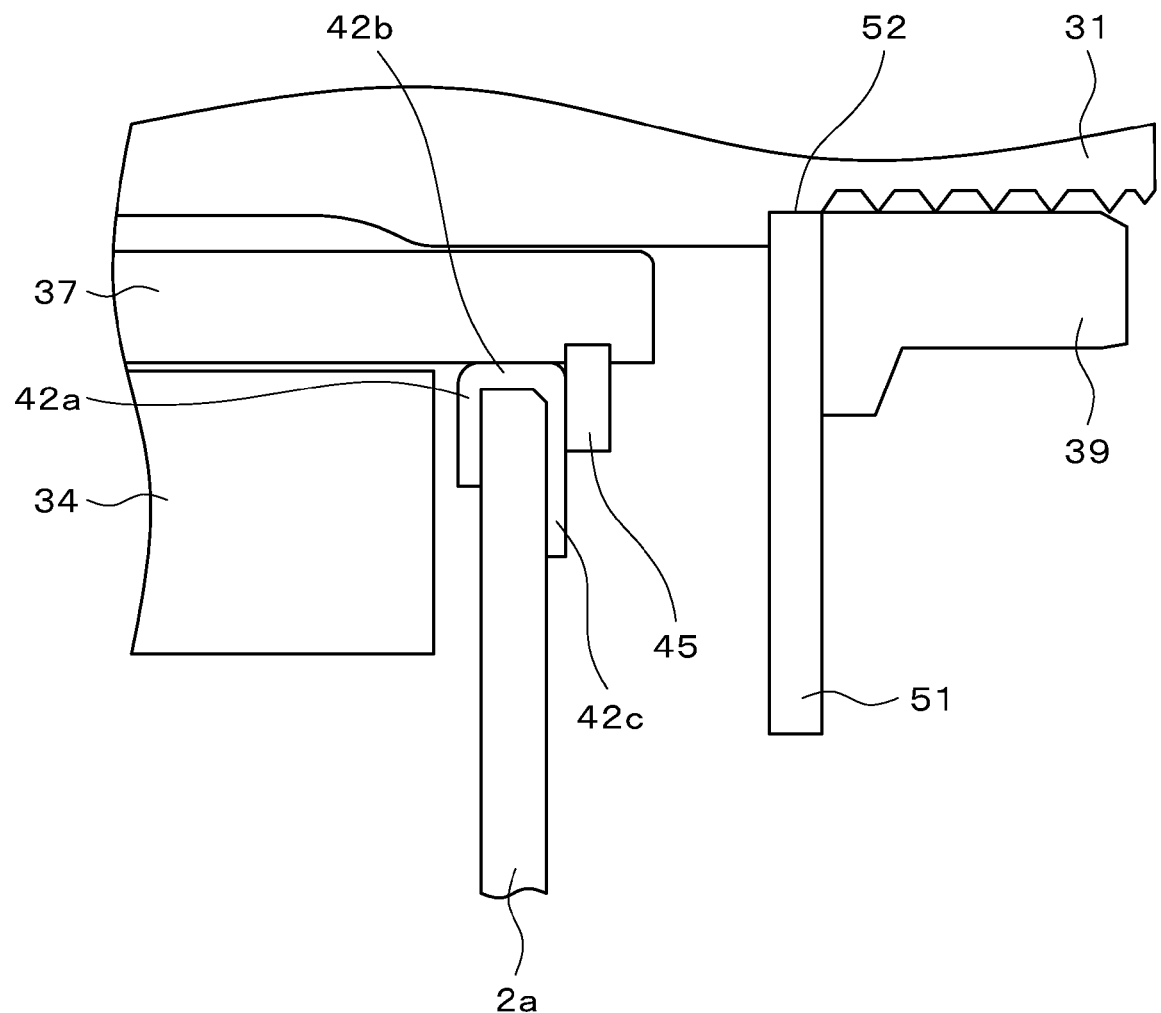
FIG. 18 is an enlarged diagram illustrating the other embodiment of the support structure for the load measurement sensor.

Hereinafter, referring to FIG. 18, the other embodiment of the sensor attachment component will be described. Furthermore, the same reference numerals will be given to the similar components to those of the above-described embodiment, and the specific description thereof will not be repeated.

The embodiment is characterized in that the spacer 41 and the washer 44 described in the above-described embodiment are not provided, and an E-ring 45 is provided.

The E-ring 45 is an annular member which is made of a metal material, and is attached to the load detection portion 37 of the sensor body 32. More specifically, the E-ring 45 is attached to the sensor body 32 so that a groove is formed in the outer periphery of the annular portion provided in the load detection portion 37 and the E-ring is fitted into the groove.

The E-ring 45 may be provided to restrict the range in which the side frame 2a moves along the axial direction of the extension shaft portion 31, and the sliding member 42 is provided between the side frame 2a and the E-ring 45. In other words, the sliding member 42 is attached to the side frame 2a, and the movement amount in which the sliding member 42 moves toward the extension shaft portion 31 is restricted by the E-ring 45 which is attached to the load detection portion 37 of the sensor 30.

Furthermore, the outer diameters of the one end side flange portion 42a and the other end side flange portion 42c of the sliding member 42 are formed to be larger than the outer diameter of the E-ring 45. In addition, the outer diameter of the other end side flange portion 42c disposed at the contact side of the E-ring 45 is formed to be larger than the outer diameter of the one end side flange portion 42a. With such a configuration, since the sliding member 42 further stably comes into contact with the E-ring 45 when the sliding member 42 comes into contact with the E-ring 45, the load detection precision may be improved.

Further, in the embodiment, the one end side flange portion 42a of the sliding member 42 and the outer end of the other end side flange portion 42c in the radial direction (in FIG. 18, the one end side flange portion 42a and the outer end of the other end side flange portion 42c) are disposed at the inside in the radial direction in relation to the ceiling surface (that is, the surface coming into contact with the load detection portion 37) of the substrate unit 34 attached to the sensor body 32, and are formed to be settled in the inside in the radial direction in relation to the substrate unit 34.

Positional Relationship Between Sensor and Vehicle Seat

Hereinafter, the position of supporting the sensor 30 will be more specifically described, and the positional relationship between the sensor 30 and the vehicle seat Z will be described by referring to FIGS. 14 and 15 together with FIG. 5.

As described in the section "Structure for Supporting Sensor", the position of supporting the sensor 30 is positioned above the lower rail 11 which is present at the close position when seen from the first rail member, that is, the sensor 30. Then, when the sensor 30 is supported at the support position, the sensor body 32 (precisely, the portion of the sensor body 32 which is positioned at the inside in relation to the load detection portion 37) of the sensor 30 is positioned between the side frames 2a (in other words, the first rail member and the second rail member) in the width direction of the vehicle seat Z. For example, as illustrated in FIG. 5, the substrate unit 34 which is provided in the sensor 30 is positioned at the inside in relation to the side frame 2a.

Then, in the embodiment, when the sensor 30 is supported at the support position in a state where the vehicle seat Z is placed on the first rail member and the second rail member, the load receiving portion of the sensor body 32 is disposed at a position away from the second rail member in relation to the center of the first rail member in the width direction. Here, the load receiving portion is a region which is formed in the sensor body 32 to receive the load transmitted from the vehicle seat Z (specifically, the side frame 2a), and in the embodiment, the load receiving surface 37a corresponds to the load receiving portion.

That is, in the embodiment, as illustrated in FIG. 5, in a state where the sensor 30 is supported at the support position, the load receiving surface 37a serving as the load receiving portion is positioned at the outside in relation to the center of the width direction of the lower rail 11 serving as the first rail member. With such a positional relation, since the sensor 30 does not easily interfere with the member (a member positioned between the rail members and for example, the S-spring 6 or a safety belt (not illustrated)) inside the seat, a compact in size of the vehicle seat Z may be satisfactorily accomplished.

Furthermore, the load receiving surface 37a is wide in the width direction of the vehicle seat Z. Then, in the embodiment, as illustrated in FIG. 5, the outer end of the load receiving surface 37a in the width direction is positioned at the outside in relation to the center of the width direction of the lower rail 11 serving as the first rail member. In other words, the end of the load receiving surface 37a on the installation side of the first rail member in the width direction is disposed at a position away from the second rail member in relation to the center of the first rail member in the width direction.

Particularly, in the embodiment, the center of the width direction of the load receiving surface 37a is positioned at the outside in relation to the center of the first rail member (in the width direction, the center is disposed at a position away from the second rail member in relation to the center of the first rail member). In addition, the inner end of the width direction of the load receiving surface 37a is also positioned at the outside in relation to the center of the first rail member (in the width direction, the inner end is disposed at a position away from the second rail member in relation to the center of the first rail member). With the above-described positional relation, the effect of inhibiting the interference between the sensor 30 and the member inside the seat is further effectively exhibited.

In addition, in the embodiment, as illustrated in FIG. 5, in a state where the sensor 30 is supported at the support position, the sensor body 32 is settled between both ends of the lower rail 11 in the width direction. That is, when the sensor 30 on the side of the first rail member is supported at the support position, the sensor body 32 is disposed at a position away from the second rail member in relation to the end of the first rail member on the installation side of the second rail member in the width direction of the vehicle seat Z.

As described above, since the sensor body 32 is settled between both ends of the lower rail 11 in the width direction, the sensor 30 may be supported by effectively using the space on the lower rail 11, so that the vehicle seat Z may be made more compact in size.

Further, since the sensor body 32 is settled between both ends of the lower rail 11 in the width direction, the substrate unit 34 provided in the sensor body 32 is also settled between both ends of the lower rail 11 in the width direction. Accordingly, when the sensor 30 is supported at the support position, the connector portion 34a which is provided in the substrate unit 34 is disposed at the outside (a position away from the second rail member) in relation to the inner end (the end on the installation side of the second rail member) inside the width direction of the first rail member in a state where the front end thereof is positioned at the front side. Accordingly, the interference between the connector portion 34a and the member inside the seat is suppressed, and for example, the safety belt may be smoothly connected to the connector portion 34a.

Further, in a state where the sensor 30 is supported at the support position, the sensor 30 is positioned at the outside in relation to the S-spring 6 (the adjacent S-springs among the plurality of S-springs 6 arranged in parallel in the width direction, are addressed collectively as the S-spring below) in the width direction of the vehicle seat Z. In other words, the sensor 30 is away from the second rail member in relation to the S-spring 6. Accordingly, as described above, the interference between the sensor 30 and the S-spring 6 may be effectively inhibited.

Figure 14:
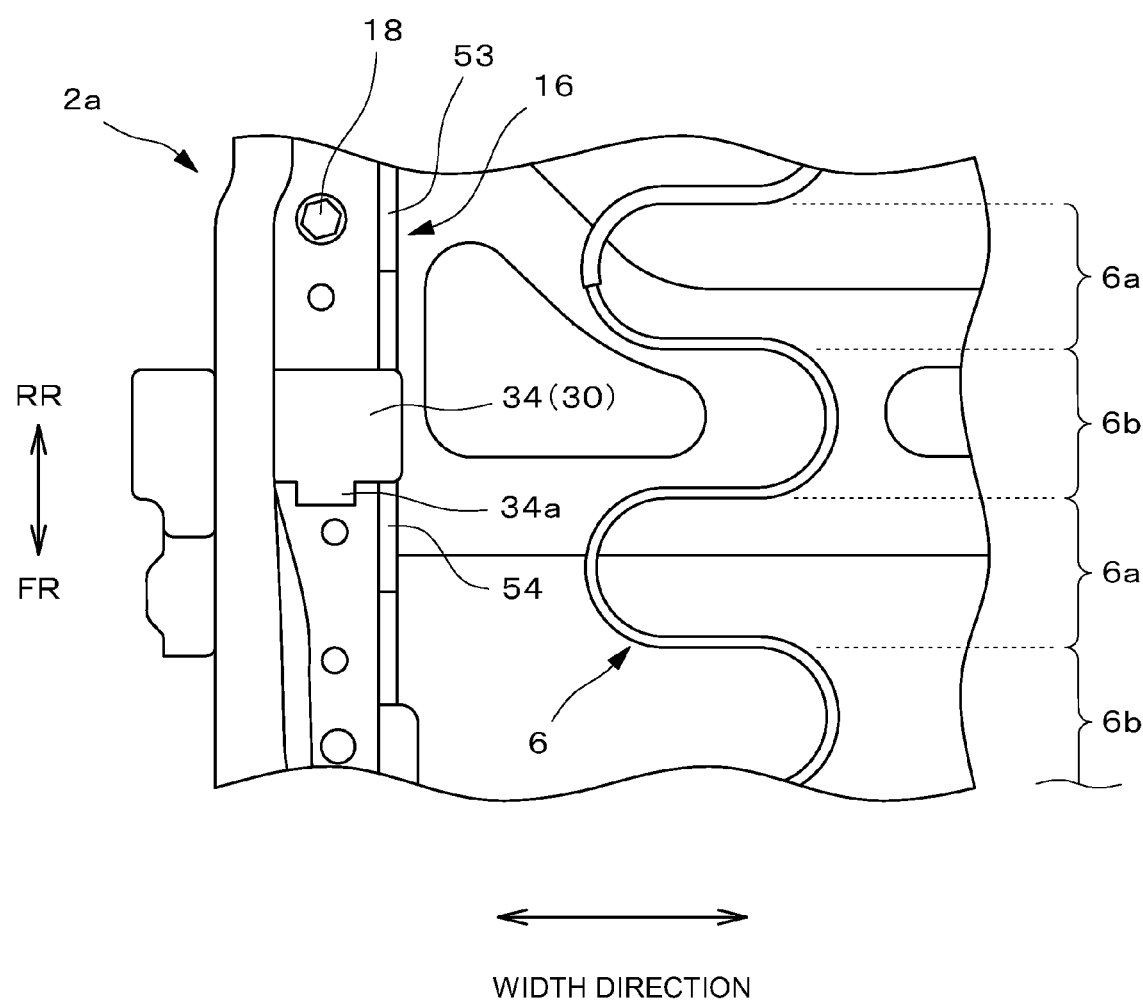
FIG. 14 is a diagram illustrating a positional relation between the load measurement sensor and an S-spring.

In addition, for the purpose of effectively inhibiting the interference between the sensor 30 and the S-spring 6, in the embodiment, as illustrated in FIG. 14, the sensor 30 is disposed at the same position as that of the installation position of the second curved portion 6b among first and second curved portions 6a and 6b constituting the S-spring 6 in the front-to-back direction of the vehicle seat Z. Here, the first curved portion 6a indicates a portion of the S-spring 6 which is curved to be closer to the first rail member in the width direction of the vehicle seat Z when seen from the sensor 30 supported on the first rail member. The second curved portion 6b indicates a portion which is curved to be closer to the second rail member in the width direction of the vehicle seat Z when seen from the sensor 30 supported on the first rail member.

With the above-described arrangement, the sensor 30 and the S-spring 6 may be made to be away from each other, so that the interference between the sensor 30 and the S-spring 6 may be further effectively inhibited. Furthermore, in the embodiment, in order to further effectively inhibit the interference between the sensor 30 and the S-spring 6, the arrangement position of the position of supporting the sensor 30 and the S-spring 6 in the vertical direction (the height direction of the vehicle seat Z) is different from each other.

Further, as described above, the sensor 30 is supported in a place provided with the outward protrusion region (specifically, the rear attachment region 23 and the front attachment region 25) in the side frame 2a. Accordingly, the position of supporting the sensor 30 may be further shifted outward in the width direction, so that the interference between the sensor 30 and the member inside the seat may be further effectively inhibited.

Figure 15:
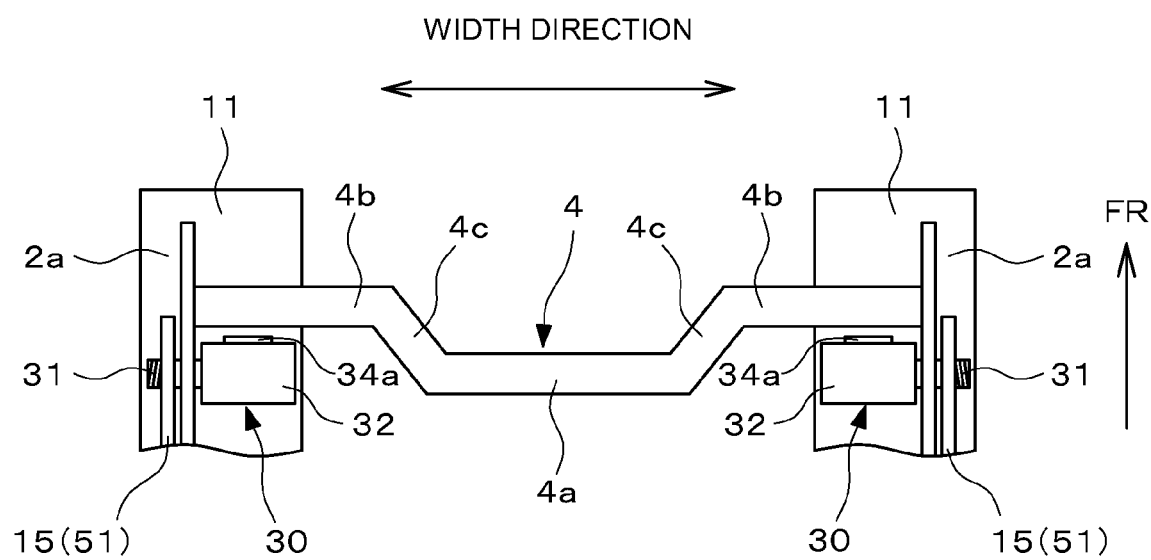
FIG. 15 is a diagram illustrating a positional relation between the load measurement sensor and a submarine restraining pipe.

In the embodiment, when the sensor 30 is supported at the support position in a state where the vehicle seat Z is placed on the first rail member and the second rail member, as illustrated in FIG. 15, the sensor 30 is positioned at the same position as that of the transverse center portion 4a of the submarine restraining pipe 4 in the front-to-back direction of the vehicle seat Z in a state where the extension shaft portion 31 follows the vehicle seat width direction.

In other words, when the sensor 30 is supported at the support position, the transverse center portion 4a of the submarine restraining pipe 4 is disposed at a position where the sensor 30 is present in the front-to-back direction. On the other hand, the transverse end 4b (the end on the installation side of the sensor 30) of the submarine restraining pipe 4 turns around toward the front side of the sensor 30 in the front-to-back direction, and is disposed along the extension shaft portion 31. When the positional relation between the sensor 30 and the submarine restraining pipe 4 satisfies the above-described positional relation, the submarine restraining pipe 4 may be provided by inhibiting the interference with the sensor 30.

Furthermore, in the embodiment, the transverse end 4b of the submarine restraining pipe 4 turns around toward the front side of the sensor 30 in the front-to-back direction of the vehicle seat Z, but the invention is not limited thereto. For example, the transverse end 4b of the submarine restraining pipe 4 may turn around toward the rear side of the sensor 30 in the front-to-back direction.

Further, when the sensor 30 is supported at the support position, the substrate unit 34 provided in the sensor 30 is disposed at the inside in relation to the side frame 2a. That is, the substrate of the substrate unit 34 is positioned at the opposite side to the position of the attachment brackets 15 and 16 in the axial direction of the extension shaft portion 31 when seen from the side frame 2a. In such a state, the gap between the substrate and the side frame 2a (in other words, the gap between the substrate unit 34 and the side frame 2a) is larger than the gap between the side frame 2a and the attachment brackets 15 and 16. Accordingly, the contact between the substrate and the side frame 2a is inhibited, and the position of supporting the sensor 30 is further shifted to the outside, so that the vehicle seat Z may be made to be further compact in size.

Next, the positional relation between the sensor 30 and the sensor attachment component 40 will be described.

When the sensor 30 is supported at the support position, the sliding member 42 is disposed at the inside in relation to the outer end (that is, each end of the corresponding attachment brackets 15 and 16 in the axial direction of the extension shaft portion 31) of the load detection portion 37 (in other words, the sliding member is disposed at a position away from the attachment brackets 15 and 16). That is, in the embodiment, in a state where the sensor 30 is supported at the support position, the sliding member 42 is not caught by the outer end of the load detection portion 37. Accordingly, it is possible to check the state (the presence of foreign matter and the like) in the periphery of the outer end of the load detection portion 37.

Furthermore, as described above, in the embodiment, the inner end of the spacer 41 in the thickness direction reaches the outer end of the load detection portion 37, but in order to easily check the state of the vicinity of the outer end of the load detection portion 37, the inner end of the spacer 41 in the thickness direction may be positioned at the outside in relation to the outer end of the load detection portion 37.

Further, in a state where the vehicle seat Z is placed on the first rail member (the lower rail 11 at one end side in the width direction) and the second rail member (the lower rail 11 at the other end side in the width direction) and the sensor 30 is supported at the support position, the even diameter portion 36a serving as the regulation portion is disposed at a position away from the second rail member in relation to the center of the first rail member in the width direction. Accordingly, the sensor 30 (specifically, the load detection portion 37) is disposed at the further outside, so that the interference between the sensor 30 and the member inside the seat may be further effectively inhibited.

Improved Example of Extension Shaft Portion

In the above-described embodiment, the cross section of the extension shaft portion 31 in the axial direction is formed in a true circular shape, but in order to inhibit the relative rotation of the sensor 30 with respect to the corresponding attachment brackets 15 and 16, the following configuration may be adopted.

Figure 16:
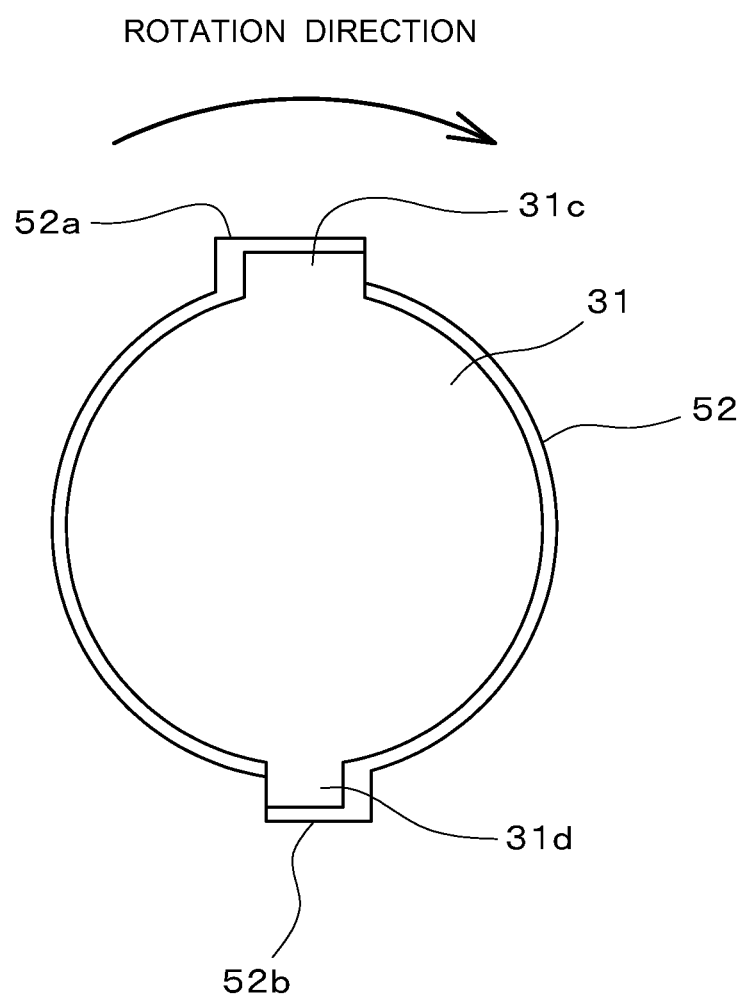
FIG. 16 is a cross-sectional view illustrating an improved example of an extension shaft portion.

As another structure for inhibiting the relative rotation of the sensor 30, as illustrated in FIG. 16, a structure is considered in which the shaft body of the extension shaft portion 31 is provided with a convex portion that protrudes outward in the radial direction from the outer periphery of the shaft body.

Here, the shaft body indicates a portion which is obtained by removing the convex portion in the extension shaft portion 31, and in the embodiment, the shaft body is the adjacent portion 31*b* adjacent to the male screw portion 31*a*.

The structure for inhibiting the relative rotation of the sensor 30 will be described in detail. The outer periphery of the shaft body of the extension shaft portion 31 is provided with a plurality of convex portions provided at different positions in the circumferential direction of the extension shaft portion 31, and in the embodiment, two convex portions 31*c* and 31*d* are provided.

On the other hand, the inner peripheral surface of the insertion hole 52 is provided with concave portions 52*a* and 52*b* corresponding to the two convex portions 31*c* and 31*d*, and the extension shaft portion 31 is inserted into the insertion hole 52 so that the respective convex portions 31*c* and 31*d* engage with the corresponding concave portions 52*a* and 52*b*. As a result, when the sensor 30 rotates about the extension shaft portion 31 with respect to the corresponding attachment brackets 15 and 16 in a state where the extension shaft portion 31 is inserted into the insertion hole 52, the convex portions 31*c* and 31*d* engage with one side surfaces (that is, the edge surface of each insertion hole 52 of the corresponding attachment brackets 15 and 16) of the concave portions 52*a* and 52*b* formed in the inner peripheral surface of the insertion hole 52. Accordingly, the relative rotation of the sensor 30 is inhibited.

As described above, in the embodiment, the convex portions 31*c* and 31*d* are provided to regulate the relative rotation of the sensor 30. Here, the invention is not limited thereto. For example, in order to define the position of the sensor 30 in the circumferential direction of the shaft body of the extension shaft portion 31 (that is, in order to perform the positioning operation), the convex portions 31*c* and 31*d* may be provided.

Furthermore, when the concave portions 52*a* and 52*b* are provided to correspond to the convex portions 31*c* and 31*d*, the respective convex portions 31*c* and 31*d* may come into plane-contact with the edge surface when being locked to the edge surface of the insertion hole 52 of the attachment brackets 15 and 16. Accordingly, the above-described problem (a problem in which the extension shaft portion 31 comes into contact with the edge of the inner peripheral surface of the insertion hole 52 and is positioned at that position) may be solved. Furthermore, in the embodiment, the concave portions 52*a* and 52*b* are provided so that the convex portions 31*c* and 31*d* comes into plane-contact with the edge surface of the insertion hole 52 of the attachment brackets 15 and 16, but when the plane-contact may be ensured, the convex portions may come into plane-contact with a structure other than the concave portions 52*a* and 52*b*.

Further, at least one of the concave portions 52*a* and 52*b* is positioned above the shaft body in a state where the extension shaft portion 31 is inserted into the insertion hole 52. In other words, in the embodiment, the concave portion which is positioned above the shaft body and engages with the convex portion in a state where the extension shaft portion 31 is inserted into the insertion hole 52 is formed in the edge surface of the insertion hole 52 of the attachment brackets 15 and 16. Accordingly, it is easy to check the support state of the sensor 30 (particularly, the positioned state of the sensor 30 in the width direction of the vehicle seat Z).

Further, in the embodiment, the plurality of (in the embodiment, two) convex portions 31*c* and 31*d* is formed in the outer periphery of the shaft body at different positions. Accordingly, the effect of inhibiting the relative rotation of the sensor 30 is further effectively exhibited. At this time, it is desirable that the respective convex portions 31*c* and 31*d* are disposed at a predetermined interval (in the embodiment, a deviation of about 180 degrees) in the outer periphery of the shaft body in the circumferential direction.

In addition, in the embodiment, the respective shapes (including a size) of two convex portions 31*c* and 31*d* are different from each other, so that the erroneous assembly of the sensor 30 may be inhibited.

Further, in the embodiment, the convex portion 31*c* to which the larger load is applied in the circumferential direction of the outer periphery of the shaft body among two convex portions is larger than the convex portion 31*d* to which the smaller load is applied in the circumferential direction. Here, the larger (smaller) load is applied in the circumferential direction of the outer periphery of the shaft body indicates the position which is located at the downstream (upstream) when seen from the load transmission direction among two different points in the circumferential direction of the outer periphery.

More specifically, as for the intersection of the sensor 30 between the outer periphery of the annular portion provided with the load detection portion 37 and the transmission path (the linear path) of the load applied to the load detection portion 37, there are two intersections on the outer periphery of the annular portion. The intersection (the lower intersection) which is positioned at the lower side is the intersection to which the larger load is applied, and the convex portion 31*c* which is formed at a position corresponding to the lower intersection in the circumferential direction of the outer peripheral surface of the shaft body becomes the convex portion to which the larger load is applied. On the other hand, the intersection (the upper intersection) which is positioned at the upper side is the intersection to which the smaller load is applied, and the convex portion 31*d* which is formed at a position corresponding to the upper intersection in the circumferential direction of the outer peripheral surface of the shaft body becomes the convex portion to which the smaller load is applied.

In this way, when the convex portion to which the larger load is applied is formed with the larger size, the rigidity increases. Accordingly, even when the larger load is applied, it is possible to stably regulate the relative rotation of the sensor 30. Furthermore, in order to improve the rigidity of the convex portion to which the larger load is applied, for example, a surface treatment or a coating for improving the rigidity may be performed other than the manner of increasing the size.

Further, in the embodiment, the convex portions 31*c* and 31*d* protrude from the outer periphery of the adjacent portion 31*b* in the extension shaft portion 31, and are connected to the step portion as the positioning portion 35 of the sensor 30. That is, in the embodiment, the step portion and the convex portions 31*c* and 31*d* are continuously integrated with each other in the axial direction. With such a configuration, when the convex portions 31*c* and 31*d* are formed by processing the shaft body, the convex portions 31*c* and 31*d* may be comparatively easily formed.

In addition, in the embodiment, the lengths from the center of the extension shaft portion 31 to the front ends of the convex portions 31*c* and 31*d* in the radial direction of the extension shaft portion 31 are equal to or smaller than the outer diameter of the step portion serving as the positioning portion 35 of the sensor 30 (in the embodiment, the length is smaller than the outer diameter of the step portion). Accordingly, it is possible to inhibit the relative rotation of the sensor 30 while easily positioning the sensor 30 using the step portion. Furthermore, the lengths from the center of the extension shaft portion 31 to the front ends of the convex portions 31*c* and 31*d* may be equal to the outer diameter of the step portion. In this case, compared to a case where the lengths from the center of the extension shaft portion 31 to the front ends of the convex portions 31*c* and 31*d* are smaller than the outer diameter of the step portion, the easiness of the operation of positioning the sensor 30 using the step portion is slightly degraded, but such portions may be easily processed or the excellent rigidity is ensured.

Further, in order to inhibit the excessive load from being applied to the convex portions 31*c* and 31*d*, it is desirable that the outer diameter of the nut threaded into the male screw portion 31*a* of the extension shaft portion 31 is larger than the diameter of the insertion hole 52.

Other Support Structures

In the above-described embodiment (hereinafter, the specification example), the extension shaft portion 31 of the sensor 30 is fastened to the attachment brackets 15 and 16, and the sensor 30 is supported by the brackets 15 and 16. Then, in the specification example, when a load is applied to the vehicle seat Z, the load is directly input to the load detection portion 37 from the side frame 2*a* which is disposed at the inside in the width direction in relation to the attachment brackets 15 and 16. Here, as for the support structure for the sensor 30, a structure may be supposed other than the structure according to the specification example. For example, the extension shaft portion 31 of the sensor 30 may be fastened to the side frame 2*a* so that the sensor 30 is supported by the frame 2*a*. In such a configuration (hereinafter, the other embodiment), a load of a member different from the side frame 2*a* is transmitted to the load detection portion 37.

Hereinafter, the other embodiment will be described by referring to FIGS. 19 to 27. In FIG. 20, for convenience of description, a sensor attachment component 70 is not illustrated in the drawing. Further, in FIG. 24, in order to easily describe the state of the load measurement sensor when the load occurs, the inclination and the like of the load measurement sensor are slightly exaggerated.

Furthermore, in the following description, in the other embodiments, the different configuration from that of the specification example will be mainly described, and the similar configuration will not be described. In FIGS. 19 to 27, the same reference numerals and signs are given to the members similar to those of the specification example.

In the other embodiment, the sensor 30 is supported by each of the pair of side frames 2*a* provided in the seat frame F of the vehicle seat Z. That is, in the other embodiment, each side frame 2*a* corresponds to the support bracket, and each sensor 30 is supported by each of the front end and the rear end thereof. In this way, when the sensor 30 is supported by the side frame 2*a* having a comparatively large rigidity in the seat frame F, the support rigidity with respect to the sensor 30 is improved, so that the sensor 30 may be stably disposed at the support position. Furthermore, the front end and the rear end of each side frame 2*a* are provided with the circular hole portion 21 which is formed to fasten the extension shaft portion 31 of the sensor 30.

Further, as illustrated in FIG. 20, a front sensor receiving bracket 65 is fixed to the front end of the upper end surface of the upper rail 12 and a rear sensor receiving bracket 66 is fixed to the rear end by the bolt and the nut. Each of the sensor receiving brackets 65 and 66 is provided with the insertion hole 62, and the extension shaft portion 31 of the sensor 30 is inserted into the insertion hole 62.

Then, when the insertion hole 62 formed in each of the sensor receiving brackets 65 and 66 overlaps the hole portion 21 formed in the side frame 2*a* and the extension shaft portion 31 of the sensor 30 is inserted through both holes, the sensor receiving brackets 65 and 66 and the side frame 2*a* are connected to each other through the extension shaft portion 31 of the sensor 30. At this time, as illustrated in FIGS. 19 and 21, the pair of side frames 2*a* is positioned at the outside in relation to the sensor receiving brackets 65 and 66 in the width direction, and the sensor body 32 of the sensor 30 is positioned at the inside in relation to the sensor receiving brackets 65 and 66.

Figure 19:
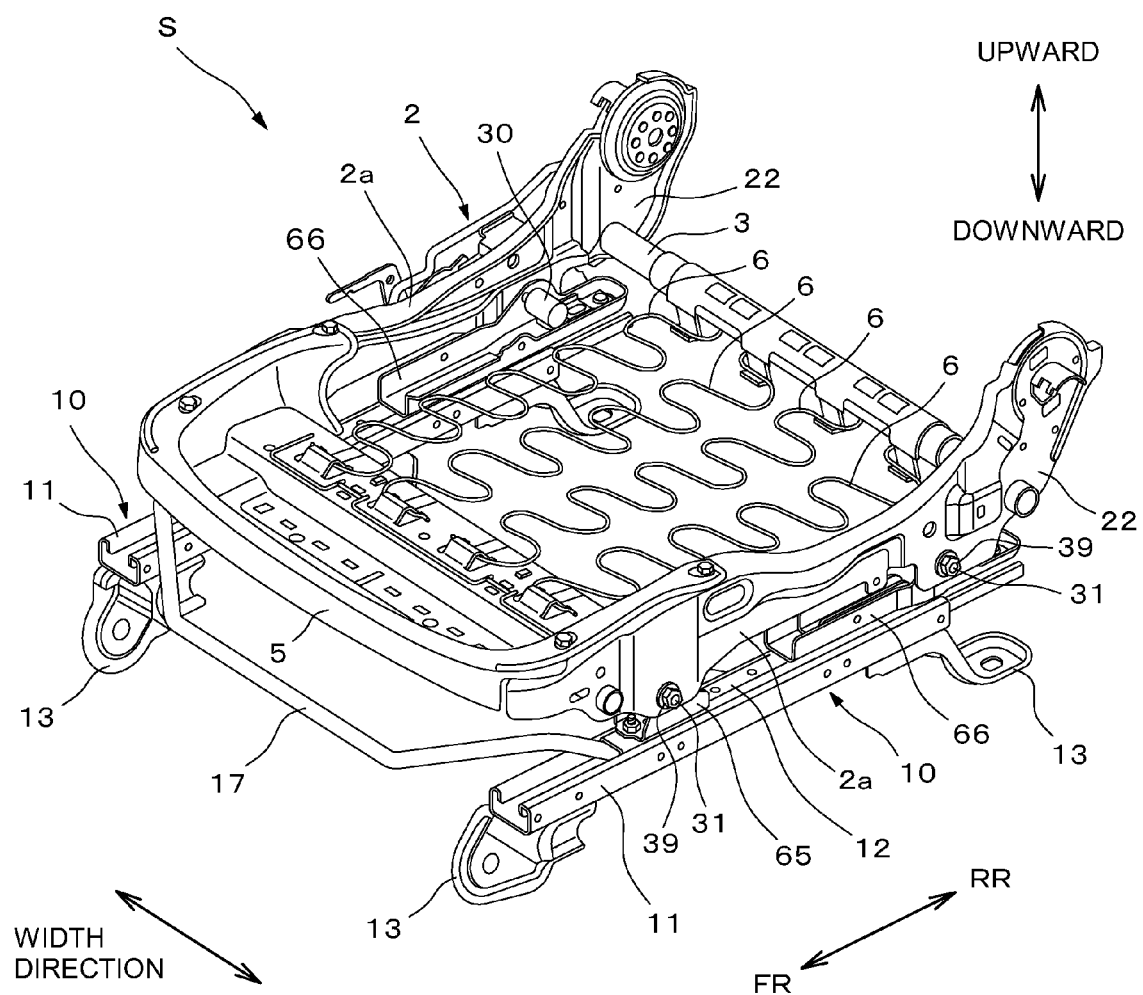
FIG. 19 is a perspective view illustrating the seat unit according to the other embodiment.
Figure 20:
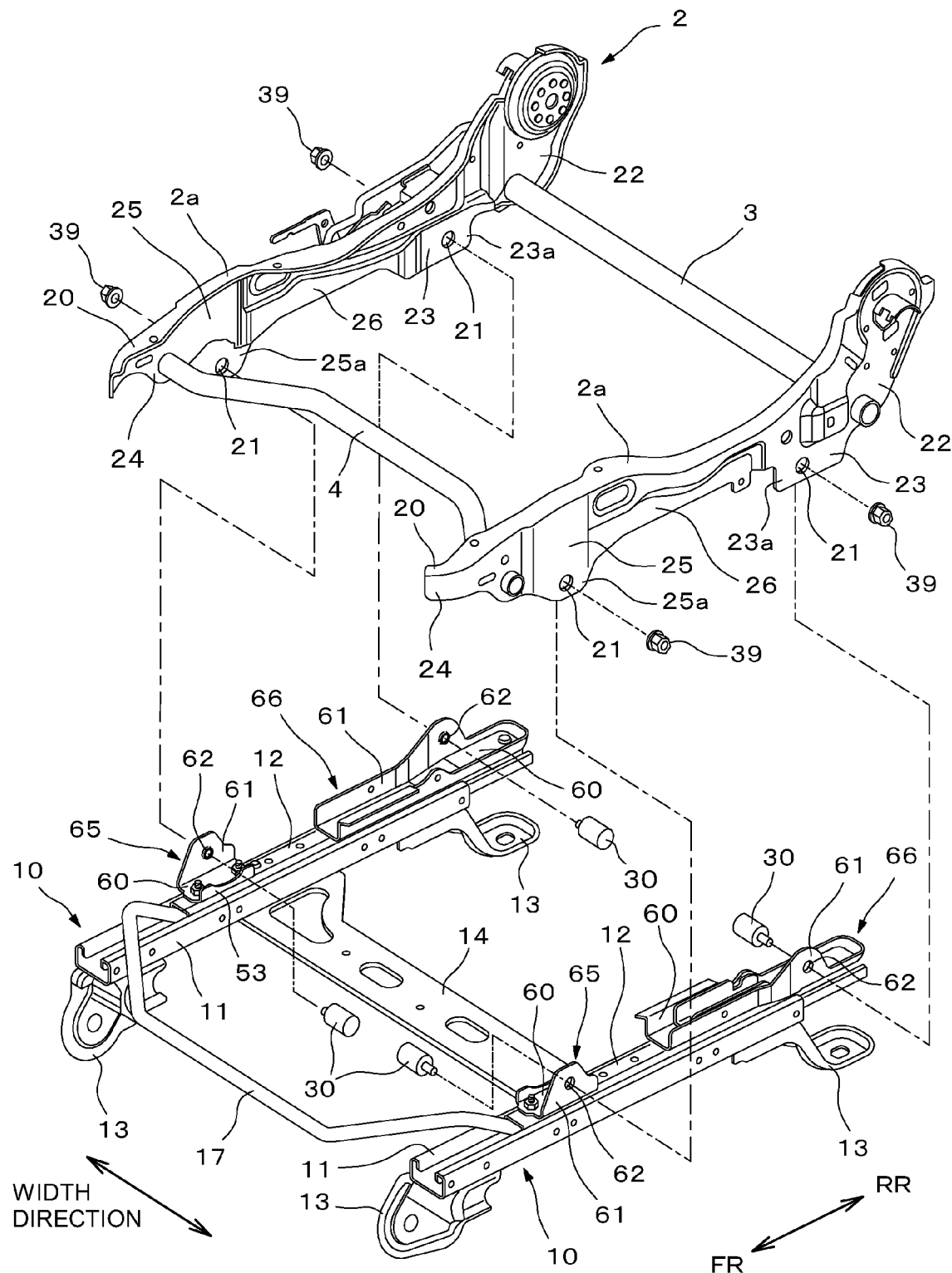
FIG. 20 is an exploded diagram of the seat unit according to the other embodiment.
Figure 21:
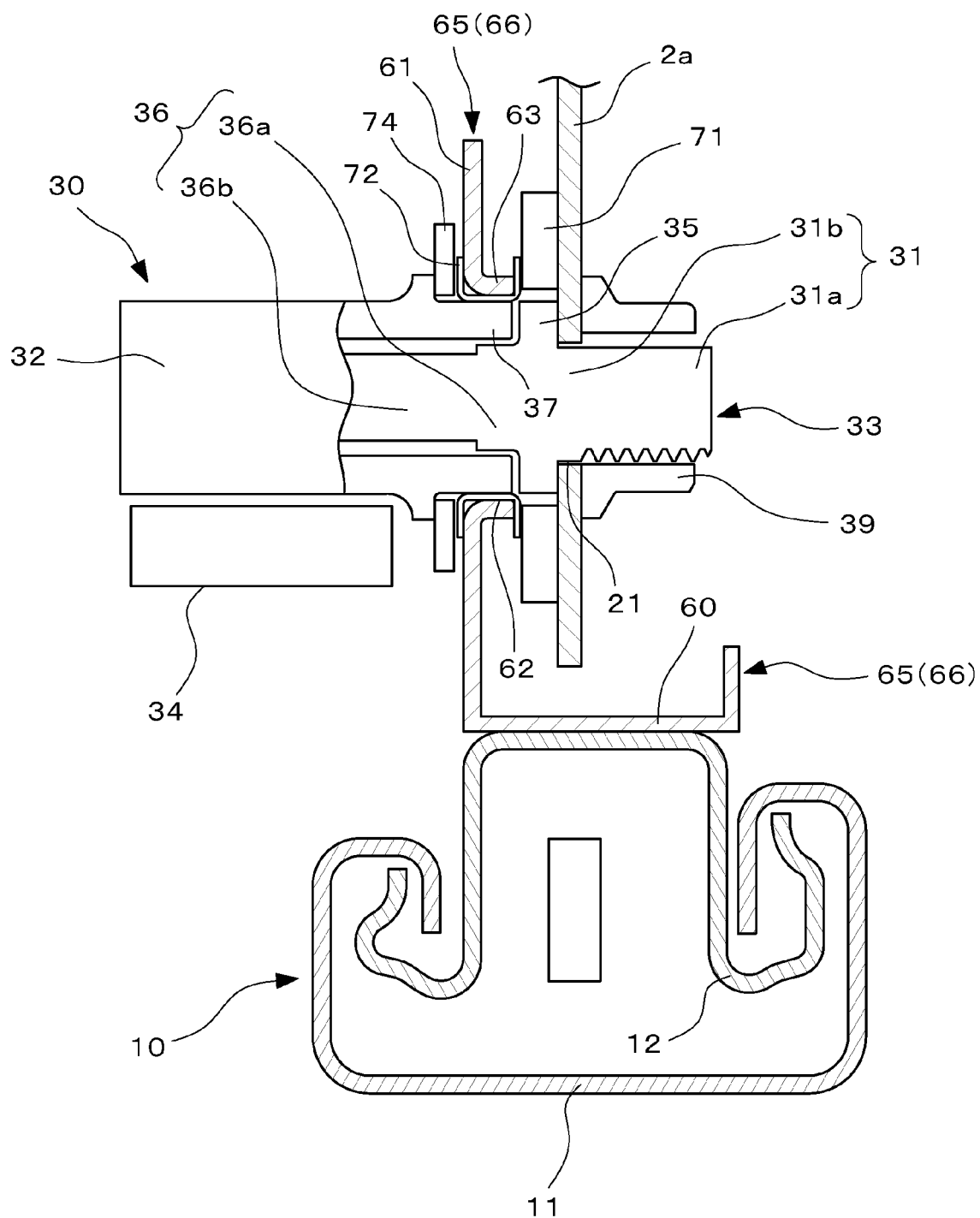
FIG. 21 is a cross-sectional view illustrating the support structure for the load measurement sensor according to the other embodiment.

Furthermore, in the configuration illustrated in FIGS. 19 and 21, the sensor receiving brackets 65 and 66 are fixed to the upper surface of the upper rail 12, but the sensor receiving brackets 65 and 66 may be attached to the side surface of the upper rail 12. Such a configuration is very appropriate for inhibiting an increase in size of the seat unit S in the vertical direction. More specifically, the sensor receiving brackets 65 and 66 are integrated, and the integrated sensor receiving bracket may be attached from the front end to the rear end of the side surface of the upper rail 12. In such a configuration, the support rigidity with respect to the sensor receiving bracket is improved. In addition, when the sensor receiving brackets 65 and 66 are disposed in the space between the lower rail 11 and the upper rail 12 in the width direction, an increase in size of the seat unit S in the width direction may be inhibited.

On the other hand, the sensor body 32 of the sensor 30 according to the other embodiment includes the load detection portion 37 which is deformed to detect the load. The load detection portion 37 indicates a portion which is deformed in response to the magnitude of the load applied to the vehicle seat Z. Specifically, the load detection portion 37 indicates the annular portion which is positioned at the opening end in the outer cylindrical body forming the sensor body 32. The end of the annular portion near the free end is inserted into the insertion hole 62 which is formed in the upright wall portion 61 of the sensor receiving brackets 65 and 66 in a state where the sensor 30 is fixed and supported to the side frame 2*a*.

Then, when a load is generated due to the passenger sitting on the vehicle seat Z, the end of the annular portion near the free end is deformed to be inward in the radial direction of the annular portion when the upper portion of the outer peripheral surface is pressed against the sensor receiving brackets 65 and 66. That is, even in the other embodiment, as in the specification example, the upper portion of the outer peripheral surface of the annular portion serving as the load detection portion 37 corresponds to the load receiving surface 37*a*.

In the other embodiment, as illustrated in FIG. 21, the sensor 30 is fixed and supported to the side frame 2*a* so that the extension shaft portion 31 is positioned at the side portion of the sensor body 32. Specifically, as described above, the hole portion 21 provided in the side frame 2*a* overlap the insertion hole 62 formed in the sensor receiving brackets 65 and 66, and the extension shaft portion 31 of the sensor 30 is inserted into both holes from the inside of the sensor receiving brackets 65 and 66. Accordingly, in the sensor 30, the end of the annular portion near the free end is loosely inserted into the insertion hole 62 of the sensor receiving brackets 65 and 66.

In addition, the male screw portion 31*a* of the extension shaft portion 31 protrudes toward the outside of the side frame 2*a* from the side frame 2*a* of the hole portion 21, and the nut 39 is threaded into the male screw portion 31*a*. In this way, when the extension shaft portion 31 is fastened to the side frame 2*a*, the sensor 30 is fixed and supported to the side frame 2*a*. Then, even in the other embodiment, the sensor 30 is supported in a state where the extension shaft portion 31 is positioned at the side portion of the sensor body 32, and more specifically, the axial direction of the extension shaft portion 31 follows the width direction. Furthermore, the sensor 30 which is supported to the side frame 2a is held in a cantilevered state, and more specifically, a state where the opposite side to the extension shaft portion 31 becomes a free end.

When the passenger sits on the vehicle seat Z to which the sensor 30 is set in such a state, the load at this time (indicated by the arrow F in FIG. 24) is transmitted to the load detection portion 37 through the side frame 2a and the sensor receiving brackets 65 and 66. Specifically, when the passenger sits on the vehicle seat Z, the side frame 2a presses the upper end of the adjacent portion 31b of the extension shaft portion 31 downward by the load in the hole portion 21 of the side frame 2a. The pressing force corresponds to the load which is generated when the passenger sits on the vehicle seat Z. For this reason, the portion of the side frame 2a provided with the hole portion 21 corresponds to the load input portion, and comes into contact with a portion different from the load receiving surface 37a in the sensor 30 to input the load to the sensor 30.

Figure 24:
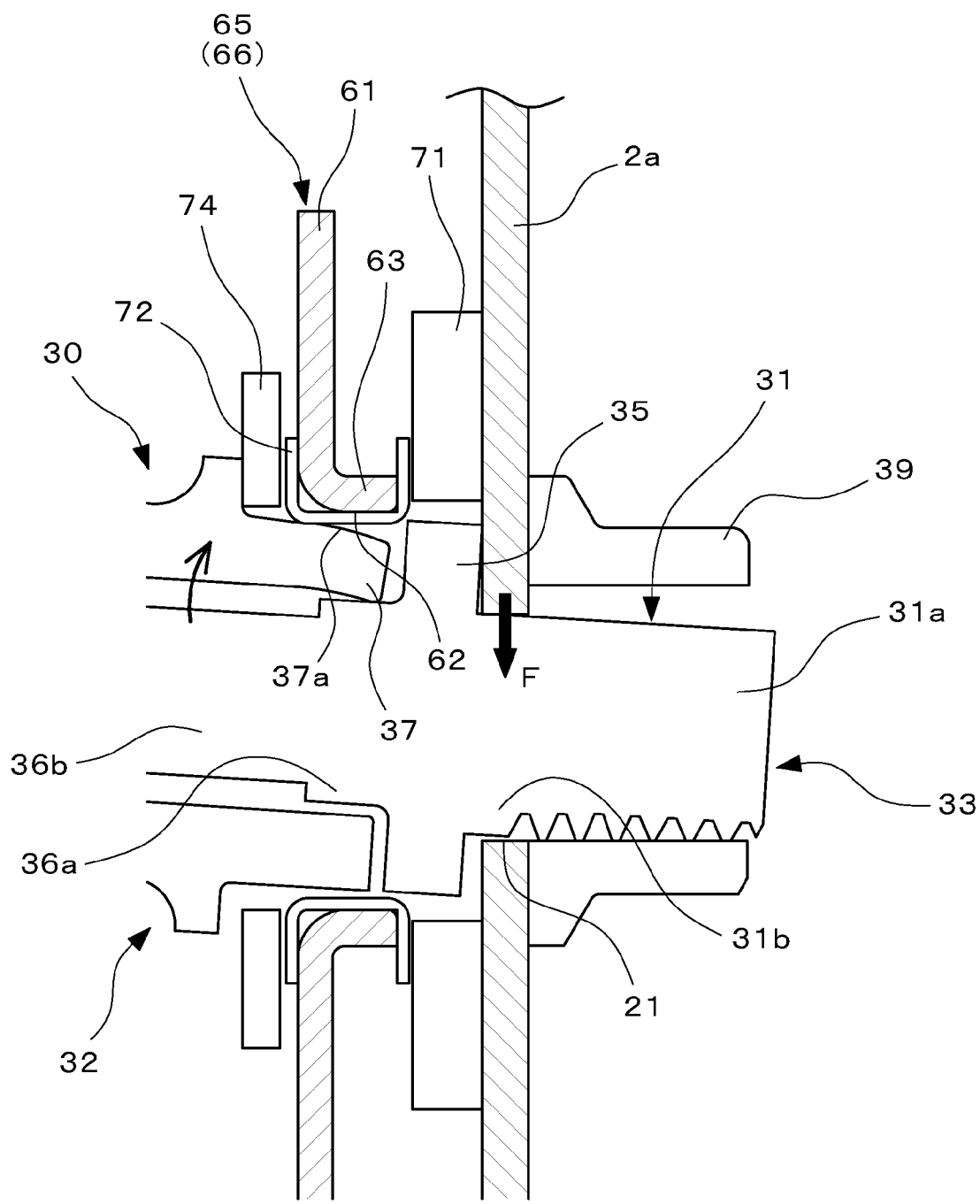
FIG. 24 is a diagram illustrating a state of the load measurement sensor and the periphery thereof when a load is generated.

When the pressing force of the side frame 2a, that is, the load generated when the passenger sits on the vehicle seat Z is input, the sensor 30 rotates about a predetermined position as illustrated in FIG. 24 by the rotation moment generated by the input load from the side frame 2a. With such a rotation, the annular portion of the sensor body 32 provided with the load receiving surface 37a is pressed against the sensor receiving brackets 65 and 66, and particularly, the inner peripheral surface of the insertion hole 62 provided in the upright wall portion 61 through a sliding member 72 to be described later. For this reason, in the upright wall portion 61 of the sensor receiving brackets 65 and 66, the portion provided with the insertion hole 62 forms the sensor body receiving portion against which the sensor body 32 is pressed with the rotation of the sensor 30.

Then, when the load receiving surface 37a which is formed in the upper portion of the outer peripheral surface of the annular portion is pressed against the upright wall portion 61 of the sensor receiving brackets 65 and 66, as illustrated in FIG. 24, the end of the annular portion near the free end is deformed to be inclined inward in the radial direction by the reaction force.

As described above, in the other embodiment, when the passenger sits on the vehicle seat Z, the load is first input from the side frame 2a to the extension shaft portion 31 of the sensor 30, so that the sensor 30 rotates by the input load. With the rotation, the upper portion of the outer peripheral surface of the annular portion serving as the load detection portion 37 is pressed against the upright wall portion 61 of the sensor receiving brackets 65 and 66. Finally, the end of the annular portion near the free end is deformed to be warped inward in the radial direction. In this way, in the other embodiment, the load which is applied to the vehicle seat Z is transmitted to the load detection portion 37 through the side frame 2a and the sensor receiving brackets 65 and 66 and further the rotation of the sensor 30.

Furthermore, as in the specification example, the even diameter portion 36a of the accommodation shaft portion 36 is disposed at the inside in the radial direction of the annular portion. For this reason, when the strain amount obtained when the end of the annular portion near the free end is warped inward in the radial direction due to the load reaches a predetermined amount, the even diameter portion 36a comes into contact with the annular portion. That is, even in the other embodiment, as in the specification example, when the annular portion is deformed to be warped inward in the radial direction, the even diameter portion 36a comes into contact with the annular portion, so that the further strain amount of the annular portion is regulated.

More specifically, in the even diameter portion 36a, the region which comes into contact with the annular portion when the annular portion is warped inward in the radial direction has a constant wide area in the axial direction of the extension shaft portion 31. Such a region inhibits the excessive deformation of the annular portion due to the biased load or the like, so that the sensor 30 stably measures the load. Furthermore, in the annular portion, the even diameter portion 36a is present in the range where the annular portion is pressed against the sensor receiving brackets 65 and 66. Accordingly, in the range where the annular portion is pressed against the sensor receiving brackets 65 and 66, the even diameter portion 36a receives the annular portion. As a result, in the embodiment, the further stable load measurement may be performed.

Further, in the even diameter portion 36a, the regions which are positioned at both sides of the region of regulating the deformation of the annular portion serves as the foreign matter intrusion inhibiting portion which inhibits foreign matter from intruding between the annular portion and the accommodation shaft portion 36 as in the specification example.

Next, the support structure for the sensor 30 according to the other embodiment will be described. Furthermore, the vehicle seat Z is formed in a substantially bisymmetrical shape, and hereinafter, only the configuration at one end side of the width direction of the vehicle seat Z will be described.

Figure 23:
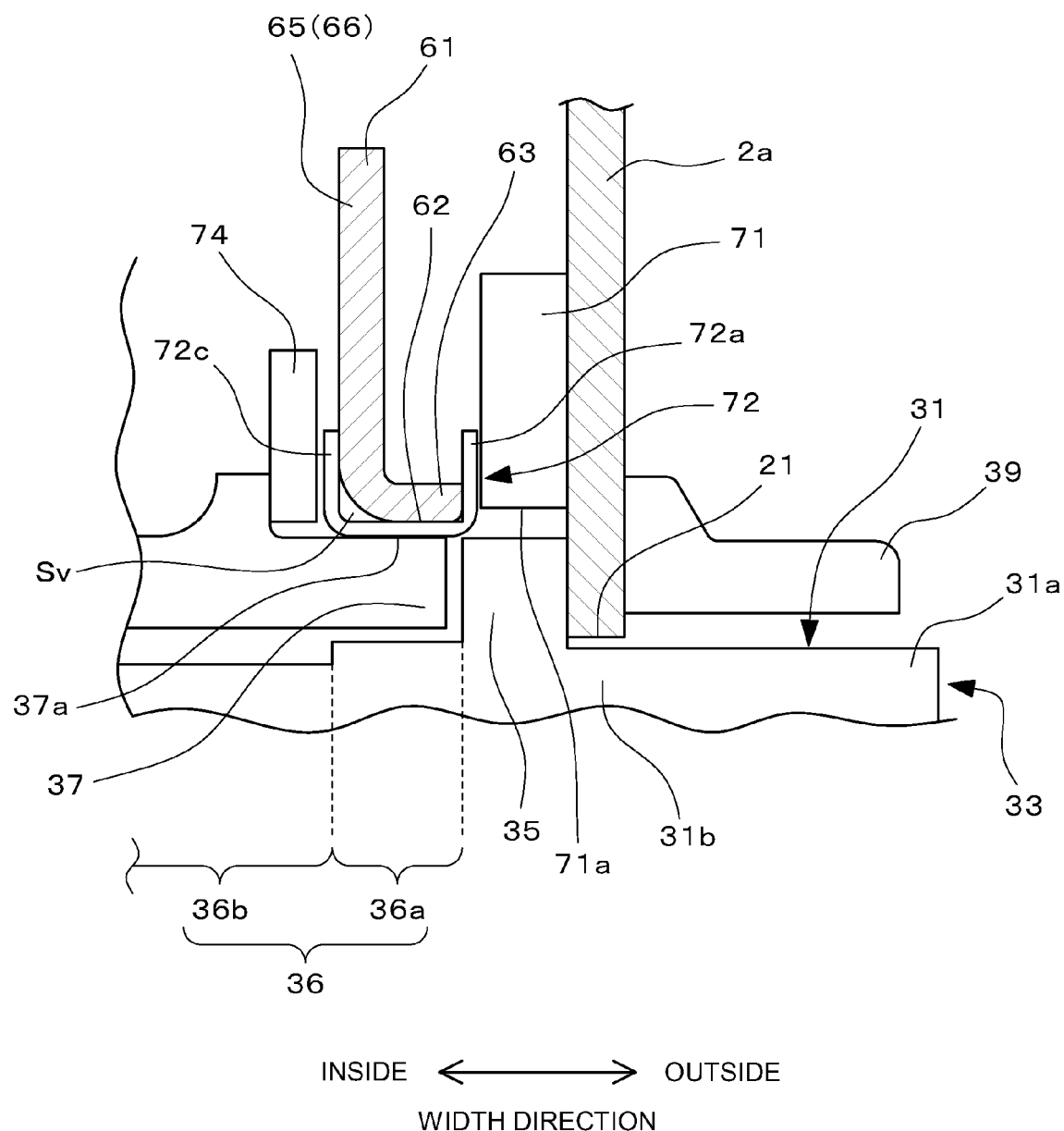
FIG. 23 is a partially enlarged diagram of the support structure for the load measurement sensor according to the other embodiment.

The sensor 30 is, as illustrated in FIG. 23, supported to connect the side frame 2a and the sensor receiving brackets 65 and 66. That is, the sensor 30 is supported across the side frame 2a and the sensor receiving brackets 65 and 66.

On the other hand, the side frame 2a is provided with the circular hole portion 21, and the adjacent portion 31b of the extension shaft portion 31 of the sensor 30 is loosely inserted into the hole portion 21.

The sensor receiving brackets 65 and 66 are formed separately from the upper rail 12, extend along the front-to-back direction of the vehicle seat Z, and are detachably fixed to the upper surface of the upper rail 12 by the bolt. Since the sensor receiving brackets 65 and 66 are formed separately from the upper rail 12, the sensor 30 may be easily attached again even when the design of the seat is changed. In this way, the general versatility of the support structure for the sensor 30 is improved, and the maintenance workability is improved. Here, the sensor receiving brackets 65 and 66 may be integrated with the lower rail 11 or the upper rail 12. In other words, the sensor receiving brackets 65 and 66 may form at least a part of the rail member. With such a configuration, since a part of the rail member having a comparatively high rigidity is used as the sensor receiving brackets 65 and 66, the rigidity of the sensor receiving brackets 65 and 66 is ensured. As a result, the load detection portion 37 of the sensor body 32 is stably pressed against the sensor receiving brackets 65 and 66.

Further, in the other embodiment, the front sensor receiving bracket 65 is provided in the front end of the upper rail 12, and the rear sensor receiving bracket 66 is provided in the rear end of the upper rail 12. In this way, when two sensor receiving brackets 65 and 66 are away from each other in the front-to-back direction of the vehicle seat Z, the arrangement of the respective sensor receiving brackets 65 and 66 may be individually adjusted, so that the bracket position adjusting precision is improved. Here, the invention is not limited thereto. For example, a configuration in which the sensor receiving bracket is integrated without being divided into the front and rear portions, a configuration in which the front sensor receiving brackets 65 are connected to each other and the rear sensor receiving brackets 66 are connected to each other, and a configuration which is obtained by the combination thereof may be adopted. With such a configuration, the rigidity of the sensor receiving brackets 65 and 66 is improved.

Here, the front sensor receiving bracket 65 and the rear sensor receiving bracket 66 have different lengths in the front-to-back direction, but have substantially the same basic structures. Hereinafter, only the structure of the front sensor receiving bracket 65 will be described.

The sensor receiving bracket 65 includes, as illustrated in FIG. 20, a bottom wall portion 60 which is placed on the upper surface of the upper rail 12 and an upright wall portion 61 which is substantially formed upright in the perpendicular direction from the outer end of the bottom wall portion 60 in the width direction. Then, as described above, the upright wall portion 61 is provided with the insertion hole 62, and the annular portion provided as the load detection portion 37 in the sensor 30 is loosely inserted into the insertion hole 62.

Furthermore, as illustrated in FIG. 21, in the upright wall portion 61, a burring process is performed on the outer edge of the insertion hole 62. Accordingly, in the upright wall portion 61, the outer edge of the insertion hole 62 is bent in an annular shape to form an annular portion 63. The annular portion 63 indicates a portion of the upright wall portion 61 which has the insertion hole 62 formed therein and slightly protrudes outward in the width direction, that is, toward the installation side of the adjacent side frame 2a. Since the annular portion 63 is formed, the length of the insertion hole 62 in the width direction becomes longer by the amount of the annular portion 63.

Further, in the embodiment, in the upright wall portion 61, a portion which is bent to form the annular portion 63 is bent in a round shape as illustrated in FIG. 23. That is, in the upright wall portion 62, the opening edge of the insertion hole 62 which is positioned at the opposite side to the installation side of the annular portion 63 is chamfered to be rounded.

Further, in the upright wall portion 61, the portion which is positioned below the insertion hole 62 extends along the vertical direction toward the vehicle body floor, that is, downward. Accordingly, since the upright wall portion 61 is widened in the width direction, an increase in size of the vehicle seat Z may be inhibited.

Then, when the insertion hole 62 formed in each of the sensor receiving brackets 65 and 66 overlaps the hole portion 21 formed in the side frame 2a to communicate therewith and the extension shaft portion 31 of the sensor 30 is inserted into two overlapping holes from the inside of the upright wall portion 61 of the sensor receiving brackets 65 and 66. At this time, the sensor 30 is inserted until the positioning portion 35 provided in the sensor body 32 comes into contact with the inner surface of the upright wall portion 61. Accordingly, the sensor 30 is positioned in the width direction.

When the sensor 30 is positioned, the annular portion serving as the load detection portion 37 in the sensor body 32 is loosely inserted into the insertion hole 62 formed in the upright wall portion 61 of the sensor receiving brackets 65 and 66. Also, the male screw portion 31a of the extension shaft portion 31 protrudes outward from the hole portion 21 of the side frame 2a, and the adjacent portion 31b is fitted into the hole portion 21. In addition, the nut 39 is threaded into the male screw portion 31a which protrudes from the hole portion 21 of the side frame 2a, so that the extension shaft portion 31 is fastened to the side frame 2a. With the above-described procedure, the sensor 30 is supported by the side frame 2a.

When the sensor 30 is supported by the side frame 2a, the sensor 30 is interposed between the portion of the side frame 2a provided with the hole portion 21 and each portion of the sensor receiving brackets 65 and 66 provided with the insertion hole 62. Here, the portion of the side frame 2a provided with the hole portion 21 corresponds to the load input portion which inputs the load applied to the vehicle seat Z to the sensor 30. On the other hand, each portion of the sensor receiving brackets 65 and 66 provided with the insertion hole 62 corresponds to the sensor body receiving portion against which the annular portion of the sensor body 32 is pressed through the sliding member 72 to be described later when the load 30 rotates by the load. That is, in the other embodiment, in a state where the sensor 30 is supported by the side frame 2a, the load input portion and the sensor body receiving portion are away from each other in the axial direction of the extension shaft portion 31.

As described above, when the load input portion and the sensor body receiving portion are away from each other in the axial direction of the extension shaft portion 31, the load is input from the load input portion to the sensor 30, so that the sensor 30 rotates. With the rotation of the sensor 30, the end of the annular portion of the sensor body 32 near the free end is pressed against the sensor body receiving portion through the sliding member 72, so that the end of the annular portion near the free end is deformed to be warped inward in the radial direction. That is, the load which is input from the load input portion is appropriately transmitted to the annular portion in a manner such that the annular portion moves to a position where the annular portion is pressed against the sensor body receiving portion with the rotation of the sensor 30. At this time, even when the load input from the load input portion is minute, the load is appropriately transmitted from the load input portion to the annular portion by the principle of a lever.

With the above-described action, in the embodiment, the load input from the load input portion may be appropriately transmitted to the load transmission portion 37, so that the load may be accurately measured.

Furthermore, in a state where the sensor 30 is supported by the side frame 2a, the portion of the side frame 2a provided with the hole portion 21 is positioned at the opposite side to the sensor body 32 which is supported by the sensor receiving brackets 65 and 66 when seen from the near sensor receiving brackets 65 and 66. That is, in the other embodiment, the load input portion is positioned at the opposite side to the sensor body 32 in the axial direction of the extension shaft portion 31 when seen from the sensor body receiving portion. With such a positional relation, since the load input portion is away from the sensor body 32, for example, even when the excessive load is input from the load input portion, the excessive load is not directly applied to the sensor body 32, so that the sensor body 32 may be protected.

Further, as described above, when the sensor 30 rotates by the load generated when the passenger sits on the vehicle seat Z, the annular portion of the sensor body 32 is pressed against the inner peripheral surface of the insertion hole 62 provided in the upright wall portion 61 of the sensor receiving brackets 65 and 66 through the sliding member 72. Here, in the embodiment, the portion of the upright wall portion 61 provided with the insertion hole 62 is provided with the annular portion 63 which is formed by a burring process. That is, in the embodiment, the area of the inner peripheral surface of the insertion hole 62 is widened by the area of the annular portion 63. Accordingly, the annular portion is easily pressed against the inner peripheral surface of the insertion hole 62, so that the load is easily transmitted to the deformation portion. That is, the annular portion 63 is a portion which is formed to widen the area where the annular portion of the sensor body 32 is pressed against the inner peripheral surface of the insertion hole 62.

In addition, the annular portion 63 which is formed in the upright wall portion 61 of the sensor receiving brackets 65 and 66 protrudes toward the side frame 2a, that is, the installation side of the load input portion in the width direction. With such a configuration, when the sensor 30 rotates by the input load so that the annular portion of the sensor body 32 is pressed against the inner peripheral surface of the insertion hole 62, as illustrated in FIG. 24, first, the annular portion is pressed against the base end having a comparatively high rigidity in the annular portion 63. As a result, the annular portion is appropriately pressed against the inner peripheral surface of the insertion hole 62.

Figure 25:
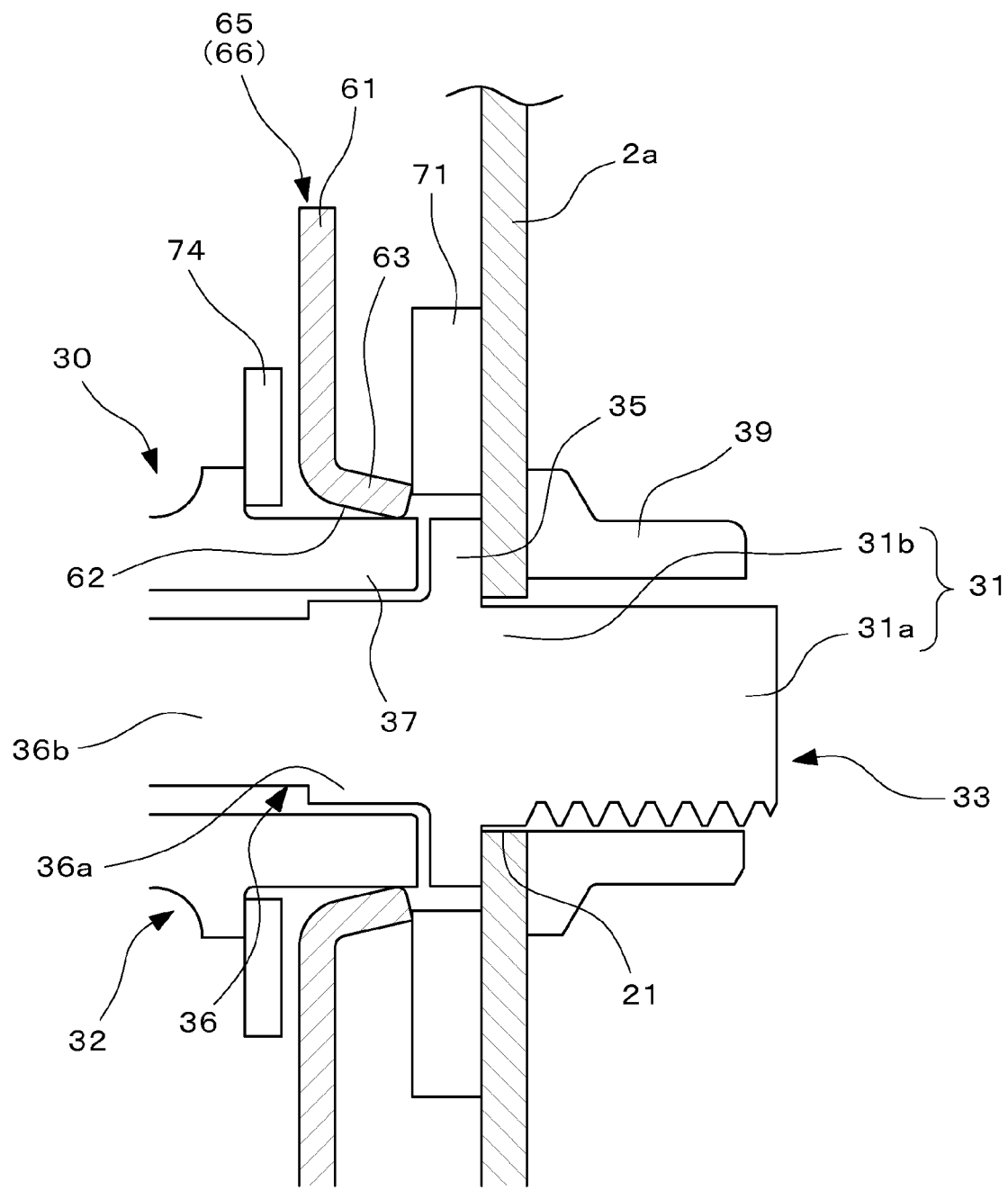
FIG. 25 is a diagram illustrating a first modified example of the support structure for the load measurement sensor according to the other embodiment.

Furthermore, when the annular portion is pressed against the inner peripheral surface of the insertion hole 62 by the rotation of the sensor 30, the load receiving surface 37a in the upper portion of the outer peripheral surface of the annular portion comes into contact with the inner peripheral surface of the insertion hole 62 while being inclined with respect to the axis of the annular portion. Here, in order to firmly and more efficiently press the annular portion against the inner peripheral surface of the insertion hole 62 by increasing the region of the load receiving surface 37a coming into contact with the inner peripheral surface of the insertion hole 62, as illustrated in FIG. 25, the shape of the annular portion 63 is formed in a tapered shape of which the diameter decreases toward the free end. For example, the inner peripheral surface of the insertion hole 62 may be formed as a surface which is inclined with respect to the axis of the annular portion to correspond to the inclination of the load receiving surface 37a.

Figure 26:
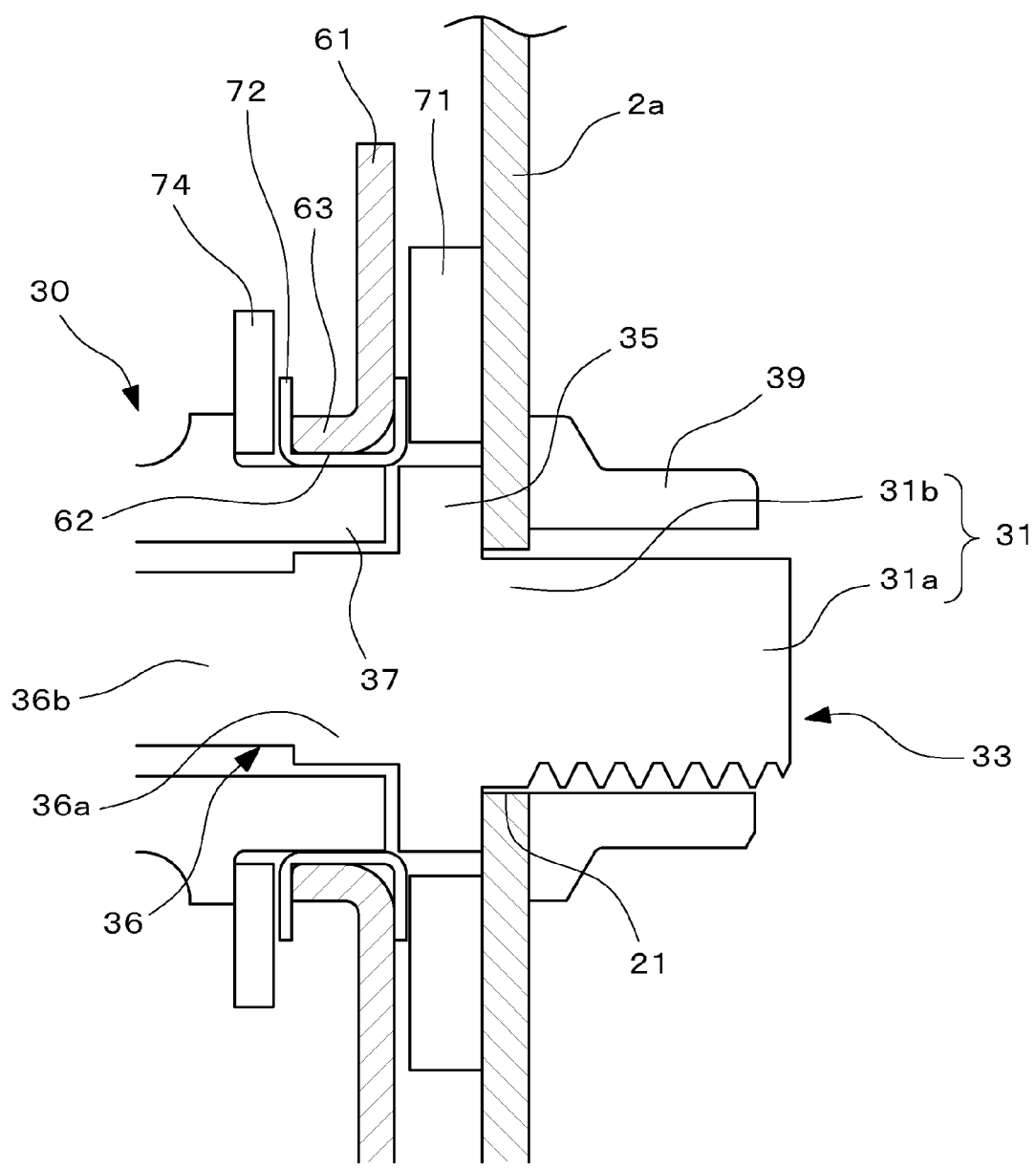
FIG. 26 is a diagram illustrating a second modified example of the support structure for the load measurement sensor according to the other embodiment.
Figure 26:
Figure 27:
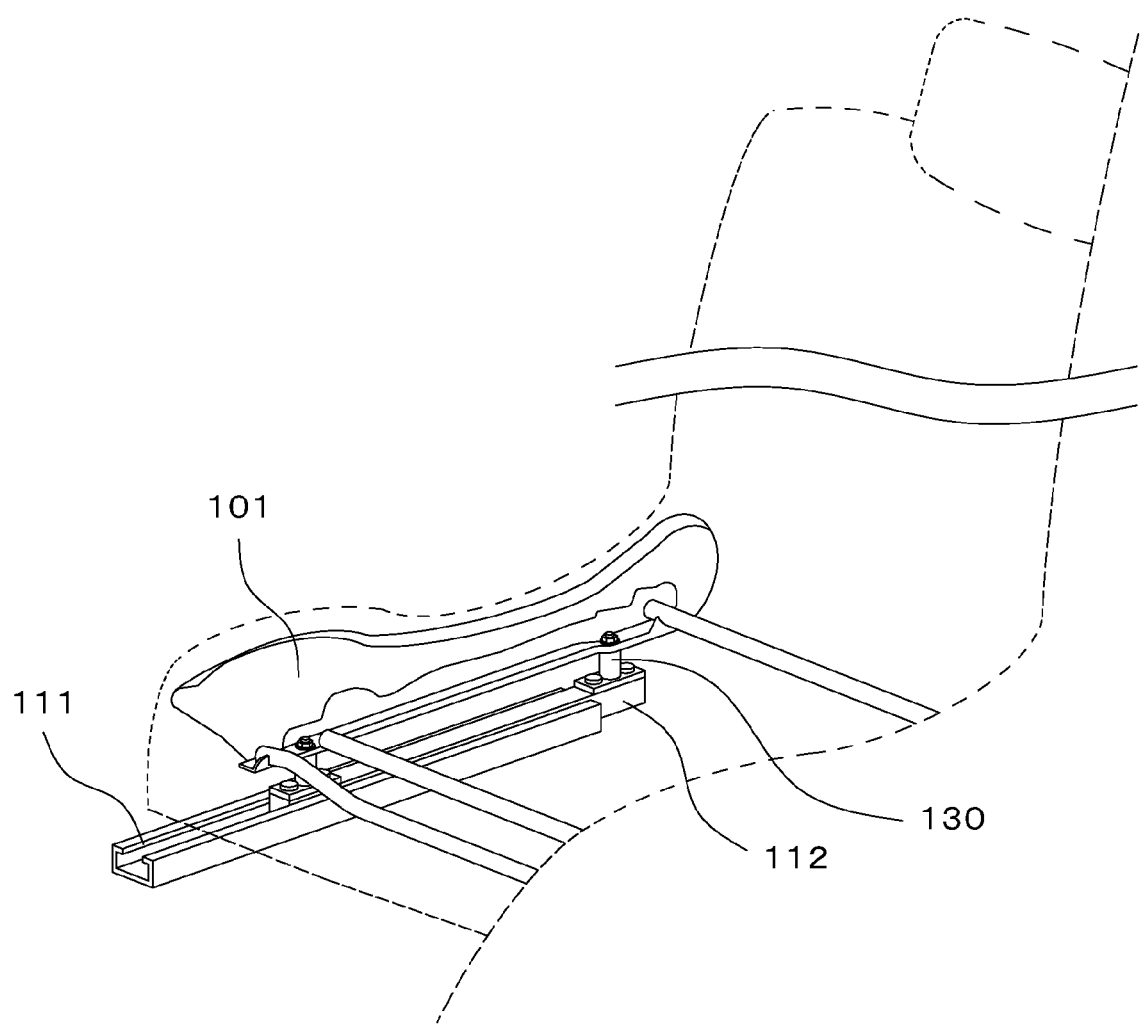
FIG. 27 is a partially perspective view illustrating a vehicle seat that adopts a support structure for a load measurement sensor according to the related art.
Figure 28:
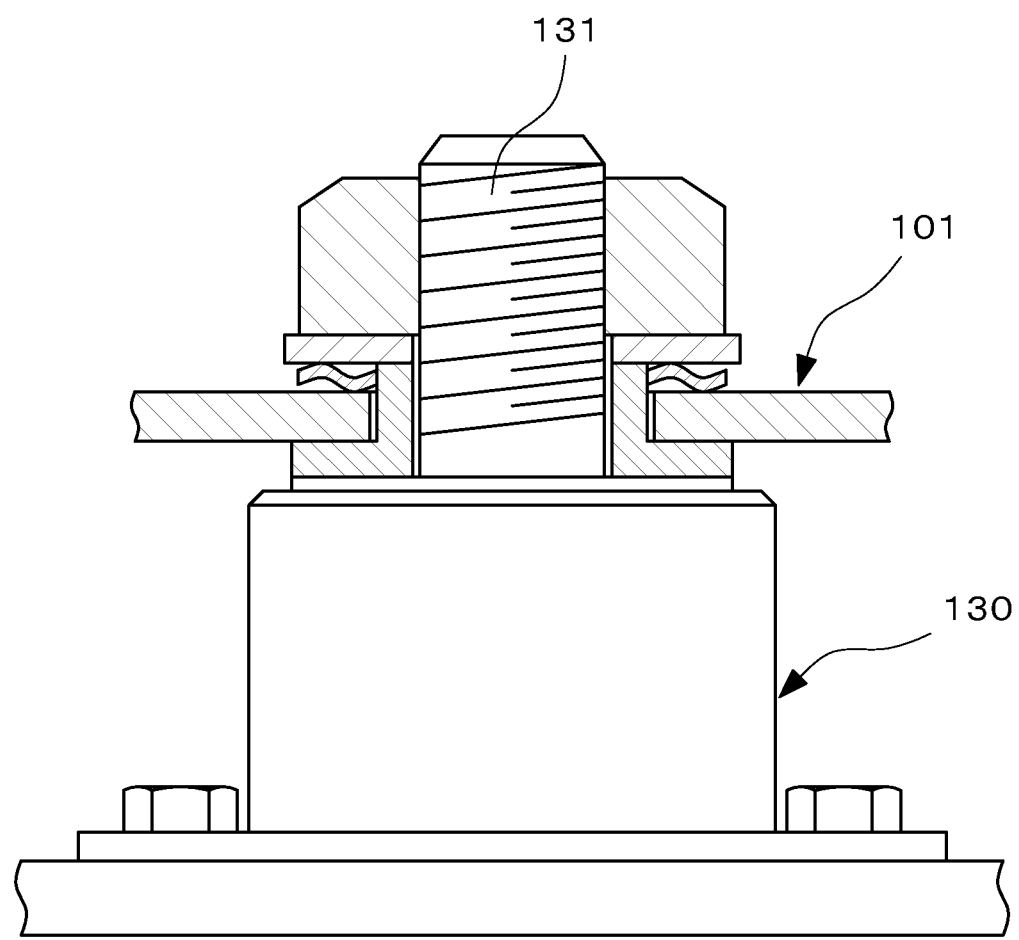
FIG. 28 is a cross-sectional view of a support structure for the load measurement sensor according to the related art.

Further, a configuration is exemplified in which the annular portion 63 protrudes toward the side frame 2a in the width direction. However, as illustrated in FIG. 26, the annular portion may protrude toward the opposite side to the side frame 2a, that is, the opposite side to the installation side of the load input portion. In such a configuration, when the sensor 30 rotates by the load input from the load input portion so that the annular portion of the sensor body 32 is pressed against the inner peripheral surface of the insertion hole 62, first, the annular portion is pressed against the inner peripheral surface of the insertion hole 62 at the free end of the annular portion 63. Accordingly, for example, even when the excessive load is input from the load input portion, the annular portion is pressed against the inner peripheral surface of the insertion hole 62 at the free end of the annular portion 63, the excessive load may be absorbed by releasing the impact load which is generated by the collision between the annular portion and the annular portion 63 due to the bending deformation of the free end.

On the other hand, in a state where the sensor 30 is supported by the side frame 2a, the even diameter portion 36a of the accommodation shaft portion 36 is disposed at the inside of the annular portion, and a part thereof forms the regulation portion which regulates the excessive deformation of the annular portion. Further, the region of the accommodation shaft portion 36 which is adjacent to the even diameter portion 36a may include a tapered portion in the uneven diameter portion 36b, and a part of the tapered portion is disposed inside the annular portion.

On the other hand, in a state where the sensor 30 is supported by the side frame 2a, the annular portion is loosely inserted into the insertion hole 62, so the even diameter portion 36a of the accommodation shaft portion 36 and the tapered portion of the uneven diameter portion 36b are partly disposed inside the insertion hole 62. In other words, the length of the insertion hole 62 is set to an extent in which the entire even diameter portion 36a is settled in the range from one end of the insertion hole 62 to the other end thereof when the sensor 30 is supported by the side frame 2a. With such a configuration, in the annular portion, the entire portion which is warped inward in the radial direction to comes into contact with the even diameter portion 36a is surrounded by the annular portion 63. Accordingly, since the annular portion 63 is butted against the portion of the annular portion which is warped due to the load transmitted thereto, the load is reliably transmitted thereto.

Further, in a state where the sensor 30 is supported by the side frame 2a, the upper ends of the sensor receiving brackets 65 and 66 are positioned above the sensor 30 or the sensor attachment component 70, that is, a spacer 71, the sliding member 72, and a washer 74 to be described later. In this way, when the sensor receiving brackets 65 and 66 are formed above the sensor 30 or the sensor attachment component 70 serving as the subject support body, the support rigidity with respect to the subject support body is improved.

Next, the sensor attachment component 70 will be described which appropriately supports the sensor 30 to satisfactorily transmit the load to the sensor 30. As for the sensor attachment component 70, as illustrated in FIG. 21, the spacer 71, the sliding member 72, and the washer 74 are sequentially arranged from the outside in the width direction, and the component set is provided for each sensor 30. Furthermore, the other embodiment is different from the specification example in that the member corresponding to the bush 43 serving as the load transmission portion or the load transmission member is not provided.

Figure 22:
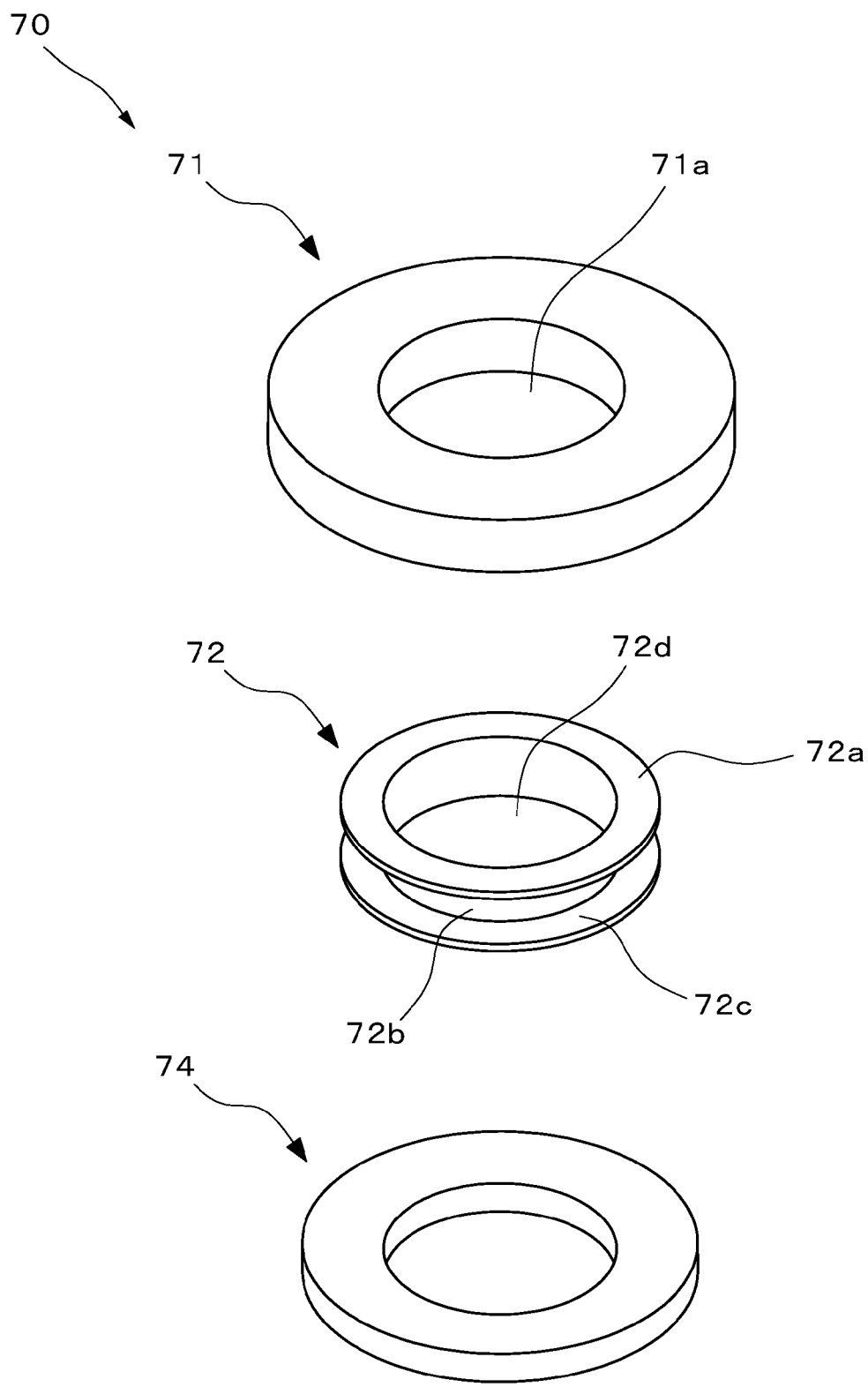
FIG. 22 is a component perspective view illustrating respective sensor attachment components according to the other embodiment.

In the sensor attachment component 70, the sliding member 72 is a cylindrical body illustrated in FIG. 22, and is fitted into the insertion hole 62 which is formed in the upright wall portion 61 of the sensor receiving brackets 65 and 66. Then, the annular portion of the sensor body 32 serving as the load detection portion 37 is fitted to a penetration hole 72d formed in the sliding member 72, and is pressed against the inner peripheral surface of the insertion hole 62 through the sliding member 72. At this time, the sliding member 72 comes into contact with the upper portion of the outer peripheral surface of the annular portion, that is, the load receiving surface 37a to transmit the load to the sensor body 32. That is, in the other embodiment, the sliding member 72 corresponds to the contact portion or the load input member as in the sliding member 42 of the specification example.

More specifically, the sliding member 72 is attached to the sensor receiving brackets 65 and 66 while the center portion thereof in the axial direction is inserted into the insertion hole 62 of the sensor receiving brackets 65 and 66. At this time, the sliding member 72 is attached to the sensor receiving brackets 65 and 66 so that the axial direction of the sliding member 72 is equal to the width direction of the vehicle seat Z. In this way, in the other embodiment, the sensor receiving brackets 65 and 66 which are disposed at the inside in the width direction of the side frame 2a correspond to the attachment member, and the sliding member 72 serving as the contact portion is attached to the portion of the sensor receiving brackets 65 and 66 provided with the insertion hole 62.

Further, in a state where the sensor 30 is supported by the side frame 2a, the portion from the free end to the position slightly in front of the base end in the annular portion serving as the load detection portion 37 is fitted into the sliding member 72.

Then, when the sensor 30 rotates by the load applied to the vehicle seat Z so that the annular portion serving as the load detection portion 37 is pressed against the inner peripheral surface of the insertion hole 62 in the sensor receiving brackets 65 and 66, the sliding member 72 comes into contact with the outer periphery of the annular portion. That is, the annular portion is pressed against the inner peripheral surface of the insertion hole 62 through the sliding member 72. In other words, the sliding member 72 inputs the load generated from the vehicle seat Z through the inner peripheral surface coming into contact with the annular portion of the sensor body 32, so that the inner peripheral surface of the penetration hole 72d formed in the sliding member 72 corresponds to the load input surface.

Further, when the annular portion is pressed against the inner peripheral surface of the insertion hole 62 through the sliding member 72, the sliding member 42 slides on the outer peripheral surface of the annular portion to move between the spacer 71 and the washer 74. That is, the sliding member 72 is formed to be movable in the axial direction of the extension shaft portion 31 with respect to the load receiving surface 37a. Then, when the annular portion is pressed against the inner peripheral surface of the insertion hole 62 by the rotation of the sensor 30 so that the free end of the annular portion is warped inward in the radial direction, the sliding member 72 slides on the outer peripheral surface of the annular portion outward in the width direction, that is, toward the side frame 2a to follow the strain deformation. In this way, when the sliding member 72 slides outward in the width direction, the annular portion receives the load from the side frame 2a provided with the fixed end of the sensor 30. As a result, since the load is stably transmitted to the annular portion, the detection precision is improved.

In addition, in a state where the sensor 30 is supported by the side frame 2a, the sliding member 72 is disposed across the free end of the annular portion in the width direction. Accordingly, when the annular portion is pressed against the inner peripheral surface of the insertion hole 62 through the sliding member 72, the annular portion is satisfactorily deformed to be warped, so that the load detection precision is improved.

The sliding member 72 with the above-described function includes, as illustrated in FIG. 22, a cylindrical fitting cylindrical portion 72b which is provided at the center of the axial direction and flange portions 72a and 72c which are formed at both ends in the axial direction. Furthermore, the axial direction of the sliding member 72 is equal to the sliding direction of the sliding member 72. Then, in a state where the sliding member 72 is attached to the sensor receiving brackets 65 and 66, the fitting cylindrical portion 72b is inserted into the insertion hole 62, the one end side flange portion 72a in the axial direction is adjacent to the free end at the outside of the free end of the annular portion 63 in the width direction, and the other end side flange portion 72c is adjacent to the inner surface of the upright wall portion 61 in the axial direction. That is, when the sliding member 72 is attached to the sensor receiving brackets 65 and 66, the portion provided with the insertion hole 62 in the upright wall portion 61 of the sensor receiving brackets 65 and 66 is interposed between two flange portions 72a and 72c.

Further, the sliding member 72 according to the other embodiment is formed so that the one end side flange portion 72a and the other end side flange portion 72c are symmetrical to each other and two flange portions 72a and 72c substantially have the same diameter. Accordingly, it is possible to inhibit the force acting on the flange portions 72a and 72c when the annular portion of the sensor body 32 comes into contact with the sliding member 72 from becoming uneven between the flange portions 72a and 72c. In addition, when the one end side flange portion 72a and the other end side flange portion 72c are symmetrical to each other, the sliding member 72 may be attached to the annular portion from any end, so that the operation of attaching the sliding member 72 is easily performed.

The attachment of the sliding member 72 will be described. A substantially cylindrical base is inserted into the insertion hole 62 of the sensor receiving brackets 65 and 66, and in a state where both ends of the base protrude from the insertion hole 62, both ends of the base are caulked. With the above-described procedure, the sliding member 72 having the flange portions 72a and 72c provided in both ends is completed, and the sliding member 72 may be assembled to the upright wall portion 61 of the sensor receiving brackets 65 and 66. Then, in a state where the sliding member 72 is assembled to the sensor receiving brackets 65 and 66, the outer edge of the free end of the annular portion 63 is positioned at the inside of the outer edge of the one end side flange portion 72a. Accordingly, at the time point at which the caulking is performed, in the one end side flange portion 72a, it is possible to ensure a tolerance corresponding to the extent in which the free end of the annular portion 63 protrudes.

Furthermore, in a state where the sliding member 72 is attached to the sensor receiving brackets 65 and 66, as illustrated in FIG. 23, the one end side flange portion 72a of the sliding member 72 comes into contact with the free end of the annular portion 63 without any gap and is bonded to the annular portion 63. On the other hand, the other end side flange portion 72c comes into contact with the inner surface of the upright wall portion 61 and is bonded to the upright wall portion 61. However, in the corner portion which is formed by the other end side flange portion 72c and the fitting cylindrical portion 72b, a gap is formed with respect to the upright wall portion 61. As described above, in the upright wall portion 61, the opening edge of the insertion hole 62 is bent in a round shape and protrudes toward the side frame 2a to form the annular portion 63. Accordingly, the other end side flange portion 72c is bonded to the upright wall portion 61 by being bonded to the portion which is positioned at the outside in the radial direction in relation to the base end bent in a round shape in the upright wall portion 61.

Then, in a state where the sensor 30 is supported by the side frame 2a, as illustrated in FIG. 23, the even diameter portion 36a of the accommodation shaft portion 36 is disposed at the inner position in relation to both ends of the sliding member 72 in the axial direction of the extension shaft portion 31. Accordingly, when the annular portion of the sensor body 32 is pressed against the sensor receiving brackets 65 and 66 through the sliding member 72, the load is stably transmitted to the annular portion since the even diameter portion 36a is present at the opposite side to the sliding member 72 with the annular portion interposed therebetween.

Further, in a state where the sensor 30 is supported by the side frame 2a, as illustrated in FIG. 23, the sliding member 72 is disposed across the slit formed between the positioning portion 35 of the sensor body 32 and the annular portion in the axial direction of the extension shaft portion 31. That is, in the other embodiment, since the sliding member 72 is disposed at the outside of the slit in the radial direction, the slit may be covered by the sliding member 72, so that foreign matter may be inhibited from intruding into the slit.

Further, in a state where the sensor 30 is supported by the side frame 2a, as illustrated in FIG. 23, in the axial direction of the extension shaft portion 31, a gap (hereinafter, a hollow portion) Sv which is surrounded by the other end side flange portion 72c, the fitting cylindrical portion 72b, and the round bent portion of the upright wall portion 61 reaches the boundary position between the even diameter portion 36a and the uneven diameter portion 36b of the accommodation shaft portion 36. That is, the hollow portion Sv and the upright wall portion 61 are present at the position of the terminal end of the even diameter portion 36a in the axial direction of the extension shaft portion 31. Further, in the annular portion serving as the load detection portion 37, the portion position at the terminal end of the even diameter portion 36a in the axial direction is positioned at the innermost side in the width direction in the region pressed against the inner peripheral surface of the insertion hole 62.

On the other hand, in the embodiment, as described above, when the sensor 30 is rotated by the input load so that the annular portion the sensor body 32 is pressed against the inner peripheral surface of the insertion hole 62, the pressing is performed at the base end side of the annular portion 63. At this time, in the annular portion, the same portion as that of the terminal end of the even diameter portion 36a is pressed against the inner peripheral surface of the insertion hole 62. Then, since the base end of the annular portion 63 is provided with the hollow portion Sv, the impact which is generated when the annular portion is butted against the inner peripheral surface of the insertion hole 62 is absorbed by the hollow portion Sv.

The washer 74 corresponds to the movement regulation portion or the movement regulation member as in the specification example, and is formed in an annular member into which the annular portion of the sensor body 32 is inserted. The washer 74 is positioned at the inside in the width direction in relation to the other end side flange portion 72c of the sliding member 72, so that the excessive inward movement of the sliding member 72 is regulated in the width direction. That is, the washer 74 regulates the sliding member 72 from moving inward in relation to the arrangement position of the washer 74. Further, as illustrated in FIG. 23, the boundary position between the even diameter portion 36a and the uneven diameter portion 36b in the accommodation shaft portion 36 is positioned at the outside of the washer 74 in the width direction. Accordingly, it is possible to inhibit the even diameter portion 36a from unnecessarily increasing in size in the axial direction of the accommodation shaft portion 36. Further, the outer diameter of the washer 74 is formed to be larger than the outer diameters of the flange portions 72a and 72c of the sliding member 72. Accordingly, it is possible to reliably inhibit the excessive movement of the sliding member 72 by the washer 74. Furthermore, the washer 74 is not limited to be separated from the sensor 30. For example, the washer may be integrated with the annular portion of the sensor body 32. In such a configuration, the number of components decreases, so that the time necessary for the operation of supporting the sensor 30 may be shortened.

The spacer 71 corresponds to the movement restriction portion or the movement restriction member as in the specification example, and is formed as a cylindrical member which is positioned between the one end side flange portion 72a of the sliding member 72 and the side frame 2a, thereby regulating the excessive outward movement of the sliding member 72 in the width direction. Specifically, when the sliding member 72 which is fitted to the annular portion of the sensor body 32 slides outward on the outer peripheral surface of the annular portion, the spacer 71 comes into contact with the sliding member 72 to regulate the sliding member 72 from coming off from the annular portion. The spacer 71 is bonded by projection welding to the side frame 2a in a state where a center circular hole 71a and the hole portion 21 of the side frame 2a overlap each other in a concentric shape. The diameter of the circular hole 71a is larger than the diameter of the hole portion 21, and in a state where the sensor 30 is supported by the side frame 2a, as illustrated in FIG. 22, the positioning portion 35 of the sensor body 32 is disposed inside the circular hole 71a. Furthermore, the spacer 71 is not limited to be separated from the sensor 30 or the sensor receiving brackets 65 and 66. For example, the spacer may be integrated with the upright wall portion 61 by processing a part of the upright wall portion 61 of the sensor receiving brackets 65 and 66. In such a configuration, the number of components decreases, so that the time necessary for the operation of supporting the sensor 30 may be shortened.

Other Embodiments

In the above-described embodiment, an example of the support structure for the sensor 30 which measures the load applied to the vehicle seat Z has been described as the support structure for the load measurement sensor of this embodiment of the invention. However, the above-described embodiment is provided to help the understanding of the invention, and does not limit the invention. The invention may be modified and improved without departing from the spirit of the invention, and of course, the equivalent thereof is included in the invention. Further, the above-described material or shape is merely an example of exhibiting the effect of the invention, and does not limit the invention.

For example, in the above-described embodiment, the load measurement sensor 30 is described which measures the load by detecting the deformation of the load detection portion 37 using the strain sensor, but the invention is not limited thereto. For example, a sensor may be used which measures the load by detecting the deformation of the load detection portion 37 using a magnet or a hall element.

Further, in the above-described embodiment, when supporting the sensor 30, the extension shaft portion 31 of the sensor 30 is inserted into the insertion holes 52 and 62 of the attachment brackets 15 and 16 or the sensor receiving brackets 65 and 66, the male screw portion 31a protrudes outward from the opening of the insertion hole 52, 62, and then the nut 39 is threaded into the male screw portion 31a. Here, the invention is not limited thereto. For example, the front end of the extension shaft portion 31 may not protrude outward from the insertion holes 52 and 62 when supporting the sensor 30. That is, in a state where the extension shaft portion 31 is inserted into the insertion holes 52 and 62, the front end of the extension shaft portion 31 may be positioned between one end side opening and the other end side opening of the insertion holes 52 and 62. With such a configuration, in the extension shaft portion 31, the portion which protrudes from the insertion holes 52 and 62 serves to inhibit the interference with the other member.

Further, in the above-described embodiment, as the support spring which supports the cushion body, the S-spring 6 is provided. Then, in the above-described embodiment, in order to prevent the interference between the sensor 30 and the S-spring 6, the sensor 30 is disposed at a position away from the S-spring 6. Here, the invention is not limited thereto. For example, a frame (a sheet metal member) or the like may be provided as a passenger posture support member instead of the support spring. Even in such a configuration, in order to attain a compact in size of the vehicle seat Z, it is desirable to support the sensor 30 while the sensor is away from the passenger posture support member as much as possible.

Further, in the above-described embodiment, in order to more appropriately transmit the load from the side frame 2a to the sensor body 32 (specifically, the load detection portion 37), the bush 43 or the sliding member 42 is provided, and the side frame 2a presses the load detection portion 37 through the bush 43 or the sliding member 42. Here, the invention is not limited thereto. For example, the bush 43 or the sliding member 42 may not be provided, and the side frame 2a may directly come into contact with the load detection portion 37 to press the load detection portion 37. Further, instead of the bush 43 or the sliding member 42, an other relay member may be provided in the load transmission path from the side frame 2a to the sensor body 32.

Furthermore, in the above-described embodiment, the sliding member 42 is a movable member which moves with the deformation of the load detection portion 37. However, for example, in a configuration in which the side frame 2a directly comes into contact with the load detection portion 37 to press the load detection portion 37, the side frame 2a corresponds to the movable member.

Further, in the above-described embodiment, the vehicle seat Z is exemplified as the seat, but the invention is not limited thereto. The invention may be applied to other conveyances such as an airplane or a ship. In addition, the invention is not limited to the conveyance, and the invention may be applied to any seat which needs to measure the load thereof.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

DESCRIPTION OF REFERENCE NUMERALS AND SIGNS

Z: vehicle seat (seat)
F: seat frame
S: seat unit
Sv: hollow portion
1: seat back frame (seat frame)
2: seating frame (seat frame)
2a: side frame
3: connection pipe
4: submarine restraining pipe
4a: transverse center portion
4b: transverse end
4c: connection portion
5: the hanging portion
6: S-spring
6a: first curved portion
6b: second curved portion
10: rail mechanism
11: lower rail
12: upper rail (rail member)
13: fixation bracket
14: member frame
15: attachment bracket
16: attachment bracket
17: slide lever
18: bolt (fixation member)
20: front end
21: hole portion
22: connection region (connection portion)
23: rear attachment region (protrusion portion)
23a: protrusion portion
24: front end region
25: front attachment region (protrusion portion)
25a: protrusion portion
26: intermediate region
26a: lower portion
26b: upper portion
26c: rear adjacent portion
26d: front adjacent portion
30: sensor (load measurement sensor)
31: extension shaft portion
31a: male screw portion
31b: adjacent portion
31c, 31d: convex portion
32: sensor body
33: shaft body
34: substrate unit (conversion unit)
34a: connector portion
35: positioning portion 36: accommodation shaft portion
36a: even diameter portion
36b: uneven diameter portion
37: load detection portion
37a: load receiving surface
37b: free end
39: nut (fastening member)
40: sensor attachment component
41: spacer (movement restriction portion, movement restriction member)
41a: circular hole
41b, 41c: end
42: sliding member (contact portion, load input member)
42a: one end side flange portion (flange portion, first flange portion)
42ax: end
42b: fitting cylindrical portion (cylindrical portion)
42c: other end side flange portion (flange portion, second flange portion)
42d: penetration hole (load input surface)
43: bush (load transmission portion, load transmission member)
43a: cylindrical portion (small diameter portion)
43b: flange portion (extension portion, large diameter portion)
43c: penetration hole
44: washer (movement regulation portion)
45: E-ring
50: bottom wall portion
51: upright wall portion
52: insertion hole
52a, 52b: concave portion
53: upward protrusion wall
54: removed portion
60: bottom wall portion
61: upright wall portion
62: insertion hole
63: annular portion
65, 66: sensor receiving bracket
70: sensor attachment component
71: spacer
71a: circular hole
72: sliding member (contact portion, load input member)
72a: one end side flange portion (flange portion, first flange portion)
72b: fitting cylindrical portion
72c: other end side flange portion (flange portion, second flange portion)
72d: penetration hole
74: washer
101: seat frame
111: lower rail
112: upper rail
130: load measurement sensor
131: shaft portion

What is claimed is:

1. A support structure for a load measurement sensor, wherein:
the load measurement sensor comprises:
a sensor body that detects a load generated from a seat having a seat frame; and
an extension shaft portion that extends from the sensor body;
wherein:
the load measurement sensor is supported by a support bracket, while the extension shaft portion is positioned at a side portion of the sensor body;
the sensor body includes a load receiving surface which is formed to receive the load;
the support structure, which supports the load measurement sensor, comprises:
a contact portion which comes into contact with the load receiving surface and transmits the load to the sensor body, the contact portion being formed to be movable in an axial direction of the extension shaft portion with respect to the load receiving surface;
the sensor body includes a load detection portion which detects the load in a manner such that the load detection portion is displaced while coming into contact with the contact portion;
the load measurement sensor includes a conversion unit which is attached to the sensor body, detects a displacement amount of the load detection portion, and converts the displacement amount into an electric signal; and
the contact portion is disposed near the conversion unit in relation to a displacing free end of the load detection portion.

2. The support structure for the load measurement sensor according to claim 1, wherein the contact portion is formed to be movable toward the extension shaft portion supported by the support bracket.

3. The support structure for the load measurement sensor according to claim 1, wherein the contact portion is disposed adjacent to an other member in the axial direction of the extension shaft portion while being separated from the other member.

4. The support structure for the load measurement sensor according to claim 1, wherein:
the sensor body further includes a positioning portion which is disposed near the support bracket in relation to the load receiving surface and positions the load measurement sensor with respect to the support bracket; and
the contact portion is disposed on an inside in a seat width direction in relation to the positioning portion.

5. The support structure for the load measurement sensor according to claim 1, wherein:
the contact portion is attached to an attachment member which is disposed on an inside in a seat width direction in relation to the support bracket; and
the contact portion includes a load input surface that comes into contact with the load receiving surface, and the load input surface is formed by a load input member having a sliding performance higher than that of the attachment member.

6. The support structure for the load measurement sensor according to claim 5, wherein:
the load input member comprises:
a cylindrical portion which is disposed along the axial direction of the extension shaft portion and comes into contact with the sensor body; and
a flange portion which is formed in one end of the cylindrical portion in the axial direction and extends outward in a radial direction; and
the flange portion is attached to the attachment member.

7. The support structure for the load measurement sensor according to claim 5, wherein:
the load input member comprises:
a cylindrical portion which is disposed along the axial direction of the extension shaft portion and comes into contact with the sensor body;
a first flange portion which is formed in one end of the cylindrical portion in the axial direction and extends outward in a radial direction; and a second flange portion which is formed in an other end of the cylindrical portion in the axial direction and extends outward in the radial direction; and the first flange portion and the second flange portion are formed at positions interposing the attachment member.

8. The support structure for the load measurement sensor according to claim 5, wherein:
the extension shaft portion which is fixed to the support bracket is disposed in one end of the sensor body; and
an other end of the sensor body is a free end.

9. The support structure for the load measurement sensor according to claim 5, wherein:
the attachment member is formed of a metal material; and
the load input member is formed of a resin material.

10. The support structure for the load measurement sensor according to claim 1, further comprising:
a load transmission portion which is adjacent to the contact portion to transmit the load to the sensor body; and
wherein:
the load transmission portion and the contact portion are all attached to the attachment member disposed on an inside in a seat width direction in relation to the support bracket
the load transmission comprises:
a sensor body side end that is positioned near the sensor body in a load transmission direction; and
an opposite portion that is positioned at an opposite side of the sensor body side end in the load transmission direction;
wherein:
the length of the sensor body side end in the axial direction of the extension shaft portion is longer than that of the opposite portion; and
the attachment member and the opposite portion positioned at the opposite side of the sensor body side end in the load transmission direction of the load transmission portion are formed integrally with each other.

11. The support structure for the load measurement sensor according to claim 10, wherein:
the load transmission portion is formed by a load transmission member attached to an end of the attachment member at a position of pressing the sensor body; and
a plate thickness of the load transmission member near the sensor body in the seat width direction is larger than a plate thickness of the load transmission member near the attachment member in the seat width direction.

12. A support structure for a load measurement sensor, wherein:
the load measurement sensor comprises:
a sensor body that detects a load generated from a seat having a seat frame; and
an extension shaft portion that extends from the sensor body;
wherein:
the load measurement sensor is supported by a support bracket, while the extension shaft portion is positioned at a side portion of the sensor body;
the sensor body includes a load receiving surface which is formed to receive the load; and
the support structure, which supports the load measurement sensor, comprises:
a contact portion which comes into contact with the load receiving surface and transmits the load to the sensor body, the contact portion being formed to be movable in an axial direction of the extension shaft portion with respect to the load receiving surface;
the contact portion is attached to the attachment member disposed on an inside in a seat width direction in relation to the support bracket;
the load measurement sensor further includes a conversion unit which is attached to the sensor body, detects the load applied to the sensor body, and converts the load into an electric signal;
the support structure comprises a movement regulation portion which is disposed between the conversion unit and the contact portion and regulates a movement amount of the contact portion toward the conversion unit; and
the movement regulation portion is formed at the outside of an inner surface of the conversion unit in a radial direction of the extension shaft portion and is disposed on the inside in the seat width direction in relation to the attachment member.

13. The support structure for the load measurement sensor according to claim 12, wherein the movement regulation portion is formed by a movement regulation member which is formed separately from the sensor body.

14. The support structure for the load measurement sensor according to claim 12, wherein the movement regulation portion is disposed away from the conversion unit in the axial direction of the extension shaft portion.

15. The support structure for the load measurement sensor according to claim 12, wherein the movement regulation portion is disposed on an inside in the radial direction of the extension shaft portion in relation to an outer end surface of the conversion unit.

16. The support structure for the load measurement sensor according to claim 12, wherein:
one of the support bracket and the attachment member is attached onto a rail member extending along a front-to-back direction of the seat by a fixation member; and
at least a part of the movement regulation portion is disposed at a lower side in relation to an upper end of the fixation member.

17. The support structure for the load measurement sensor according to claim 12, wherein:
the contact portion comprises:
a cylindrical portion which is disposed along the axial direction of the extension shaft portion and comes into contact with the sensor body; and
a flange portion which is provided in one end of the cylindrical portion in the axial direction and extends outward in the radial direction,
wherein:
the flange portion is disposed adjacent to the movement regulation portion in the axial direction; and
the movement regulation portion extends outward in a radial direction in relation to an outer diameter of the flange portion.

18. The support structure for the load measurement sensor according to claim 1, further comprising:
a movement restriction portion which is disposed between the support bracket and the contact portion and restricts a movement amount of the contact portion toward the support bracket.

19. The support structure for the load measurement sensor according to claim 18, wherein:
the sensor body includes a load detection portion which comes into contact with a load input portion and detects the load; and
the movement restriction portion is formed to not overlap an end surface of the load detection portion in a seat width direction on a same imaginary plane of which the axial direction is set as a normal direction.

20. The support structure for the load measurement sensor according to claim 19, wherein:
the load detection portion is disposed away from the support bracket; and
the movement restriction portion is disposed at the outside of a gap between the load detection portion and the support bracket in a radial direction of the extension shaft portion to cover the gap.

21. The support structure for the load measurement sensor according to claim 18, wherein the movement restriction portion is formed in an annular shape.

22. The support structure for the load measurement sensor according to claim 1, further comprising:
a load input portion which comes into contact with a portion different from the load receiving surface of the load measurement sensor and inputs the load to the load measurement sensor; and
a sensor body receiving portion which is pressed by the sensor body through the contact portion when the load measurement sensor is moved by the load input from the load input portion;
wherein:
the load measurement sensor includes a load detection portion which detects the load in a manner such that the sensor body receiving portion is pressed through the contact portion and thereby the load detecting portion is displaced,
the load measurement sensor is moved by the load input from the load input portion, and the load detection portion is pressed against the sensor body receiving portion through the contact portion with a movement operation of the load measurement sensor; and
a state where the load measurement sensor is supported by the support bracket, the load input portion and the sensor body receiving portion are away from each other.

* * * * *